(12) United States Patent
Tsubouchi et al.

(10) Patent No.: US 6,212,992 B1
(45) Date of Patent: Apr. 10, 2001

(54) VACUUM TYPE BRAKE BOOSTER FOR VEHICLE

(75) Inventors: Kaoru Tsubouchi, Toyota; Akihiko Miwa, Anjo; Nobuyuki Hirota, Chiryu; Minoru Watanabe, Nisshin; Yoichi Terasaki, Kariya, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/535,224

(22) Filed: Mar. 27, 2000

Related U.S. Application Data

(62) Division of application No. 09/062,737, filed on Apr. 20, 1998, now Pat. No. 6,065,388.

(30) Foreign Application Priority Data

| Apr. 18, 1997 | (JP) | 9-102041 |
| Aug. 6, 1997 | (JP) | 9-212251 |
| Aug. 6, 1997 | (JP) | 9-212252 |
| Aug. 6, 1997 | (JP) | 9-212254 |
| Aug. 6, 1997 | (JP) | 9-212256 |

(51) Int. Cl.$^7$ ........................................ F15B 9/10
(52) U.S. Cl. ........................................ 91/369.2; 91/376 R
(58) Field of Search .................. 91/369.1, 369.2, 91/369.3, 376 R

(56) References Cited

U.S. PATENT DOCUMENTS

| 5,172,964 | 12/1992 | Levrai et al. . | |
| 5,233,905 | * 8/1993 | Fecher | 91/369.2 |
| 5,564,326 | * 10/1996 | Gautier et al. | 91/369.2 |
| 5,605,088 | 2/1997 | Balz et al. . | |
| 5,609,087 | 3/1997 | Horikoshi . | |
| 5,683,147 | 11/1997 | Tsubouchi et al. . | |
| 5,778,754 | * 7/1998 | Kaub | 91/369.2 X |
| 5,857,399 | 1/1999 | Tsubouchi et al. . | |

FOREIGN PATENT DOCUMENTS

| 19624663 | 1/1997 | (DE) . |
| 7-503214 | 4/1995 | (JP) . |
| 7-251733 | 10/1995 | (JP) . |
| 7-11704 | 8/1996 | (JP) . |
| 9-2246 | 1/1997 | (JP) . |

* cited by examiner

*Primary Examiner*—Hoang Nguyen
(74) *Attorney, Agent, or Firm*—Burns, Doane, Swecker & Mathis, LLP

(57) ABSTRACT

A vacuum type brake booster for a vehicle is capable of compensating for inadequacy of the force with which a driver steps on a brake pedal during emergency braking whereby a reaction force corresponding to the output of the booster is applied to the brake pedal. A good brake pedal operation feeling is thereby obtained in both the outward and return strokes of the brake pedal and during when the booster has been switched to normal braking and when it has been switched to emergency braking.

5 Claims, 16 Drawing Sheets

Fig. 3
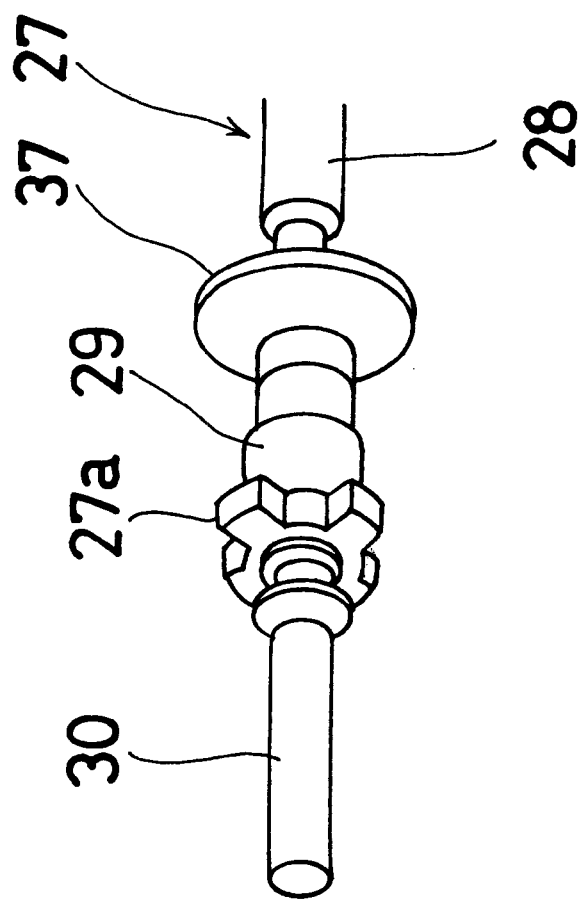
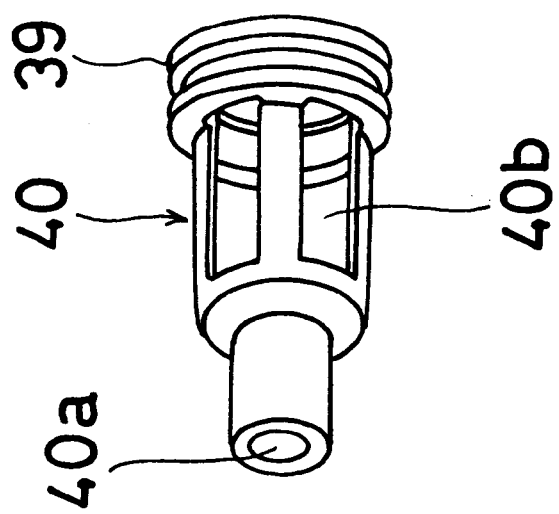

US 6,212,992 B1

VACUUM TYPE BRAKE BOOSTER FOR VEHICLE

This application is a divisional of application Ser. No. 09/062,737, filed Apr. 20, 1998, now U.S. Pat. No. 6,065,388.

FIELD OF THE INVENTION

This invention generally relates to a vacuum type brake booster for a vehicle. More particularly, the present invention pertains to a vacuum type brake booster for a vehicle that is capable of compensating for deficiencies in the brake pedal depressing force during emergency braking.

BACKGROUND OF THE INVENTION

In recent years, results of analysis have indicated that oftentimes, when a driver hurriedly steps on the brake pedal because an obstruction has suddenly appeared in the path of his vehicle, i.e., during emergency braking, the stepping force which the driver applies to the brake pedal is relatively small compared to the stepping force required to produce a brake fluid pressure of a magnitude resulting in wheel lock. Consequently, the braking capability of the vehicle is not fully exerted. Thus, it has been proposed to install on a vehicle a device which determines on the basis of the brake pedal depression speed and the rate of increase in the master cylinder pressure whether the braking operation in progress is a normal braking operation or an emergency braking operation, and when it is determined that it is an emergency braking operation, the brake fluid pressure is automatically raised to a magnitude resulting in wheel lock.

Devices of various construction have been proposed for raising the brake fluid pressure to a magnitude that results in wheel lock upon emergency braking. One of these devices, described in Japanese Unexamined Patent Publication No. H7-251733, involves a vacuum type brake booster that is constructed so that its input-output characteristics can be switched by means of a control signal from outside between at least two different characteristics (a characteristic for normal braking and a characteristic for emergency braking). With the input-output characteristics of the vacuum type brake booster being switched from the characteristic for normal braking to the characteristic for emergency braking at times of emergency braking, it is possible to obtain the same result as when the driver steps on the brake pedal strongly.

With the vacuum type brake booster disclosed in Japanese Unexamined Patent Publication No. H7-251733, however, although when the booster is switched to the characteristic for normal braking a good brake pedal operation feeling is obtained because a reaction force is exerted on the input member of the booster by a reaction member in both the outward stroke and the return stroke of the input member, when the booster is switched to the characteristic for emergency braking, in the outward stroke of the input member a reaction is exerted on the input member by the reaction member but in the return stroke of the input member the reaction from the reaction member to the input member is cut off and consequently a good brake pedal operation feeling is not obtained.

A need exists therefore for a vacuum type brake booster for a vehicle in which a good brake pedal operation feeling is obtained both when the booster has been switched to a normal braking operation and when it has been switched to an emergency braking operation.

SUMMARY OF THE INVENTION

In light of the foregoing, one aspect of the present invention involves a vacuum servo unit for a braking system of a vehicle that includes a housing in which is defined a pressure chamber, a movable wall member disposed in the housing to divide the pressure chamber into a front chamber that is adapted to communicate with a negative pressure source and a rear chamber that is adapted to selectively communicate with atmosphere and the negative pressure source, and a movable power piston connected to the movable wall member. An input member is disposed in the movable power piston and is movable in the forward and backward directions with respect to the movable power piston upon actuation of the brake pedal. A valve mechanism is disposed in the movable power piston and is selectively changeable in response to movement of the input member in the forward and backward directions between a first state in which the rear chamber is in communication with the negative pressure source while communication between the rear chamber and atmosphere is cut off, a second state in which communication between the rear chamber and the negative pressure source is cut off and communication between the rear chamber and atmosphere is cut off, and a third state in which communication between the rear chamber and the negative pressure source is cut off and the rear chamber is in communicated with atmosphere. A first biasing member biases the input member towards a position in which the valve mechanism is in the first state, and an output member outputs as an output force a propulsion force generated by the movable power piston based on movement of the movable wall member. A reaction member transmits the propulsion force and the input force applied to the input member to the output member, and applies a reaction force corresponding to the output force outputted from the output member to the input member to move the input member in the backward direction with respect to the movable power piston. An actuator moves the input member with respect to the movable power piston to position the valve mechanism in the second state. The input member is urged in the backward direction with respect to the movable power piston by the first biasing member to a position in which the valve mechanism is in the first state during operation of the actuator upon a decrease of the input force applied to the input member, and the valve mechanism is maintained in the first state while the movable wall member continues to move in the backward direction with respect to the housing and the input force applied to the input member is being decreased. In addition, the input member is moved in the backward direction with respect to the movable power piston by the first biasing member with the valve mechanism being in the first state when the input force applied to the input member is completely removed during operation of the actuator, and the reaction member maintains application of the reaction force to the input member when the input force applied to the input member is larger than a preset value during operation of the actuator.

According to another aspect of the present invention, a vacuum servo unit for a braking system of a vehicle includes a housing in which is defined a pressure chamber, a movable wall member disposed in the housing for dividing the pressure chamber into a front chamber for communicating with a negative pressure source and a rear chamber for selectively communicating with atmosphere and the negative pressure source, a movable power piston connected to the movable wall member, and an input member disposed in the movable power piston for movement in forward and backward directions with respect to the movable power piston during actuation of the brake pedal. A valve mechanism is disposed in the movable power piston and includes a rearwardly facing air valve seat provided on the input member, a rearwardly facing first vacuum valve seat provided in the movable power piston, and a control valve having a movable portion and a portion fixed to the movable power piston. The movable portion of the control valve faces towards the air valve seat and the first vacuum valve seat. The control valve is biased in the forward direction by a first biasing member and is selectively changed between a first state in which the rear chamber communicates with the negative pressure source and communication between the rear chamber and atmosphere is cut off, a second state in which communication between the rear chamber and the negative pressure source is cut off and communication between the rear chamber and atmosphere is cut off, and a third state in which communication between the rear chamber and the negative pressure source is cut off and the rear chamber is in communication with atmosphere in response to a movement of the input member with respect to the movable power piston. A valve member is provided in the movable power piston for movement in the forward and backward directions with respect to the movable power piston and has a rearwardly facing second vacuum valve seat. An actuator is operational to move the valve member in the backward direction to contact to the movable portion of the control member and position the valve mechanism in the third state. An output member outputs as an output force a propulsion force generated by the movable power piston according to movement of the movable wall member.

In accordance with another aspect of the present invention, a vacuum servo unit for a vehicle braking system includes a housing in which is defined a pressure chamber, a movable wall member disposed in the housing to divide the pressure chamber into a front chamber that is adapted to communicate with a negative pressure source and a rear chamber that is adapted to selectively communicate with atmosphere and the negative pressure source, a movable power piston connected to the movable wall member, an input member disposed in the movable power piston and movable in forward and backward directions with respect to the movable power piston upon actuation of the brake pedal, and a valve mechanism disposed in the movable power piston. The valve mechanism is selectively changeable in response to movement of the input member in the forward and backward directions between a first state in which the rear chamber is in communication with the negative pressure source while communication between the rear chamber and atmosphere is cut off, a second state in which communication between the rear chamber and the negative pressure source is cut off and communication between the rear chamber and atmosphere is cut off, and a third state in which communication between the rear chamber and the negative pressure source is cut off and the rear chamber is in communicated with atmosphere. An output member outputs as an output force a propulsion force generated by the movable power piston based on movement of the movable wall member, and an actuator is operational for positioning the valve mechanism in the third state. A reaction member transmits the propulsion force and the input force applied to the input member to the output member, and applies a reaction force corresponding to the output force outputted from the output member to the input member during both operation and non-operation of the actuator to move the input member in the backward direction with respect to the movable power piston.

In accordance with a still further aspect of the present invention, a vacuum servo unit for a vehicle braking system includes a housing in which is defined a pressure chamber, a movable wall member disposed in the housing to divide the pressure chamber into a front chamber that is adapted to communicate with a negative pressure source and a rear chamber that is adapted to selectively communicate with atmosphere and the negative pressure source, a movable power piston connected to the movable wall member, an input member disposed in the movable power piston and movable in forward and backward directions with respect to the movable power piston upon application and removal of an input force resulting from actuation of the brake pedal, and a valve mechanism disposed in the movable power piston that is selectively changeable in response to movement of the input member to effect movement of the movable wall member upon actuation of the brake pedal. An output member outputs as an output force a propulsion force generated by the movable power piston based on movement of the movable wall member. A reaction member transmits the propulsion force and the input force applied to the input member to the output member, and applies a reaction force corresponding to the output force outputted from the output member to the input member to move the input member in the backward direction with respect to the movable power piston. The reaction member includes a restraint member for restraining elastic deformation of the reaction member.

BRIEF DESCRIPTION OF THE DRAWING FIGURES

The foregoing and additional features and details associated with the present invention will become more apparent from the following detailed description considered with reference to the accompanying drawing figures in which like elements are designated by like reference numerals and wherein:

FIG. 3 is an enlarged perspective view of a portion of the tandem type vacuum brake booster shown in FIG. 2;

DETAILED DESCRIPTION OF THE PREFERRED EMBODIMENTS

Figure 1:
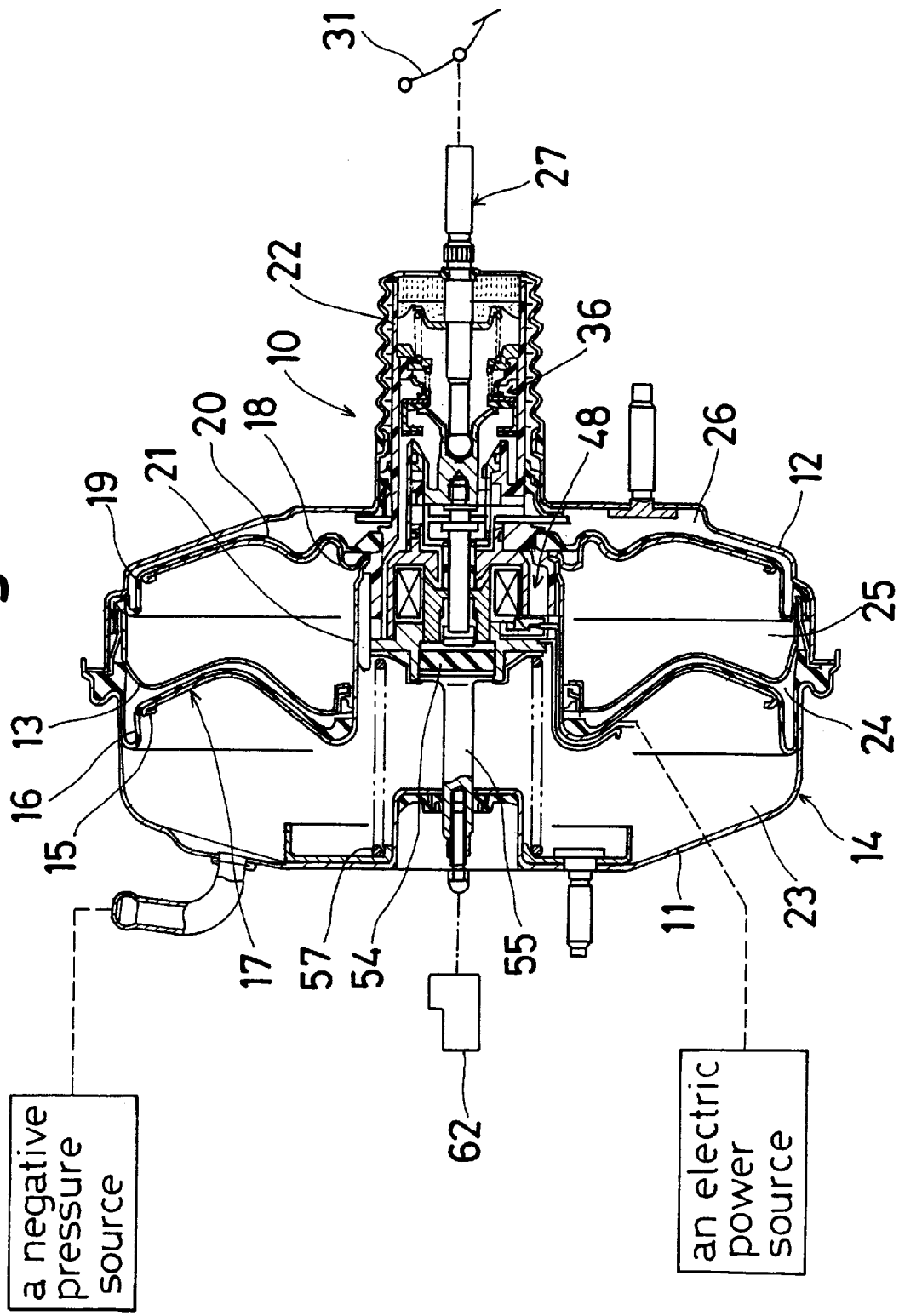
FIG. 1 is a cross-sectional view of a tandem type vacuum brake booster for a vehicle constituting a first embodiment of the present invention.

FIG. 1 is a cross-sectional view of a tandem type vacuum brake booster for a vehicle 10 according to a first embodiment of the present invention. The vehicle vacuum brake booster 10 includes a housing 14 defined by a front side shell 11, a rear side shell 12 and a partition wall 13 positioned between the front and rear side shells 11, 12 to thereby define within the housing 14 a front side pressure chamber and a rear side pressure chamber. A movable front side wall 17 comprised of a metal front side plate 15 and a rubber front side diaphragm 16 is disposed in the front side pressure chamber in the housing 14. A movable rear side wall 20 comprised of a metal rear side plate 18 and a rubber rear side diaphragm 19 is disposed in the rear side pressure chamber.

The front side plate 15 has integrally formed therewith at its center a cylindrical part 21 which passes slidably and in an air-tight manner through the center of the partition wall 13. A bead at the inner edge of the front side diaphragm 16 is fixed in an air-tight manner to the outer circumferential surface of the front end of the cylindrical part 21 of the front side plate 15, and a bead at the outer edge of the front side diaphragm 16 is sandwiched in an air-tight manner together with the outer edge of the partition wall 13 between edge parts of the front side and rear side shells 11, 12.

A bead at the outer edge of the rear side diaphragm 19 is sandwiched in an air-tight manner between a folded-back part provided on the radially inner side of the outer edge of the partition wall 13 and the shell 12. The rear end of the cylindrical part 21 of the front side plate 15 and the inner edge of the rear side plate 18 are fixed at the circumferential periphery of the forward part of a power piston 22. A bead at the inner edge of the rear side diaphragm 19 is fixed in an air-tight manner at the circumferential periphery of the forward part of the power piston 22. The power piston 22 slidably passes in an air-tight manner through the center of the rear side shell 12. In this way, the front side pressure chamber of the housing 14 is divided into a first front chamber 23 and a first rear chamber 24, and the rear side pressure chamber of the housing 14 is divided into a second front chamber 25 and a second rear chamber 26. The first front chamber 23 is connected to an engine intake manifold (not shown), which serves as a negative pressure source, and is normally held at a negative pressure. The second front chamber 25 is connected by a hole formed in the cylindrical part 21 of the front side plate 15 and a groove formed in the outside of the front end of the power piston 22 to the first front chamber 23, and thus the second front chamber 25 also is normally held at a negative pressure. The first rear chamber 24 is connected to the second rear chamber 26 by a groove formed in the inner circumferential surface of the bead at the outer edge of the front side diaphragm 16 and a hole formed in the partition wall 13 and a groove formed in the outer circumferential surface of the bead at the outer edge of the rear side diaphragm 19.

Figure 2:
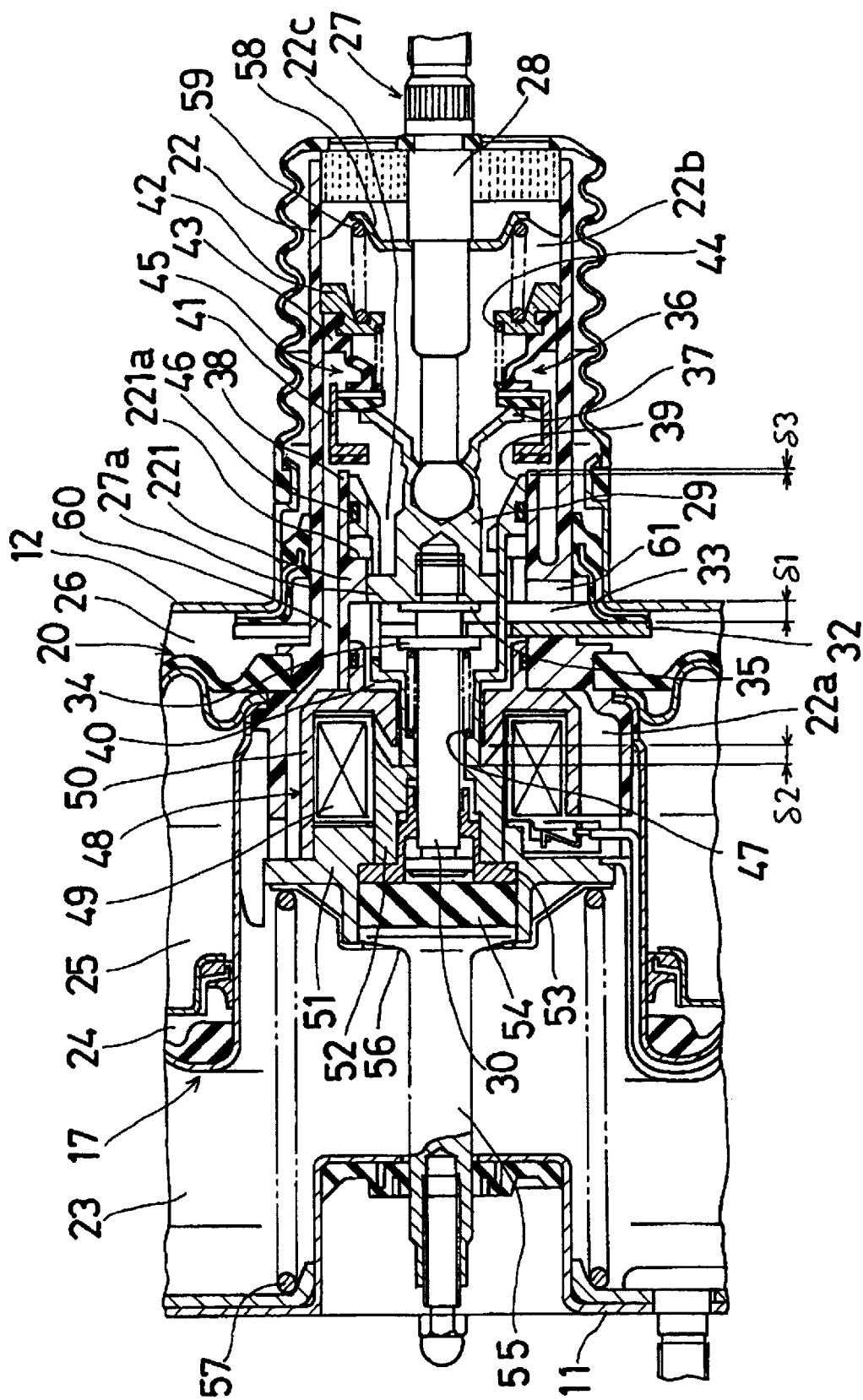
FIG. 2 is an enlarged cross-sectional view of a portion of the tandem type vacuum brake booster show in FIG. 1.

As best seen with reference to FIG. 2, defined within the power piston 22 is a first space 22a positioned inside the front end of the power piston 22 and connected with the first front chamber 23, a second space 22b positioned inside the rear end of the power piston 22 and connected with the atmosphere, and a middle part 221 interposed between the first space 22a and the second space 22b. The middle part 221 has in its center a third space 22c connecting the first space 22a to the second space 22b, a passage 60 connecting the first space 22a to the second space 22b separately from the third space 22c, and a passage 61 connecting the third space 22c to the second rear chamber 26.

An input member 27 is disposed inside the power piston 22 and passes through the first space 22a, the second space 22b and the third space 22c so as to be able to advance/retract with respect to the power piston 22. This input member 27 is made up of a rear member 28 having its front end positioned approximately in the third space 22c of the power piston 22 and its rear end positioned outside the power piston 22, a middle member 29 connected to the front end of the rear member 28 by a ball joint and slidably guided by the middle part 221 of the power piston 22, and a front member 30 having its rear end screwed into the front end of the middle member 29. The rear member 28 is connected to a brake pedal 31 as seen in FIG. 1.

A key member 32 is provided for defining an advance limit position and a retreat limit position. This key member 32 passes through a radial hole 33 formed in the power piston 22 and is engaged with the power piston 22 so that it will not fall out from the power piston 22. The front-rear direction thickness dimension of the key member 32 is smaller than the front-rear direction dimension of the radial hole 33, and the key member 32 can move with respect to the power piston 22 in the front-rear direction through a distance δ1 shown in FIG. 2. The key member 32 can abut upon the rear side shell 12 at the rear face of the key member 32 that projects radially outward from the power piston 22, and the retreat limit position of the power piston 22 with respect to the housing 14 is a position in which the front side wall of the radial hole 33 abuts upon the front face of the key member 32 and the rear face of the key member 32 abut upon the rear side shell 12.

The middle part of the key member 32 is positioned between a pair of flanges 34, 35 formed on the outside of the rear end of the front member 30 of the input member 27, and the retreat limit position of the input member 27 with respect to the power piston 22 is a position in which the rear face of the flange 34 abuts upon the front face of the key member 32 and the rear face of the key member 32 abuts upon the rear wall of the radial hole 33. The advance limit position of the input member 27 with respect to the power piston 22 is a position in which the front face of the flange 35 abuts upon the rear face of the key member 32 and the front face of the key member 32 abuts upon the front wall of the radial hole 33.

A valve mechanism 36 is disposed inside the power piston 22 and is switchable between an output decreasing action state, an output holding action state and a output increasing action state. In the output decreasing action state, the valve mechanism 36 connects the second rear chamber 26 to the first front chamber 23 while cutting off the second rear chamber 26 from the atmosphere. In the output holding action state, the valve mechanism cuts off the second rear chamber 26 from both the first front chamber 23 and the atmosphere. In the output increasing action state, the valve mechanism 36 cuts off the second rear chamber 26 from the first front chamber 23 while connecting the second rear chamber 26 with the atmosphere.

This valve mechanism 36 is comprised of an annular valve seat for atmospheric air inflow control 37 (i.e., an air valve seat) that is formed integrally with the middle member 29 of the input member 27 and points rearward, an axially rearwardly extending first annular valve seat for atmospheric air outflow control 38 (i.e., a vacuum valve seat) that is formed integrally with the rear part of the middle part 221 of the power piston 22 around the rear opening of the third space 22c, and a valve seat member 40 provided with a rearwardly axially extending second annular valve seat for atmospheric air outflow control 39 (i.e., a sub-vacuum valve seat) disposed radially inward of the first annular valve seat for atmospheric air outflow control 38 (i.e., in the third space 22c of the middle part 221) for advancing/retracting movement with respect to the power piston 22. The valve mechanism 36 also includes a cylindrical valve member 45 having a moving part 41 which faces the annular valve seat for atmospheric air inflow control 37, the first annular valve seat for atmospheric air outflow control 38 and the second annular valve seat for atmospheric air outflow control 39. The valve mechanism 36 further includes a fixed part 43 that is airtightly fixed to the power piston 22 by means of a retainer 42. The moving part 41 is urged forward by a spring 44 that functions as a second urging member.

FIG. 3 is a perspective view of the valve seat member 40 and the input member 27 of FIG. 2 before they are assembled together. The middle member 29 of the input member 27 has four circumferentially spaced apart and radially outwardly projecting sliding parts 27a. Also, the valve seat member 40 has a through hole 40a passing through the valve seat member 40 and four slits 40b extending forward from the rear opening of the through hole 40a and connecting the through hole 40a with the outside of the valve seat member 40.

When the input member 27 is inserted into the through hole 40a of the valve seat member 40, the sliding parts 27a and the slits 40b are positioned in alignment with one another so that the sliding parts 27a project outside the valve seat member 40 through the slits 40b. When the valve seat member 40 with the input member 27 assembled thereto is disposed in the power piston 22, the sliding parts 27a abut upon a projecting part 221a of the inner circumferential surface of the middle part 221. The input member 27 is thus slidably supported by way of the sliding parts 27a in the front-rear direction on the inner circumferential part of the middle part 221, that is on the inner circumferential part of the power piston 22.

The valve seat member 40 is positioned between the input member 27 and the middle part 221 of the power piston 22. At the rear end of the valve seat member 40 at which the second annular valve seat for atmospheric air outflow control 39 is formed, the valve seat member 40 slidably abuts in the front-rear direction upon the inner circumferential surface of the middle part 221. That is, the power piston 22 has the middle part 221 as a holding part for slidably holding the valve seat member 40 in the front-rear direction.

With reference once again to FIG. 2, an annular seal member 46 for maintaining an airtight seal between the rear end part of the valve seat member 40 and the inner circumferential surface of the middle part 221 is fitted in the rear end part of the valve seat member 40. Also, the valve seat member 40 is urged forward by a spring 47 that functions as a third urging member. The spring 47 is disposed between the valve seat member 40 and the flange 34. A spring 59 functioning as a first urging member is disposed between a retainer 58 that engages the rear member 28 of the input member 27 and the retainer 42. The spring 59 urges the input member 27 rearward, and when the brake pedal 31 is not being depressed causes the annular valve seat for atmospheric air inflow control 37 to abut upon the moving part 41 of the cylindrical valve member 45. The spring 59 also helps hold the moving part 41 away from the first annular valve seat for atmospheric air outflow control 38.

The passage 60 and the first space 22a formed in the middle part 221 connect the valve mechanism 36 with the first front chamber 23, and the passage 61 and the third space 22c connect the valve mechanism 36 with the second rear chamber 26.

Inside the front part of the power piston 22, that is in the first space 22a on the front side of the middle part 221, an actuator 48 is disposed for causing the valve seat member 40 to retreat against the action of the spring 47. This actuator 48 is made up of a solenoid coil 49, a yoke 50 made of a magnetic material, a yoke reaction member receiver 51 made of a magnetic material, and a plunger 52 made of a magnetic material. The solenoid coil 49, the yoke 50 and the yoke reaction member receiver 51 are fixed to the power piston 22, and the plunger 52 abuts upon the front end face of the valve seat member 40. The solenoid coil 49 is electrically connected by lead wires to an electronic control unit (not shown) outside the housing 14. When no current is passing through the solenoid coil 49 (i.e., when the actuator 48 is not operational), the urging force of the spring 47 causes the valve seat member 40 to be in the position shown in FIG. 2 such that the front end face of the valve seat member 40 abuts upon the plunger 52 and the front end face of the plunger 52 abuts upon a guide member 53 in a fixed relationship with the yoke reaction member receiver 51, and the front end part of the front member 30 of the input member 27 is slidably guided.

In addition, the second annular valve seat for atmospheric air outflow control 39 of the valve seat member 40 is positioned forward of the first annular valve seat for atmospheric air outflow control 38 of the power piston 22. That is, the valve seat member 40 is urged by the spring 47 and abuts by way of the plunger 52 upon the guide member 53, whereby the guide member 53 limits the advance of the valve seat member 40 with respect to the power piston 22. When current is passed through the valve seat member 40 (i.e., when the actuator 48 is operational), an electromagnetic attraction force arises between the yoke 50 and the plunger 52, and under this electromagnetic attraction force the plunger 52 causes the valve seat member 40 to retreat against the action of the spring 47. The amount of retreat of the valve seat member 40 corresponds to the distance δ2 between the yoke 50 and the plunger 52. When the valve seat member 40 has retreated, the second annular valve seat for atmospheric air outflow control 39 of the valve seat member 40 is positioned rearward of the first annular valve seat for atmospheric air outflow control 38 of the power piston 22.

Inside the yoke reaction member receiver 51, a disc-shaped reaction member 54 made of rubber is disposed in front of the guide member 53. The rear end part 56 of an output member 55 which passes in a slidable and air-tight manner through the center of the front wall of the housing 14 is slidably disposed on the front side of this reaction member 54. The reaction member 54, in a known fashion, transmits the advancing force of the power piston 22 and the advancing force of the input member 27 to the output member 55, and exerts on the input member 27 a reaction force of a size or magnitude corresponding to the output from the output member 55. The output member 55 is operatively connected to a piston (not shown) of a master cylinder 62 (FIG. 1).

A return spring 57 for causing the power piston 22 and the moving walls 17, 20 connected thereto to retreat with respect to the housing 14 is disposed in the center of the first front chamber 23.

The operation of this vacuum type brake booster is as follows. The state of the vacuum type brake booster shown in FIG. 1 and FIG. 2 is a state in which the brake pedal 31 has not been depressed and the actuator 48 has not been operated. In this state, the valve mechanism 36 is in its output decreasing action state in which the second rear chamber 26 is connected to the first front chamber 23 while being cut off from the atmosphere. That is, a state in which the annular valve seat for atmospheric air inflow control 37 abuts upon the moving part 41 of the cylindrical valve member 45, and the moving part 41 is spaced away from the first annular valve seat for atmospheric air outflow control 38. The pressure in the first rear chamber 24 and the second rear chamber 26 is the same as the pressure in the first front chamber 23, and no advancing force is acting on the moving walls 17, 20 and the power piston 22. Also, the power piston 22 and the moving walls 17, 20 connected thereto are held by the return spring 57 in their retreat limit position with respect to the housing 14, i.e. the position in which the front side wall of the radial hole 33 of the power piston 22 abuts against the front face of the key member 32 and the rear face of the radially outer end portion of the key member 32 abuts against the rear side shell 12.

When a driver steps on the brake pedal 31 to effect a normal braking action, the input member 27 advances with respect to the power piston 22 and the moving part 41 of the cylindrical valve member 45 abuts against the first annular valve seat for atmospheric air outflow control 38 of the power piston 22, thereby cutting off communication between the second rear chamber 26 and the first front chamber 23 In other words, the valve mechanism 36 switches from its output decreasing action state to its output holding action state. At this time, a gap remains between the front end face of the input member 27 and the rear face of the reaction member 54.

Then, the annular valve seat for atmospheric air inflow control 37 moves away from the moving part 41 so that the second rear chamber 26 is communicated with the atmosphere, whereby the valve mechanism 36 switches to its output increasing action state. Consequently, atmospheric air flows into the second rear chamber 26 and also flows from the second rear chamber 26 into the first rear chamber 24 so that the pressure in the two chambers 24, 26 rises. An advancing force is exerted on the first moving wall 17 by the pressure differential between the first front chamber 23 and the first rear chamber 24, and an advancing force is exerted on the second moving wall 20 by the pressure differential between the second front chamber 25 and the second rear chamber 26. These advancing forces are transmitted from the power piston 22 through the yoke reaction member receiver 51 of the actuator 48, the guide member 53 and the reaction member 54 to the output member 55. The moving walls 17, 20, the power piston 22 and the output member 55 start to advance integrally with respect to the housing 14 and the operation of the master cylinder 62 is started.

At this time, the power piston 22 advances with respect to the input member 27 also, and the moving part 41 of the valve member 45 approaches the annular valve seat for atmospheric air inflow control 37. Also, the reaction member 54 deforms and enters the inside of the guide member 53 so as to reduce the gap between the rear face of the central portion of the reaction member 54 and the front end face of the input member 27. The reaction member 54 then abuts against the front end face of the input member 27. The reaction member 54 thus transmits the advancing force of the power piston 22 and the advancing force of the input member 27 to the output member 55, and exerts a reaction force corresponding to the output of the output member 55 on the input member 27 so as to tend to make the input member 27 retreat with respect to the power piston 22. As the power piston 22 advances with respect to the input member 27, soon the moving part 41 of the cylindrical valve member 45 abuts upon the annular valve seat for atmospheric air inflow control 37 again and the flow of atmospheric air to the rear chambers 24, 26 is stopped (the valve mechanism 36 switches to its output holding action state). At this time, the input being applied to the input member 27 from the brake pedal 31 is the value Fi1 shown in FIG. 4, and the output applied to the master cylinder 62 from the input member 27 is the value Fo1 shown in FIG. 4.

Figure 4:
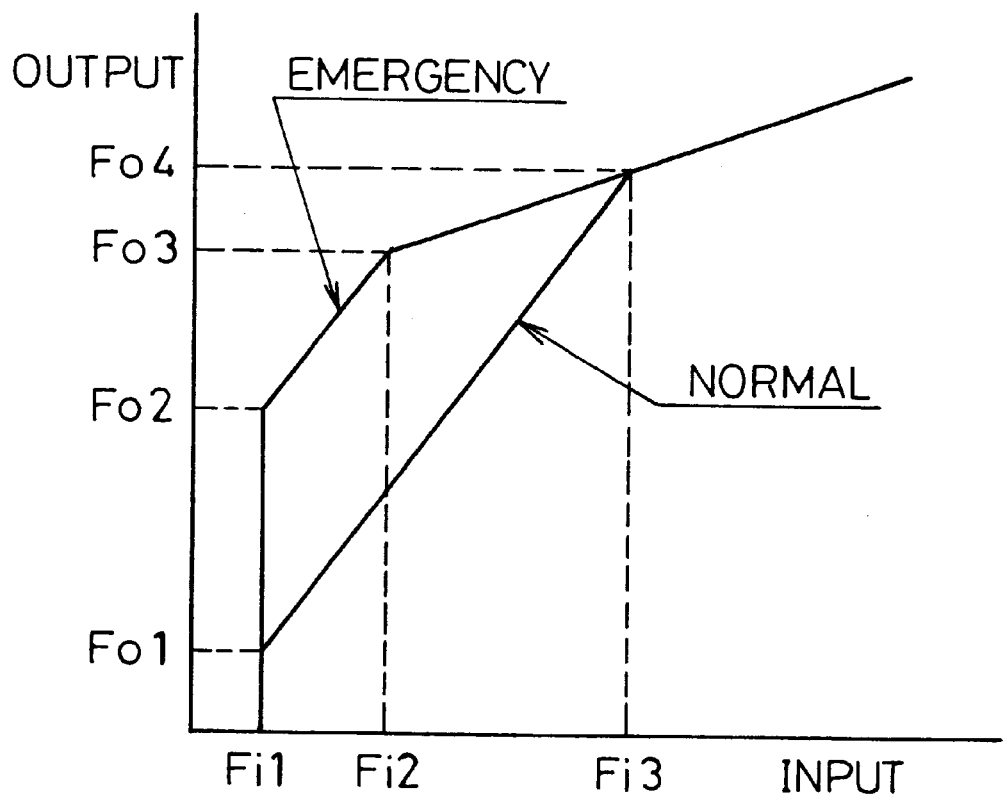
FIG. 4 is a graph depicting input-output characteristics of the vacuum brake booster shown in FIGS. 1 and 2.

When the input applied to the input member 27 from the brake pedal 31 is increased to a value up to the value Fi3 in FIG. 4, the input member 27 advances with respect to the power piston 22, the annular valve seat for atmospheric air inflow control 37 moves away from the moving part 41 of the valve member 45 again (i.e., the valve mechanism 36 switches to its output increasing action state), atmospheric air flows into the rear chambers 24, 26, and the pressure in the rear chambers 24, 26 rises. The advancing forces on the moving walls 17, 20 and the power piston 22 increase and the moving walls 17, 20, the power piston 22 and the output member 55 advance further with respect to the housing 14. Also, as a result of the power piston 22 advancing with respect to the input member 27, the moving part 41 of the valve member 45 approaches the annular valve seat for atmospheric air inflow control 37 and soon the moving part 41 of the valve member 45 again abuts with the annular valve seat for atmospheric air inflow control 37 so that the inflow of atmospheric air into the rear chambers 24, 26 is stopped (the valve mechanism 36 switches to its output holding action state). An increase of the advancing force on the moving walls 17, 20 and the power piston 22 also stops.

When the input applied to the input member 27 from the brake pedal 31 is reduced to a value greater than the value Fi1 in FIG. 4, the input member 27 is retracted with respect to the power piston 22 and the moving part 41 of the valve member 45 retreats with respect to the power piston 22 and moves away from the first annular valve seat for atmospheric air outflow control 38 (the valve mechanism 36 switches to its output decreasing action state), the rear chambers 24, 26 are thereby connected to the first front chamber 23 and atmospheric air inside the rear chambers 24, 26 is discharged through the first front chamber 23 by the negative pressure source. Thus, the pressure in the rear chambers 24, 26 falls and the advancing forces on the moving walls 17, 20 and the power piston 22 decrease and the moving walls 17, 20, the power piston 22 and the output member 55 retreat with respect to the housing 14. At this time, the power piston 22 retreats with respect to the input member 27 also and the first annular valve seat for atmospheric air outflow control 38 approaches the moving part 41 of the valve member 45, and the first annular valve seat for atmospheric air outflow control 38 soon abuts upon the moving part 41 of the valve member 45 and the outflow of atmospheric air from the rear chambers 24, 26 is stopped (the valve mechanism 36 switches to its output holding action state) and the decreasing of the advancing force on the moving walls 17, 20 and the power piston 22 is stopped.

The input value Fi3 shown in FIG. 4 is an input value such that the pressure in the rear chambers 24, 26 become atmospheric pressure. In the input range between the value Fi1 and the value Fi3, the change of the output applied to the master cylinder 62 from the output member 55 is greater than the change of the input applied to the input member 27.

The ratio of the output to the input is the same as the ratio of the area of the rear face of the reaction member 54 to the area of abutment between the rear face of the reaction member 54 and the front end face of the input member 27.

In FIG. 4, the output when the input is the value Fi3 is the value Fo4. When the input is further increased from the value Fi3, the output increases only by the increase in the input. In FIG. 4, the change in force per unit length of the vertical axis is greater than the change in force per unit length of the horizontal axis. If FIG. 4 had been drawn with the change in force per unit length of the vertical axis made the same as the change in force per unit length of the horizontal axis, the line showing the input-output correlation for inputs above the value Fi3 would have a gradient of 45 degrees.

When the brake pedal 31 has been depressed and the input member 27, the moving walls 17 and 20, the power piston 22 and the output member 55 have advanced with respect to the housing 14, the key member 32 is away from the rear side shell 12. When the driver then releases the brake pedal 31 to end the normal braking action, the input member 27 is made to retreat with respect to the power piston 22 by the reaction force exerted through the reaction member 54 and by the spring 59 to its retreat limit position with respect to the power piston 22, i.e. the position such that the rear face of the flange 34 abuts upon the front face of the key member 32 and the rear face of the key member 32 abuts upon the rear wall of the radial hole 33. As a result, the moving part 41 of the valve member 45 is retracted by a maximum amount with respect to the power piston 22 and the moving part 41 moves away from the first annular valve seat for atmospheric air outflow control 38 by a maximum amount (the valve mechanism 36 switches to its output decreasing action state), the atmospheric air inside the rear chambers 24, 26 is rapidly discharged through the first front chamber 23 by the negative pressure source and in correspondence with consequent rapid pressure drops in the rear chambers 24 and 26, the input member 27, the moving walls 17 and 20, the power piston 22 and the output member 55 are rapidly retracted with respect to the housing 14.

As a result of the retreat with respect to the housing 14 of the input member 27, the moving walls 17 and 20, the power piston 22 and the output member 55, soon the key member 32 abuts upon the rear side shell 12 and the retreat of the input member 27 with respect to the housing 14 is stopped. The retreat with respect to the housing 14 of the moving walls 17 and 20, the power piston 22 and the output member 55, on the other hand, continues as far as the retreat limit position of the power piston 22 with respect to the housing 14, i.e. the position such that the front side wall of the radial hole 33 of the power piston 22 abuts upon the front face of the key member 32 and the rear face of the outer portion of the key member 32 abuts upon the rear side shell 12. As a result, the first annular valve seat for atmospheric air outflow control 38 of the power piston 22 approaches the moving part 41 of the valve member 45 and a non-operating state wherein a small gap exists between the first annular valve seat for atmospheric air outflow control 38 and the moving part 41 is reached. Because the gap between the first annular valve seat for atmospheric air outflow control 38 and the moving part 41 is small, the amount of advance of the input member 27 required for the valve mechanism 36 to change from the output decreasing action state via the output holding action state to the output increasing action state at the time of the next operation is small, and thus there is little play when the brake pedal 31 is depressed and responsiveness is good.

As a result of the decrease in the force transmitted between the power piston 22 and the output member 55, the reaction member 54 returns to the state shown in FIG. 2 under its own elasticity. Also, the valve seat member 40 does not move with respect to the power piston 22 as a result of the advance and retreat of the input member 27.

When the driver steps on the brake pedal 31 suddenly to obtain an emergency braking action, the input member 27 is advanced with respect to the power piston 22 and as described above in the description of the normal braking action, the valve mechanism 36 switches from the output decreasing action state via the output holding action state to the output increasing action state, atmospheric air flows into the rear chambers 24, 26 and consequently the moving walls 17 and 20, the power piston 22 and the output member 55 start to advance with respect to the housing 14. At the same time, the electronic control unit passes current through the solenoid coil 49. Consequently, an electromagnetic attraction force arises between the plunger 52 and the yoke 50, the plunger 52 is retracted with respect to the power piston 22 and retracts the valve seat member 40 through the distance $\delta 2$, the second annular valve seat for atmospheric air outflow control 39 of the valve seat member 40 abuts upon the moving part 41 of the valve member 45 and the valve seat member 40 causes the moving part 41 to retreat with respect to the power piston 22. As a result of this operation, the moving part 41 of the valve member 45 moves away from the first annular valve seat for atmospheric air outflow control 38 of the power piston 22, but because the second annular valve seat for atmospheric air outflow control 39 of the valve seat member 40 is abutting upon the moving part 41 the rear chambers 24, 26 are kept cut off from the first front chamber 23 as the gap between the annular valve seat for atmospheric air inflow control 37 and the moving part 41 of the valve member 45 is increased by a maximum amount. Consequently, atmospheric air rapidly flows into the rear chambers 24, 26 and the pressure in the rear chambers 24, 26 rapidly rises, and the moving walls 17 and 20, the power piston 22 and the output member 55 rapidly advance with respect to the housing 14.

As a result of the power piston 22 advancing with respect to the input member 27 also, the moving part 41 of the valve member 45 approaches the annular valve seat for atmospheric air inflow control 37. Also, the reaction member 54 enters the inside of the guide member 53 and abuts upon the front end face of the input member 27 and exerts a reaction force on the input member 27. As the power piston 22 advances with respect to the input member 27, the moving part 41 soon abuts upon the annular valve seat for atmospheric air inflow control 37 and the valve mechanism 36 assumes its output holding action state. The front-rear direction position of the input member 27 with respect to the power piston 22 at this time has shifted rearward with respect to its front-rear direction position at the same time in the normal braking action by the distance obtained by subtracting the distance $\delta 3$ between the first annular valve seat for atmospheric air outflow control 38 and the second annular valve seat for atmospheric air outflow control 39 in FIG. 2 from the displacement $\delta 2$, and the amount of entry of the reaction member 54 into the guide member 53 is greater than the amount of entry during the normal braking action. In other words, the advancing force transmitted from the power piston 22 through the reaction member 54 to the output member 55 (the output applied from the output member 55 to the master cylinder 62) is greater than it is during the normal braking action and is the value Fo2 in FIG. 4.

The pressure in the rear chambers 24, 26 when the output is the value Fo2 of FIG. 4 is lower than atmospheric pressure. Therefore, when the input applied to the input member 27 is increased to a value up to the value Fi2 of FIG. 4, the input member 27 is advanced with respect to the power piston 22 and the valve mechanism 36 switches from its output holding action state to its output increasing action state and the pressure in the rear chambers 24, 26 rises and the output increases. When the power piston 22 then advances with respect to the input member 27, the valve mechanism 36 switches from its output increasing action state to its output holding action state and the increasing of the output stops. When the input to the input member 27 is decreased, the input member 27 is retracted with respect to the power piston 22 by the reaction from the reaction member 54, the valve mechanism 36 switches to its output decreasing action state, the pressure in the rear chambers 24, 26 falls and the output decreases. Then, as a result of the power piston 22 retreating with respect to the input member 27, the valve mechanism 36 switches from its output decreasing action state to its output holding action state and the decreasing of the output stops.

The output value Fo3 in FIG. 4 is the value when the pressure in the rear chambers 24, 26 has risen to atmospheric pressure, and the input at this time is the value Fi2. When the input is changed between Fi1 and Fi2, the ratio of the output to the input is the same as the ratio of the area of the rear face of the reaction member 54 to the area of abutment between the rear face of the reaction member 54 and the front end face of the input member 27. At inputs larger than the value Fi2, the output changes only by the change in the input.

When the driver releases the brake pedal 31 with a current passing through the solenoid coil 49, in the same way as when the brake pedal 31 is released in the normal braking action, the input member 27 is made to retreat with respect to the power piston 22 by the reaction exerted through the reaction member 54 and by the spring 59 to its retreat limit position with respect to the power piston 22. Consequently, the valve mechanism 36 switches to its output decreasing action state and the pressure in the rear chambers 24, 26 falls and the output decreases. As a result, the input member 27, the moving walls 17 and 20, the power piston 22 and the output member 55 are retracted with respect to the housing 14 and finally return to the non-operating state shown in FIG. 1 and FIG. 2.

When the conditions for switching off the solenoid coil 49 have been established, the electronic control unit switches off the solenoid coil 49. Consequently, the valve seat member 40 and the plunger 52 are returned by the spring 47 to the positions shown in FIG. 2.

As described above, whether the solenoid coil 49 is on or off, when the input is above the value Fi1, while the valve mechanism 36 is in the process of switching from its output increasing action state via its output holding action state to its output decreasing action state, the reaction member 54 exerts a reaction on the input member 27. Therefore, a good brake pedal operation feeling is obtained both during the normal braking action and during the emergency braking action.

If a current is erroneously passed through the solenoid coil 49 when the driver has not stepped on the brake pedal 31, the valve mechanism 36 switches from the output decreasing action state via the output holding action state to the output increasing action state and atmospheric air flows into the rear chambers 24, 26 so that the pressure in the rear chambers 24, 26 increases and the moving walls 17 and 20, the power piston 22 and the output member 55 are advanced with respect to the housing 14. However, because there is no input to the input member 27 and the input member 27 remains in the position shown in FIG. 2, as a result of the advance of the power piston 22, the moving part 41 of the valve member 45 abuts upon the second annular valve seat for atmospheric air outflow control 39 of the valve seat member 40 and the valve mechanism 36 switches to its output holding action state and consequently the inflow of atmospheric air to the rear chambers 24, 26 stops and the advancement of the moving walls 17 and 20, the power piston 22 and the output member 55 with respect to the housing 14 stops. The output at this time is relatively small. Therefore, a large braking force is not suddenly applied to the vehicle in the event of a malfunction of the electronic control unit.

Also, because the valve seat member 40 is held slidably in the front-rear direction on the inner circumferential surface of the middle part 221 of the power piston 22, smooth sliding movement of the valve seat member 40 with respect to the power piston 22 is made possible.

Also, because the input member 27 slidably abuts upon the middle part 221 of the power piston 22 by way of its sliding parts 27a, smooth sliding movement of the input member 27 with respect to the power piston 22 is made possible. Furthermore, because the valve seat member 40 has the sliding parts 27a passing through its slits 40b, smooth sliding movement of the valve seat member 40 with respect to the power piston 22 and the input member 27 is realized.

Also, although when the input member 27 is advanced the valve seat member 40 is urged forward by the spring 47, because its forward movement is limited by the guide member 53, the valve seat member 40 does not advance. And when the input member 27 retreats, the input member 27 does not urge the valve seat member 40 rearward and therefore the valve seat member 40 does not retreat. In other words, the valve seat member 40 is able to advance and retract with respect to the power piston 22 independently from the movement of the input member 27. Therefore, when the actuator 48 is operating, the annular valve seat for atmospheric air inflow control 37 and the moving part 41 can always be moved apart by a stable amount. Furthermore, wear of the abutting parts of the valve seat member 40 and the middle part 221 of the power piston 22 and of the annular seal member 46 can be suppressed.

Figure 5:
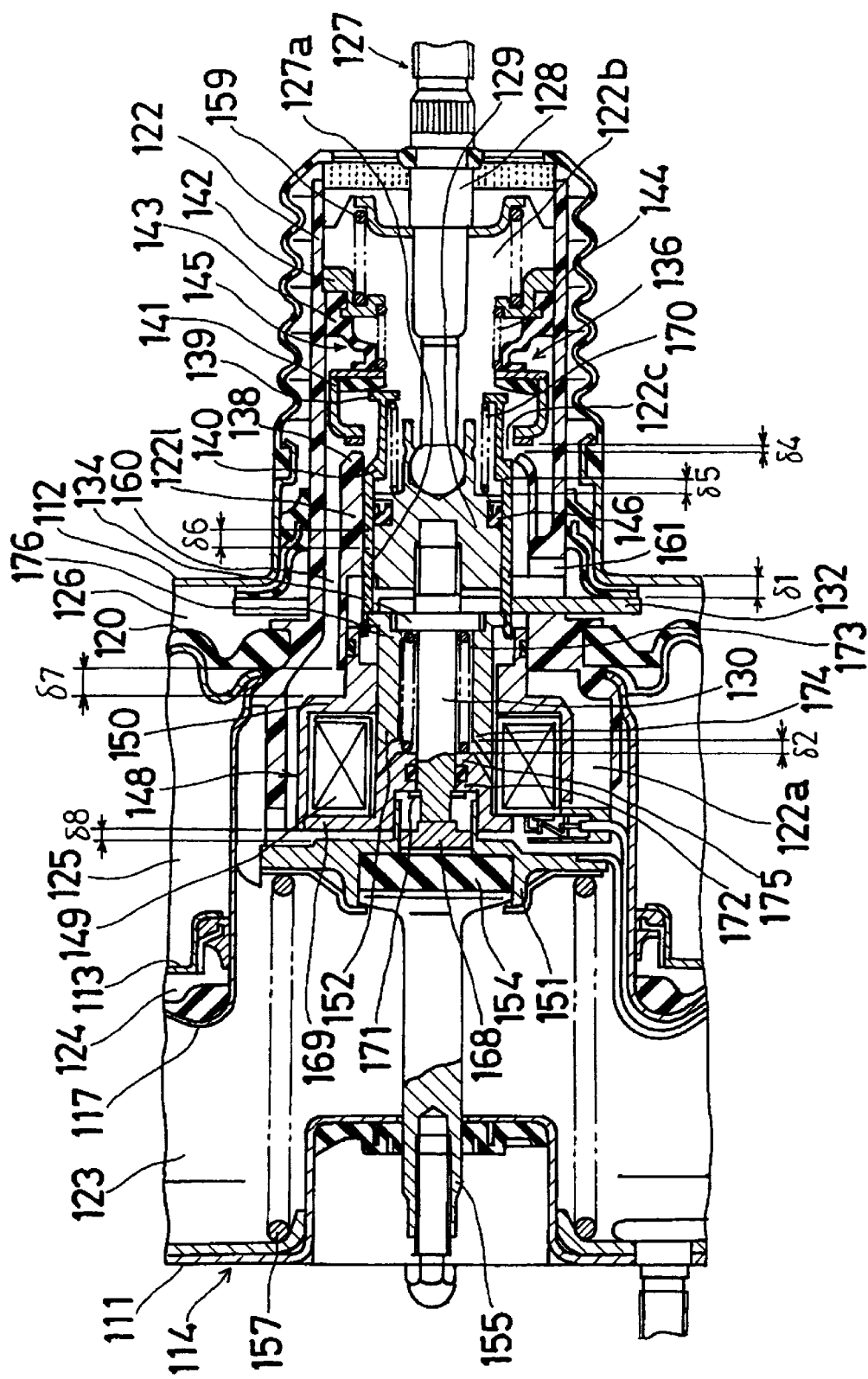
FIG. 5 is an enlarged cross-sectional view similar to FIG. 2 illustrating a portion of a tandem type vacuum brake booster for a vehicle according to a second embodiment of the present invention.

FIG. 5 is a view corresponding to FIG. 2 of a tandem type vacuum brake booster for a vehicle constituting a second embodiment of the present invention. As seen with reference to FIG. 5, the vacuum brake booster includes a front side shell 111, a rear side shell 112, a partition wall 113, a housing 114, a front side moving wall 117, a rear side moving wall 120, a power piston 122, a first front chamber 123, a first rear chamber 124, a second front chamber 125, a second rear chamber 126, a key member 132, a reaction member 154, an output member 155, a spring 159, and a return spring 157. These features correspond respectively to the front side shell 11, the rear side shell 12, the partition wall 13, the housing 14, the front side moving wall 17, the rear side moving wall 20, the power piston 22, the first front chamber 23, the first rear chamber 24, the second front chamber 25, the second rear chamber 26, the key member 32, the reaction member 54, the output member 55, the spring 59 (first urging member) and the return spring 57 in the first embodiment described above and shown in FIGS. 1 and 2.

A first space 122a is positioned inside the power piston 122 at its front end and connects with the first front chamber 123, a second space 122b is positioned inside the power piston 122 at its rear end and connects with the atmosphere, and a middle part 1221 is interposed between the first space 122a and the second space 122b. The middle part 1221 has in its center a third space 122c connecting the first space 122a to the second space 122b, a passage 160 connecting the first space 122a to the second space 122b separately from the third space 122c, and a passage 161 connecting the third space 122c to the second rear chamber 126. The passages 160, 161 correspond to the passages 60, 61 shown in FIG. 2.

An input member 127 is disposed inside the power piston 122 and passes through the first space 122a, the second space 122b and the third space 122c for advancing and retracting movement with respect to the power piston 122. This input member 127 is made up of a rear member 128, a middle member 129 having its rear end connected to the front end of the rear member 128 by a ball joint and slidably directly supported by the middle part 1221 of the power piston 122, a front member 130 having its rear end screwed into the front end of the middle member 129, and a force transmission member 168 positioned at the front end of the front member 130 for transmitting front-rear direction forces between the reaction member 154 and the front member 130. This force transmission member 168 is slidably guided by a reaction member receiver 151. The middle part of the key member 132 is positioned between a flange 134 (corresponding to the flange 34 in FIG. 2) of the front member and the front end (corresponding to the flange 35 in FIG. 2) of the middle member 129. Thus, the advance limit position and the retreat limit position of the input member 127 with respect to the power piston 122 and the retreat limit position of the input member 127 with respect to the housing 114 are the same as those described above and shown in FIG. 2.

A valve mechanism 136 is made up of an annular valve seat for atmospheric air outflow control 138 (vacuum valve seat) formed integrally with the rear part of the middle part 1221 of the power piston 122 around the rear opening of the third space 122c and pointing rearward, a valve seat member 140 having an annular valve seat for atmospheric air inflow control 139 (air valve seat) disposed radially inward of the annular valve seat for atmospheric air outflow control 138, that is in the third space 122c of the middle part 1221, for advancing and retracting movement with respect to the input member 127 and the power piston 122 and pointing rearward, and a cylindrical valve member 145. The valve member 145 has a moving part 141, which faces the annular valve seat for atmospheric air inflow control 139 and the annular valve seat for atmospheric air outflow control 138, and a fixed part 143 fixed in an airtight manner to the power piston 122 by means of a retainer 142, the moving part 141 being urged forward by a spring 144 (second urging member). A seal member 146 for maintaining an airtight seal between the middle member 129 and the valve seat member 140 is fitted around the middle member 129 of the input member 127.

The input member 127 is slidably supported in the front-rear direction on the middle part 1221 (i.e., on the power piston 122) by way of sliding parts 127a formed on its periphery. The valve seat member 140 is positioned between the input member 127 and the inner circumference of the middle part 1221 of the power piston 122, and has its outer circumferential surface slidably abutting in the front-rear direction upon the inner circumferential surface of the middle part 1221. That is, the power piston 122 has the middle part 1221 as a holding part for holding the valve seat member 140 slidably in the front-rear direction.

Inside the front part of the power piston 122, that is in the first space 122a on the front side of the middle part 1221, an actuator 148 is disposed. This actuator 148 is made up of a solenoid coil 149 mounted for advancing and retracting movement with respect to the power piston 122 and the input member 127, yokes 150, 169 made of a magnetic material and mounted for advancing and retracting movement with respect to the power piston 122 and the input member 127, and a plunger 152 made of magnetic material. The solenoid coil 149 is electrically connected by lead wires to an electronic control unit outside the housing 114. The rear end of the plunger 152 is connected to the front end of the valve seat member 140. When current is passed through the solenoid coil 149, that is when the actuator 148 is operating, an electromagnetic attraction force arises between the yoke 169 and the plunger 152.

To position the valve seat member 140 in a retreated position with respect to the input member 127 when the actuator 148 is not operating and connect the two in this retreated position so that they advance and retreat integrally, a spring 170 (third urging member) which urges the valve seat member 140 rearward with respect to the input member 127 is disposed between the middle member 129 of the input member 127 and the valve seat member 140. A first pair of abutting parts is also provided for assisting in this manner and is made up of the rear end inner periphery 176 of the plunger 152 and the front face of the flange 134 of the input member 127.

To position the valve seat member 140 in an advanced position with respect to the input member 127 when the actuator 148 is operating and connect the two in this advanced position so that they advance and retreat integrally, a second pair of abutting parts is provided and is made up of a stopper 171 fixed to the periphery of the front member 130 of the input member 127 and the front end inner periphery 172 of the yoke 169, a spring 173 (fourth urging member) is provided for urging the yoke 169 forward with respect to the input member 127, with the spring 173 being disposed between the flange 134 of the input member 127 and the yoke 169, and a third pair of abutting parts is provided and is made up of the front end 174 of the plunger 152 and the rear end inner periphery 175 of the yoke 169. The urging force of the spring 173 is greater than the urging force of the spring 170 and is also greater than the sliding resistance to sliding of the actuator 148 with respect to the power piston 122 and the input member 127. The urging force of the spring 170 is greater than the urging force of the spring 144. The distances δ5, δ6 shown in FIG. 5 are greater than the distance δ4, and the distance δ7 is greater than the distance δ1. Also, the distance δ8 shown in FIG. 5 is greater than the gap between the force transmission member 168 and the reaction member 154.

The input-output characteristics of this embodiment are the same as the characteristics shown in FIG. 4, and its operation will now be explained. The state shown in FIG. 5 is a non-operating state wherein neither a normal braking action nor an emergency braking action is being carried out. In this state: the input member 127 is positioned in its retreat limit position with respect to the housing 114; the moving walls 117 and 120, the power piston 122 and the output member 155 are positioned in their retreat limit positions with respect to the housing 114; the valve mechanism 136 is in a state such that the annular valve seat for atmospheric air inflow control 139 of the valve seat member 140, which is positioned in its retreat limit position with respect to the input member 127, abuts against the moving part 141 of the valve member 145 and moves the moving part 141 away from the annular valve seat for atmospheric air outflow control 138 of the power piston 122, in other words an output decreasing action state; and the pressure in the rear chambers 124, 126 is equal to the pressure in the front chambers 123, 124.

When a driver steps on the brake pedal to obtain a normal braking action and an input is thereby applied to the input member 127, the input member 127, the plunger 152 and the valve seat member 140 advance integrally with respect to the power piston 122 and the moving part 141 of the valve seat member 140 abuts upon the annular valve seat for atmospheric air outflow control 138 of the power piston 122, whereby the valve mechanism 136 switches to the output holding action state. At this time, a gap remains between the force transmission member 168 and the reaction member 154. Then, the annular valve seat for atmospheric air inflow control 139 moves away from the moving part 141 whereby the valve mechanism 136 switches to the output increasing action state, atmospheric air flows into the rear chambers 124, 126 and the pressure in the rear chambers 124, 126 rises, and the moving walls 117 and 120, the power piston 122 and the output member 155 start advancing integrally with respect to the housing 114. When the input is the value Fi1 of FIG. 4, the reaction member 154 abuts upon the force transmission member 168 and a reaction force corresponding to the output from the output member 155 is exerted on the input member 127. As a result of advancement of the power piston 122 with respect to the input member 127, the moving part 141 again abuts upon the annular valve seat for atmospheric air outflow control 138 and the valve mechanism 136 switches to its output holding action state and the output becomes the value Fo1 in FIG.4.

After that, when the input applied to the input member 127 rises and falls between the value Fi1 and the value Fi3 of FIG. 4, the valve mechanism 136 switches between the output increasing action state, the output holding action state and the output decreasing action state and an output of value Fo1 to Fo4 corresponding to the input of value Fi1 to Fi3 is thereby outputted through the output member 155. When the input has been increased to above Fi3 the output increases only by the increase of the input. When the input applied to the input member 127 is above the value Fi1, in the same way as in the embodiment shown in FIG. 1 and FIG. 2, a reaction force is exerted on the input member 127 through the reaction member 154 by way of the force transmission member 168.

When the input applied to the input member 127 is removed, by virtue of the reaction force exerted on the input member 127 through the reaction member 154 and by the spring 159, the input member 127 is retracted to its retreat limit position with respect to the power piston 122 and the valve mechanism 136 switches to its output decreasing action state. Consequently, atmospheric air is discharged from the rear chambers 124, 126 and the pressure in the rear chambers 124, 126 falls and the moving walls 117 and 120, the power piston 122, the input member 127 and the output member 155 start to retreat integrally with respect to the housing 114 and finally are returned to the positions shown in FIG. 5.

When the driver steps on the brake pedal suddenly to obtain an emergency braking action and an input is applied to the input member 127, as the advance of the input member 127 with respect to the power piston 122 causes the valve mechanism 136 to switch from its output decreasing action state via its output holding action state to its output increasing action state the electronic control unit switches on the solenoid coil 149. The electromagnetic attraction force produced by the current passing through the solenoid coil 149 causes the plunger 152 to advance with respect to the input member 127 and the valve seat member 140 is shifted to an advanced position with respect to the input member 127. As a result, the annular valve seat for atmospheric air inflow control 139 moves further away from the moving part 141 than during the normal braking action and atmospheric air flows rapidly into the rear chambers 124 and 126 and the moving walls 117 and 120, the power piston 122 and the output member 155 integrally start to advance rapidly with respect to the housing 114.

After that, the reaction member 154 abuts upon the force transmission member 168 and exerts on the input member 127 a reaction corresponding to the output, and the advance of the power piston 122 with respect to the input member 127 causes the moving part 141 to again abut with the annular valve seat for atmospheric air inflow control 139 so that the valve mechanism 136 switches to its output holding action state, but because the front-rear direction position of the input member 127 with respect to the power piston 122 at which the valve mechanism 136 assumes its output holding action state has shifted rearward by a predetermined distance (δ2) compared to that during the normal braking action, the output with respect to the input value Fi1 of FIG. 4 becomes the value Fo2 of FIG. 4. After that, when the input applied to the input member is increased and decreased between the value Fi1 and the value Fi2 of FIG. 4, the valve mechanism 136 switches between the output increasing action state, the output holding action state and the output decreasing action state and an output value Fo2 to Fo3 of a size corresponding to the input value Fi1 to Fi2 is thereby outputted through the output member 155. When the input has been increased to above Fi2 the output increases only by the increase of the input. When the input applied to the input member 127 is above the value Fi1, in the same way as in the normal braking action, a reaction force is applied through the reaction member 154 to the input member 127 by way of the force transmission member 168.

When the input applied to the input member 127 is removed with the actuator 148 operating, by virtue of the reaction applied to the input member 127 through the reaction member 154 and by virtue of the spring 159, the input member is retracted to its retreat limit position with respect to the power piston 122 and the valve mechanism switches to its output decreasing action state, and consequently atmospheric air in the rear chambers 124, 126 is discharged, the pressure in the rear chambers 124,126 falls and the moving walls 117 and 120, the power piston 122, the input member 127 and the output member 155 start to retreat integrally with respect to the housing 114 and finally are returned to the positions of FIG. 5.

Even if the actuator 148 is erroneously operated when no input is being applied to the input member 127, because only a small output is produced, strong braking is not applied suddenly.

In FIG. 5, the distance δ5 can be made smaller than the distance δ2 with the advanced position of the valve seat member 140 with respect to the input member then being defined by abutment of the middle member 129 with the valve seat member 140, and also the distance δ7 can be made smaller than the distance δ1 with the retreat limit position of the input member 127 with respect to the power piston 122 then being defined by abutment of the yoke 150 with the power piston 122.

A third embodiment of the vacuum type brake booster according to the present invention is illustrated in FIGS.

6–8. The parts of the vacuum type brake booster according to the third embodiment that are the same as the parts of the vacuum type brake booster shown in FIGS. 1 and 2 are identified with the same reference numerals. Other than the reaction member 54, the construction of the vacuum type brake booster according to the third embodiment is generally the same as that of the first embodiment and so a description of all of such features will not be repeated again.

The atmospheric air valve member 41a and the negative pressure valve member 41b are provided on the moving part 41. The annular seal member 46 for maintaining an airtight seal between the rear end part of the valve seat member 40 and the power piston 22 is fitted around the rear end part of the valve seat member 40. The valve seat member 40 is urged forward by the spring 47 that is disposed between the valve seat member 40 and the flange 34.

Figure 6:
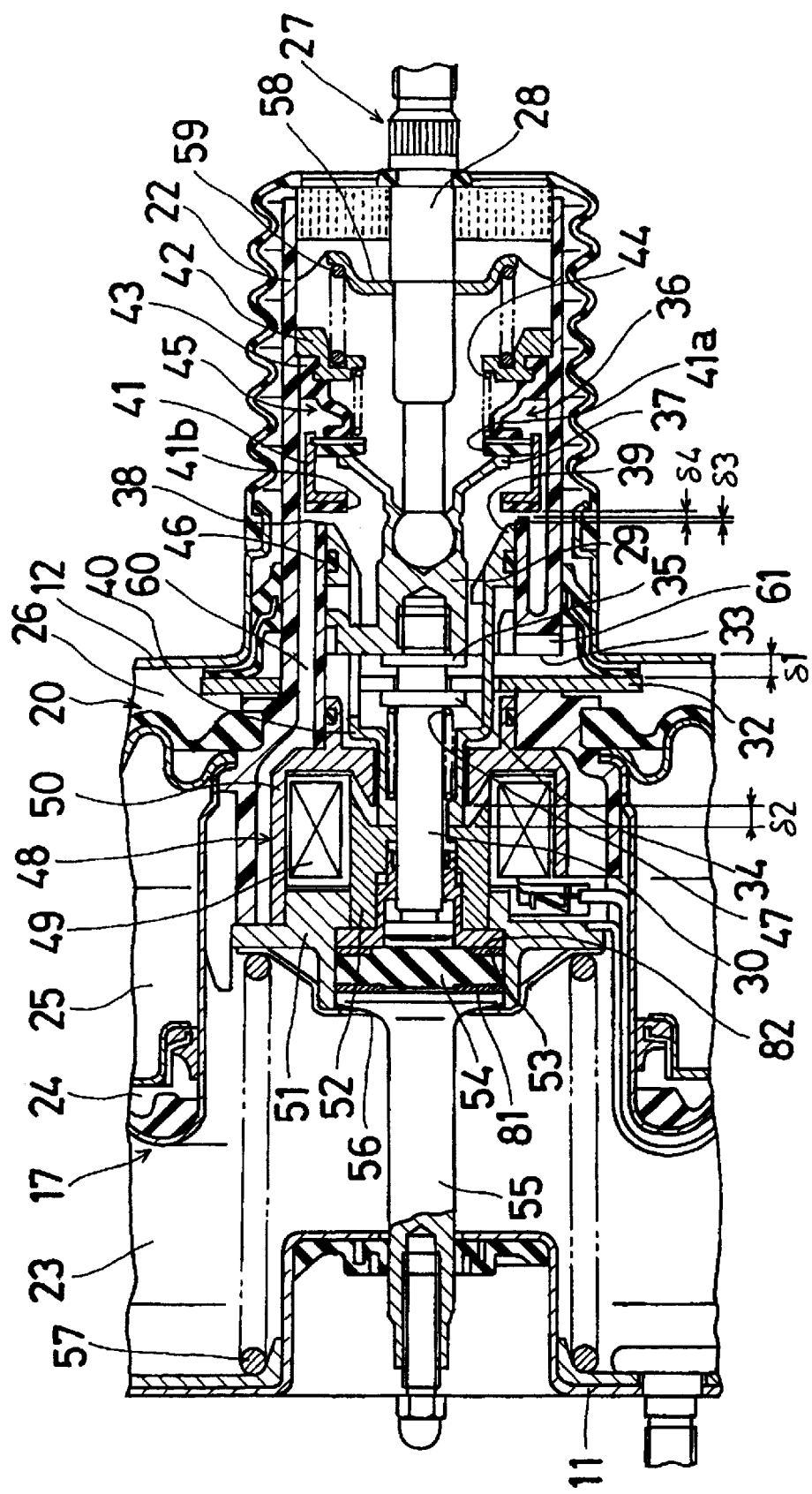
FIG. 6 is an enlarged cross-sectional view of a portion of a tandem type vacuum brake booster for a vehicle according to a third embodiment of the present invention.

When the solenoid coil 49 is not on (i.e., when the actuator 48 is not operational), the valve seat member 40 is held by the spring 47 in the position shown in FIG. 6 such that the front end face of the valve seat member 40 abuts upon the plunger 52 and the front end face of the plunger 52 abuts upon the guide member 53 in a fixed relationship with the yoke reaction member receiver 51 while the front end part of the front member 30 of the input member 27 is slidably guided by the plunger 52. Also, the second negative pressure valve seat 39 of the valve seat member 40 is positioned forward (i.e., to the left) of the first negative pressure valve seat 38 of the power piston 22 by a distance $\delta 3$.

Figure 7:
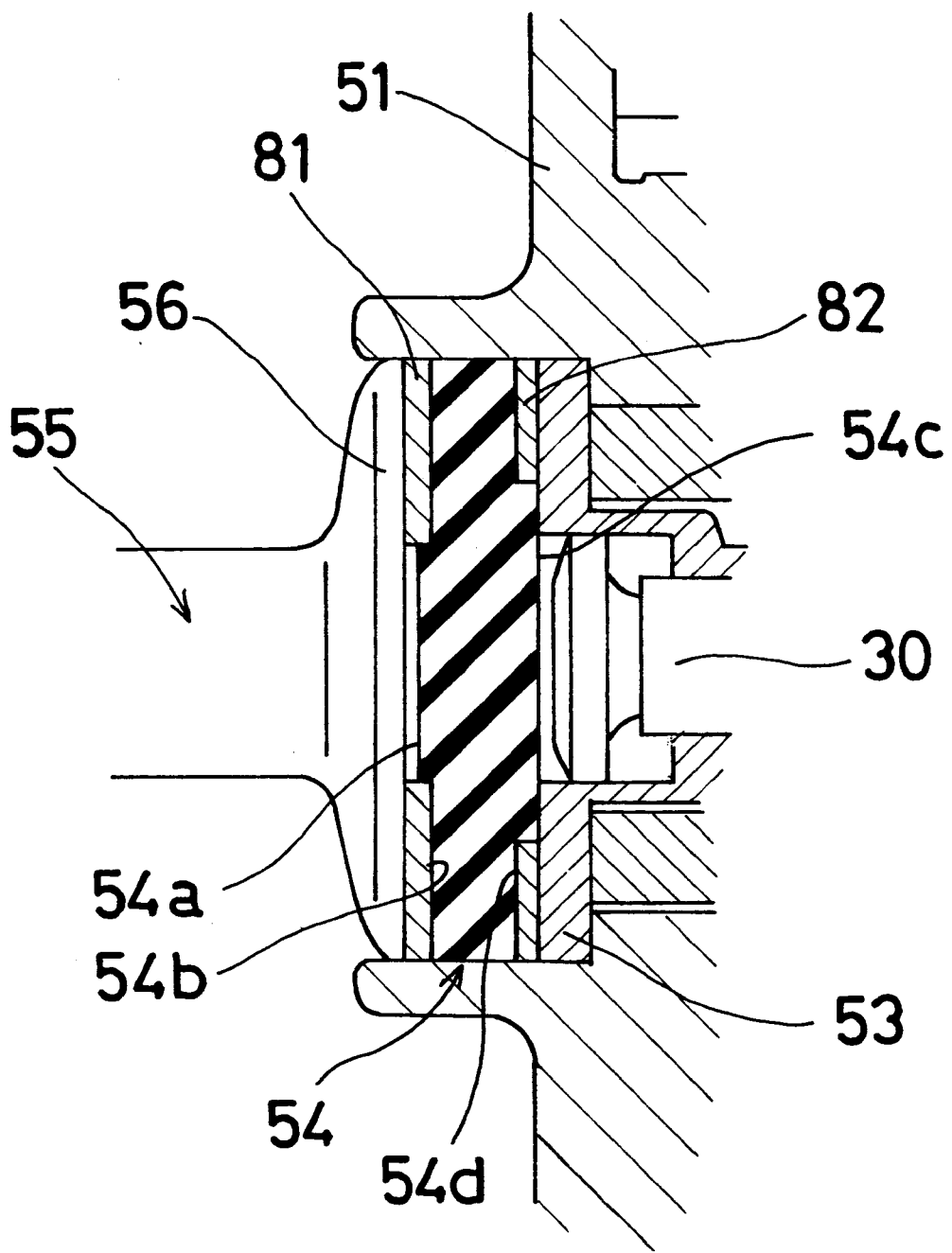
FIG. 7 is an enlarged cross-sectional view of the reaction member forming a portion of the tandem type vacuum brake booster shown in FIG. 6.

FIG. 7 is an enlarged cross-sectional view of the portion of the vacuum type brake booster in the area of the reaction member 54 shown in FIG. 6. As shown in FIG. 7, the reaction member 54 has a step in its front end face that defines a disc-shaped first front end face portion 54a and an annular second front end face portion 54b positioned rearward of the first front end face portion 54a in encircling relation to the first front end face portion 54a. Thus, the first front end fact portion 54a is located forwardly of the second front end face portion 54b. The reaction member 54 also has a step in its rear end face that defines a disc-shaped first rear end face portion 54c and an annular second rear end face portion 54d positioned forward of the first rear end face portion 54c in encircling relation to the first rear end face portion 54c.

The reaction member 54 is also provided with an annular first plate 81 in the form of a rigid member adhered to the second front end face portion 54b and an annular second plate 82 also in the form of a rigid member adhered to the second rear end face portion 54d. The first and second plates 81, 82 are more rigid than the reaction member 54. The step between the first front end face portion 54a and the second front end face portion 54b is smaller than the thickness of the first plate 81 so that the first plate extends axially beyond the first front end face portion 54a. The step between the first rear end face portion 54c and the second rear end face portion 54d is substantially equal to the thickness of the second plate 82 so that the exposed surface of the second plate 82 is substantially flush with the first rear end face portion 54c.

By virtue of the foregoing construction, the front end face of the reaction member 54 abuts against the rear end part 56 of the output member 55 by way of the first plate 81 and the peripheral part of the rear end face of the reaction member 54 including the second rear end face portion 54d and the peripheral part of the first rear end face portion 54c abuts against the power piston 22 by way of the yoke reaction member receiver 51, the guide member 53 and the second plate 82. Also, the central part of the reaction member 54, that is the central part of the first rear end face portion 54c, is able to abut against the front end of the input member 27.

Figure 8:
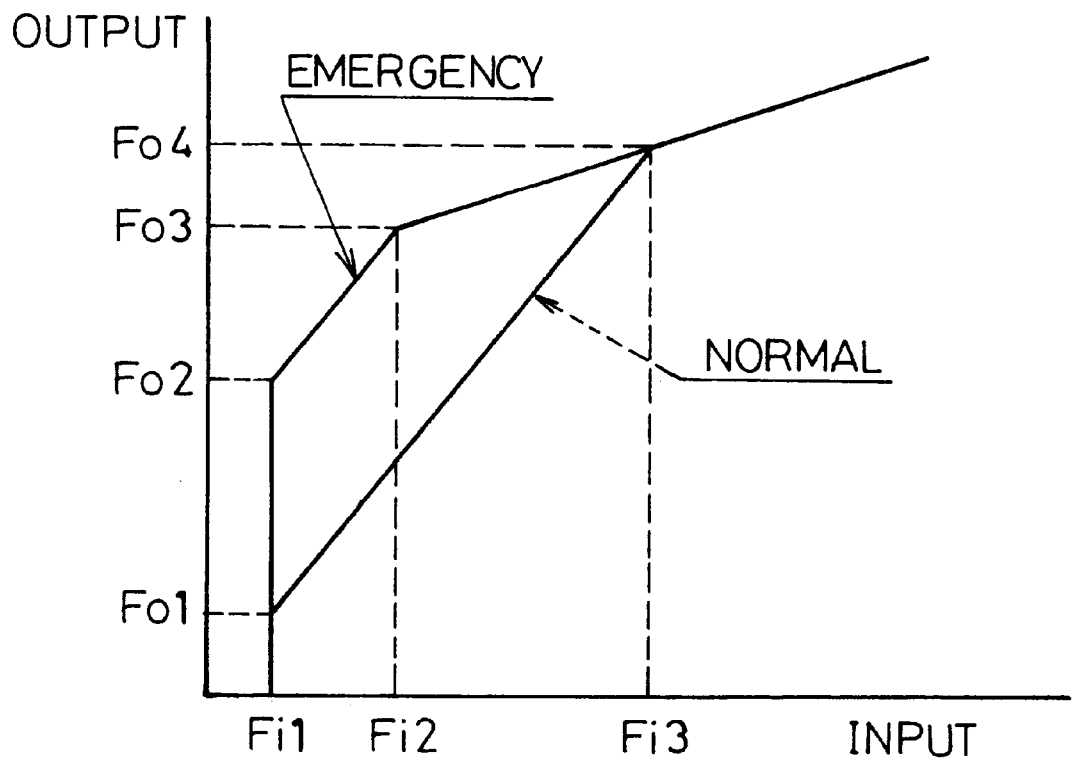
FIG. 8 is a graph depicting input-output, characteristics of the vacuum brake booster shown in FIG. 6.

When the driver suddenly depresses the brake pedal 31 with an input Fi1 to obtain an emergency braking action, in the same way as in the normal braking action, the input member 27 is advanced with respect to the power piston 22. The valve mechanism 36 switches from the output decreasing action state via the output holding action state to the output increasing action state and an output Fo1 is outputted as seen in FIG. 8. The valve mechanism 36 then assumes its output holding action state.

Along with this operation of the brake pedal 31, the electronic control unit operates the actuator 48 by passing current through the solenoid coil 49. The timing with which the operation of the actuator 48 is started in this embodiment is the timing at which the valve mechanism 36 assumes its output holding action state after the brake is operated and the output Fo1 is outputted.

When current is passed through the solenoid coil 49, an electromagnetic attraction force arises between the plunger 52 and the yoke 50, and the plunger 52 is retracted through the distance $\delta 2$ with respect to the power piston 22 to thereby retract the valve seat member 40 through the distance $\delta 2$. The second negative pressure valve seat 39 of the valve seat member 40 abuts upon the negative pressure valve member 41b of the moving part 41 of the valve member 45, and the valve seat member 40 causes the moving part 41 to retreat with respect to the power piston 22. As a result of this operation, the negative pressure valve member 41b of the moving part 41 of the valve member 45 is moved away from the first negative pressure valve seat 38 of the power piston 22, but because the second negative pressure valve seat 39 of the valve seat member 40 abuts against the atmospheric air valve member 41a of the moving part 41, the rear chambers 24, 26 are kept cut off from the front fixed pressure chamber 23 as the atmospheric air valve seat 37 and the atmospheric air valve member 41a of the moving part 41 of the valve member 45 move apart through the distance $\delta 2-\delta 3$.

Consequently, as a result of the operation of the actuator 48, atmospheric air flows rapidly into the rear chambers 24, 26 and the pressure in the rear chambers 24, 26 rapidly rises. The moving walls 17, 20, the power piston 22 and the output member 55 thus rapidly advance with respect to the housing 14. That is, the output is increased to Fo2 as seen in the graph of FIG. 8. In other words, a second thrust force arises in the power piston 22 and an auxiliary output of Fo2−Fo1 is applied to the output member 55, and the brake booster 10 outputs a force Fo2 which is the sum of the main output Fo1 and the auxiliary output Fo2−Fo1.

As the power piston 22 advances with respect to the housing 14, the power piston 22 also advances with respect to the input member 27. Consequently, the atmospheric air valve member 41a of the moving part 41 of the valve member 45 approaches the annular valve seat for atmospheric air inflow control 37. Also, as a result of the advance of the power piston 22, the reaction member 54 is compressed by the power piston 22 and the output member 55 so that the reaction member 54 elastically deforms. The central part of the rear end face of the reaction member 54 swells or deforms axially outwardly into the guide member 53 to reduce the gap between that central part and the front end face of the input member 27. Eventually, the swelled or deformed part of the reaction member 54 abuts against the front face of the front end part of the input member 27 so that the reaction member 54 transmits the advancing force of the power piston 22 and the advancing force of the input member 27 to the output member 55 and also exerts a reaction force on the input member 27 corresponding to the output from the output member 55, thus tending to make the input member 27 retreat with respect to the power piston 22.

As a result of the advance of the power piston 22 with respect to the housing 14 and the retreat of the input member 27 with respect to the power piston 22, the power piston 22 advances with respect to the input member 27, and consequently the atmospheric air valve member 41a of the moving part 41 soon abuts upon the atmospheric air valve seat 37 and the valve mechanism 36 assumes its output holding action state. The distance through which the input member 27 retreats by the reaction force from the reaction member 54 at this time is about equal to δ2−δ3.

When the output reaches the value Fo2 in FIG. 8, the pressure in the rear chambers 24, 26 is lower than atmospheric pressure. Therefore, when the force Fo2 is being outputted and the valve mechanism 36 assumes the output holding action state, if the input applied to the input member 27 is increased to a value up to the value Fi2 in the graph of FIG. 8, the input member 27 is advanced with respect to the power piston 22, the atmospheric air valve seat 37 moves away from the atmospheric air valve member 41a and the valve mechanism 36 switches from the output holding action state to the output increasing action state. The pressure in the rear chambers 24, 26 thus rises and the output increases. Then as the power piston 22 advances with respect to the input member 27, the atmospheric air valve seat 37 and the atmospheric air valve member 41a abut against each other once again and the valve mechanism 36 switches from the output increasing action state to the output holding action state and further increase in the output stops.

When, after the input has increased to a value up to the value Fi2 and the valve mechanism 36 has assumed the output holding action state, the input to the input member 27 is decreased, the input member 27 retreats with respect to the power piston 22 by the reaction force from the reaction member 54. As the input member 27 retreats, the moving part 41 retreats and the second negative pressure valve seat 39 and the moving part 41 move away from each other, the valve mechanism 36 switches to the output decreasing action state and the pressure in the rear chambers 24, 26 falls and the output decreases. Then, as a result of the power piston 22 retreating with respect to the input member 27, the second negative pressure valve seat 39 and the negative pressure valve member 41b abut against each other and the valve mechanism 36 switches from its output decreasing action state to its output holding action state, and further decrease in the output stops.

The output value Fo3 in the graph shown in FIG. 8 is the output value when the pressure in the rear chambers 24, 26 has risen to atmospheric pressure, and the input at this time is the value Fi2. When the input is changed between the value Fi1 and the value Fi2, the ratio of the output to the input is the same as the ratio of the area of the rear face of the reaction disc 54 to the area of abutment of the rear face of the reaction member 54 with the front end face of the input member 27. At inputs above the value Fi2, the output changes only by the change in the input.

When the driver releases the brake pedal 31 with a current being passed through the solenoid coil 49, in the same way as when the brake pedal 31 is released in the normal braling action, the input member 27 retreats with respect to the power piston 22 by the reaction force applied to the input member 27 through the reaction member 54 and by the spring 59. As a result, the valve mechanism 36 switches to its output decreasing action state and the pressure in the rear chambers 24, 26 falls and the output decreases. Consequently, the input member 27, the moving walls 17 and 20, the power piston 22 and the output member 55 are retracted with respect to the housing 14 and finally return to the non-operating state shown in FIG. 6 and FIG. 7.

When conditions for switching off the solenoid coil 49 have been established, the electronic control unit switches off the solenoid coil 49. Consequently, the valve seat member 40 and the plunger 52 are returned by the spring 47 to the positions shown in FIG. 6.

In the vacuum type brake booster 10 of this embodiment, as a result of the plates 81, 82 provided on the reaction member 54, elastic deformation of the reaction member 54 is suppressed more than that of a reaction member in a conventional vacuum brake booster, and the amount of swelling or deformation of the reaction member 54 into the guide member 53 is reduced. This suppression of the elastic deformation of the reaction member 54 by the plates 81, 82 involves the elastic deformation of the second front end face portion 54b toward the first front end face portion 54a and the second rear end face portion 54d toward the first rear end face portion 54c being suppressed by the plates 81, 82, with the amount of swelling of the central part of the first rear end face portion 54c toward the guide member 53, i.e. rearward, consequently being reduced.

Stated differently, comparing the vacuum type brake booster of known construction to the vacuum type brake booster of the present invention, if the same second thrust force is received from the power piston and the same reaction force is consequently exerted on the input member, the amount by which the central part of the reaction member swells or deforms rearward to cause the input member to retreat will be smaller in the case of the reaction member of the present invention. Thus, to obtain the same auxiliary output as in the case of other known vacuum type brake boosters, in the operation of the actuator 48 in the present invention, the amount of movement of the plunger 52 can be reduced as compared to other known vacuum type brake boosters and so it is possible to make the actuator 48 more compact. It is thus possible, by suppressing the elastic deformation of the reaction member 54, to reduce the size of the vacuum brake booster 10. Also, because the first plate 81 and the second plate 82 are provided, the elastic deformation of the reaction member 54 can be effectively suppressed.

Also, because a gap is formed between the rear end part 56 of the output member 55 and the first front end face portion 54a of the reaction member 54 as a result of the first plate 81 being provided on the reaction member 54, when the reaction member 54 receives the thrust force from the power piston 22 and is sandwiched between the output member 55 and the power piston 22 and elastically deforms, the first front end face portion 54a swells out or deforms into the gap between the rear end part 56 of the output member 55 and the first front end face portion 54a. Thus, swelling or deformation of the central part of the first rear end face portion 54c of the reaction member 54 into the guide member 53 can thereby be further suppressed.

In this embodiment of the present invention, the first negative pressure valve seat 38 and the atmospheric air valve seat 37 are disposed in displaced relation from each other in the front-rear direction, and the negative pressure valve member 41b and the atmospheric air valve member 41a facing the first negative pressure valve seat 38 and the atmospheric air valve seat 37 respectively are also displaced from each other in the front-rear direction. However, it is to be understood that the invention is not particularly limited to this construction. For example, similar affects can be obtained in a vacuum booster according to the present invention in which the first negative pressure valve seat and the atmospheric air valve seat are disposed in substantially the same plane, and the negative pressure valve member and the atmospheric air valve member are disposed in substantially the same plane.

Figure 9:
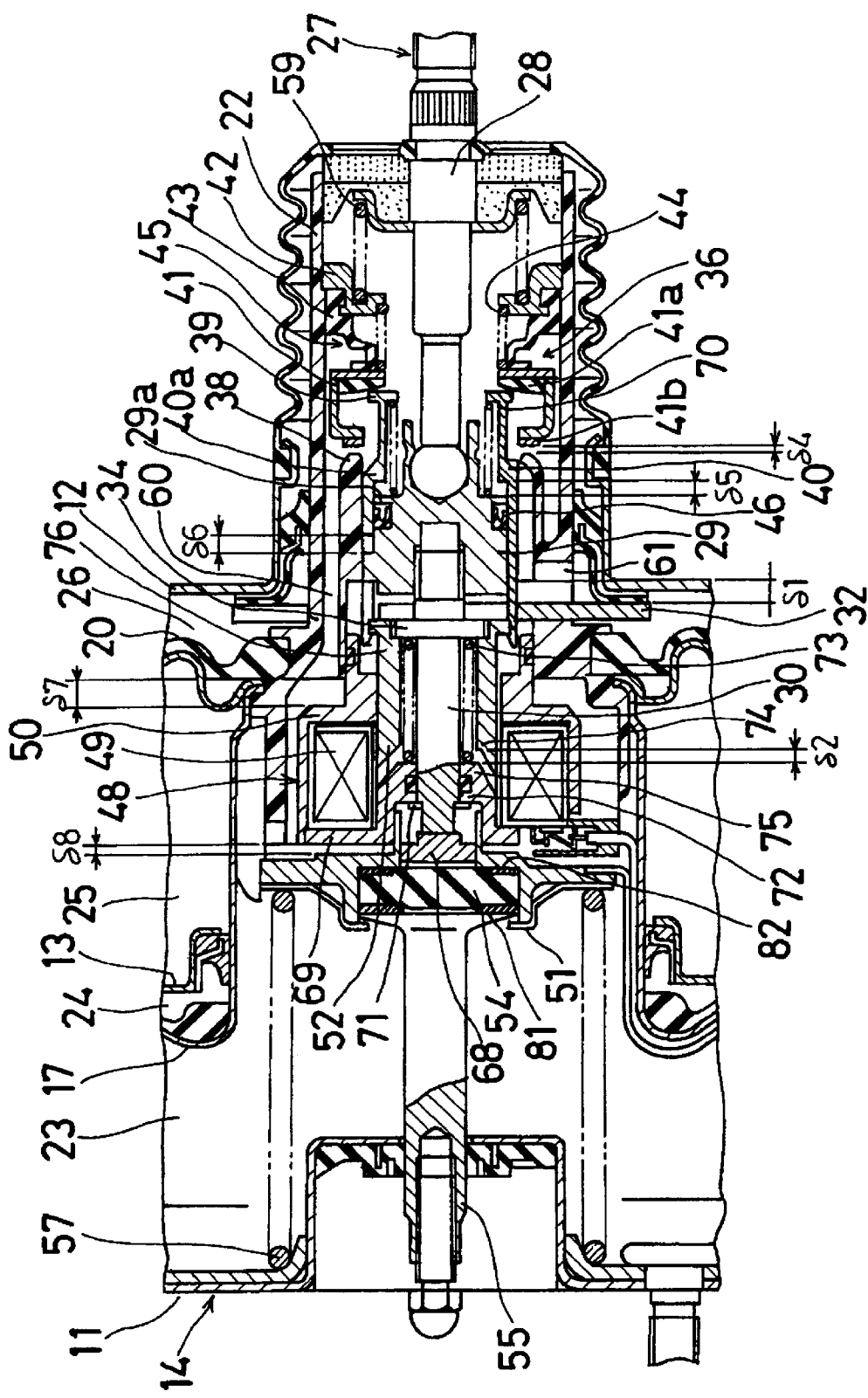
FIG. 9 is an enlarged cross-sectional view of a portion of a tandem type vacuum brake booster for a vehicle according to a fourth embodiment of the present invention.

FIG. 9 is a cross-sectional view of a portion of a tandem type vacuum brake booster for a vehicle according to a fourth embodiment of the present invention. The illustrated portion of the booster is in the area of the valve mechanism and the actuator.

The parts of the booster that are similar to those in the above-described embodiments are designated with the same reference numerals. The vacuum booster 10 of this fourth embodiment involves the use of the reaction member 54 shown in FIGS. 6 and 7 disposed in the vacuum booster 10 of the second embodiment shown in FIG. 5. The construction of the reaction member 54 is the same as that of the third embodiment shown in FIGS. 6 and 7 and the construction of the booster other than the reaction member 54 is generally the same as that of the second embodiment depicted in FIG. 5. Consequently a detailed description of the various features will not be repeated here. It is to be noted that the features of the brake booster shown in FIG. 9, other than the reaction member 54, are designated with reference numerals corresponding to those used in the embodiment shown in FIG. 5, except that in the embodiment of FIG. 9 two digit reference numerals are used rather than three digit reference numerals (i.e., the first digit "1" used in the three digit reference numerals of the FIG. 5 embodiment have been left out in the reference numerals used in the FIG. 9 embodiment).

In connection with the embodiment shown in FIG. 9, when the driver suddenly depresses the brake pedal with an input Fi1 (see FIG. 8) to obtain an emergency braking action, in the same way as in the normal braking action, the input member 27 is advanced with respect to the power piston 22 and the valve mechanism 36 switches from the output decreasing action state, via the output holding action state, to the output increasing action state. The output Fo1 is thus outputted and the valve mechanism 36 then assumes its output holding action state.

Along with this operation of the brake pedal, the electronic control unit operates the actuator 48 by passing current through the solenoid coil 49. The timing with which the operation of the actuator 48 is started in this embodiment is the timing at which the valve mechanism 36 assumes its output holding action state after the brake pedal is operated and the output Fo1 is outputted.

When current passes through the solenoid coil 49, an electromagnetic attraction force arises between the plunger 52 and the yoke 69, and the plunger 52 is advanced through the distance δ2 with respect to the power piston 22 so that the valve seat member 40 is advanced through the distance δ2. The atmospheric air valve seat 37 of the valve seat member 40 is thus moved away from the atmospheric air valve member 41a of the moving part 41 of the valve member 45. As the plunger 52 and the valve seat member 40 advance, the front end part 74 of the plunger 52 abuts against the rear end part 75 of the yoke 69, and the abutting part 40a of the valve seat member 40 abuts against the abutting part 29a of the middle member 29. Rearward movement of the valve seat member 40 with respect to the input member 27 is thereby limited. As a result of this operation, the atmospheric air valve seat 37 and the atmospheric air valve member 41a of the moving part 41 of the valve member 45 are moved apart by the distance δ2.

Consequently, as a result of the operation of the actuator 48, atmospheric air flows rapidly into the rear chambers 24, 26 and the pressure in the rear chambers 24, 26 rapidly rises and the moving walls 17, 20, the power piston 22 and the output member 55 rapidly advance with respect to the housing 14. That is, the output is increased to Fo2 as shown in FIG. 8. In other words, a first thrust force on the power piston 22 arising as a result of the brake being operated at the input Fi1 is exerted through the output member 55 as an output Fo1. A second thrust force also arises in the power piston 22 as a result of the actuator 48 being operated and an auxiliary output of Fo2−Fo1 is applied to the output member 55. The brake booster thus outputs a force Fo2 which is the sum of the main output Fo1 and the auxiliary output Fo2−Fo1.

As the moving walls 17, 20 and the power piston 22 advance with respect to the housing 14, the power piston 22 advances with respect to the input member 27 also, and consequently the atmospheric air valve member 41a of the moving part 41 of the valve member 45 approaches the annular valve seat for atmospheric air inflow control 39. Also, as a result of the advance of the power piston 22 the reaction member 54 is compressed by the power piston 22 and the output member 55 and elastically deforms. Consequently, the central part of the reaction member 54 swells or deforms out into the reaction member receiver 51 so as to reduce the gap between that central part and the force transmission member 68, in other words swells out rearwardly, and eventually abuts against the front face of the force transmission member 68 so that the reaction member 54 transmits the advancing force of the power piston 22 and the advancing force of the input member 27 to the output member 55 and exerts a reaction force on the input member 27 corresponding to the output from the output member 55 so as to tend to make the input member 27 retreat with respect to the power piston 22.

As a result of the advance of the power piston 22 with respect to the housing and the retreat of the input member 27 with respect to the power piston 22, the power piston 22 advances with respect to the input member 27, and consequently the atmospheric air valve member 41a of the moving part 41 soon abuts upon the atmospheric air valve seat 39 and the valve mechanism 36 assumes its output holding action state. The distance through which the input member 27 is made to retreat by the reaction force from the reaction member 54 at this time is approximately δ2.

When the output is at the value Fo2 in FIG. 8, the pressure in the rear chambers 24, 26 is lower than atmospheric pressure. Therefore, when the force Fo2 is being outputted and the valve mechanism 36 assumes the output holding action state, if the input applied to the input member 27 is increased to a value up to the value Fi2 of FIG. 8, the input member 27 is advanced with respect to the power piston 22, the atmospheric air valve seat 39 moves away from the atmospheric air valve member 41a and the valve mechanism 36 switches from the output holding action state to the output increasing action state and the pressures of the rear chambers 24, 26 rise and the output increases. Then as the power piston 22 advances with respect to the input member 27 the atmospheric air valve seat 37 and the atmospheric air valve member 41a abut upon each other and the valve mechanism 36 switches from the output increasing action state to the output holding action state and the increasing of the output stops.

When after the input has been increased to a value up to the value Fi2 and the valve mechanism 36 has assumed the output holding action state the input to the input member 27 is decreased, the input member 27 is made to retreat with respect to the power piston 22 by the reaction from the reaction member 54, as the input member 27 retreats the moving part 41 retreats and the negative pressure valve seat 38 and the moving part 41 move away from each other, the valve mechanism 36 switches to the output decreasing action state and the pressures of the rear chambers 24, 26 fall and the output decreases. Then, as a result of the power piston 22 retreating with respect to the input member 27, the negative pressure valve seat 38 and the negative pressure valve member 41b abut upon each other and the valve mechanism 36 switches from its output decreasing action state to its output holding action state and the decreasing of the output stops.

The output value Fo3 in FIG. 8 is the output value when the pressure in the rear chambers 24, 26 has risen to atmospheric pressure, and the input at this time is the value Fi2. When the input is changed between the value Fi1 and the value Fi2, the ratio of the output to the input is the same as the ratio of the area of the rear face of the reaction disc 54 to the area of abutment of the rear face of the reaction member 54 with the front face of the force transmission member 68. At inputs above the value Fi2, the output changes only by the change in the input.

When the driver releases the brake pedal with current being supplied to the solenoid coil 49, in the same way as when the brake pedal is released in the normal braking action, the input member 27 and the valve seat member 40 and the actuator 48 engaged with the input member 27 are made to retreat with respect to the power piston 22 by the reaction applied to them through the reaction member 54 and by the spring 59. As a result, the valve mechanism 36 switches to its output decreasing action state and the pressure in the rear chambers 24, 26 falls and the output decreases. The input member 27, the moving walls 17, 20, the power piston 22 and the output member 55 are thus retracted with respect to the housing 14 and finally return to the non-operating state shown in FIG. 9.

When the conditions for switching off the solenoid coil 49 have been established, the electronic control unit switches off the solenoid coil 49. Consequently, the valve seat member 40 and the plunger 52 are returned by the spring 70 to the positions shown in FIG. 9 and the operation of the actuator 48 is thus ended.

Other operations and effects of this embodiment of the present invention are similar to those discussed above in connection with the first embodiment.

In this embodiment illustrated in FIG. 9, the first negative pressure valve seat 38 and the atmospheric air valve seat 39 are disposed in displaced relation from each other in the front-rear direction. The negative pressure valve member 41b and the atmospheric air valve member 41a facing the first negative pressure valve seat 38 and the atmospheric air valve seat 37 respectively are also displaced from each other in the front-rear direction. However, the present invention is not particularly limited to this construction and other arrangements are possible. For example similar results can be achieved by disposing the first negative pressure valve seat and the atmospheric air valve seat in substantially the same plane, and by disposing the negative pressure valve member and the atmospheric air valve member in substantially the same plane.

Figure 10:
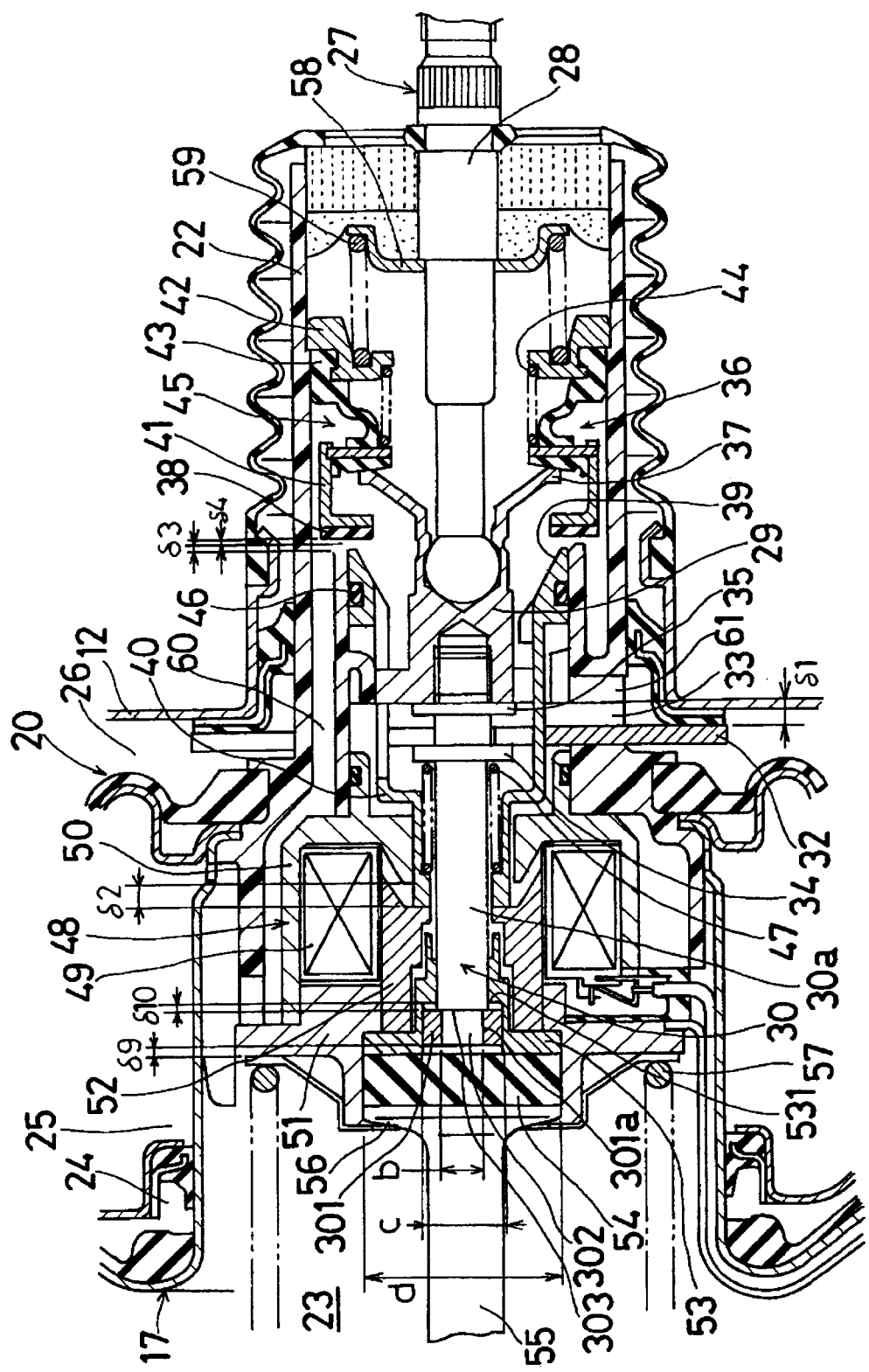
FIG. 10 is an enlarged cross-sectional view of a portion of a tandem type vacuum brake booster for a vehicle according to a fifth embodiment of the present invention.
Figure 11:
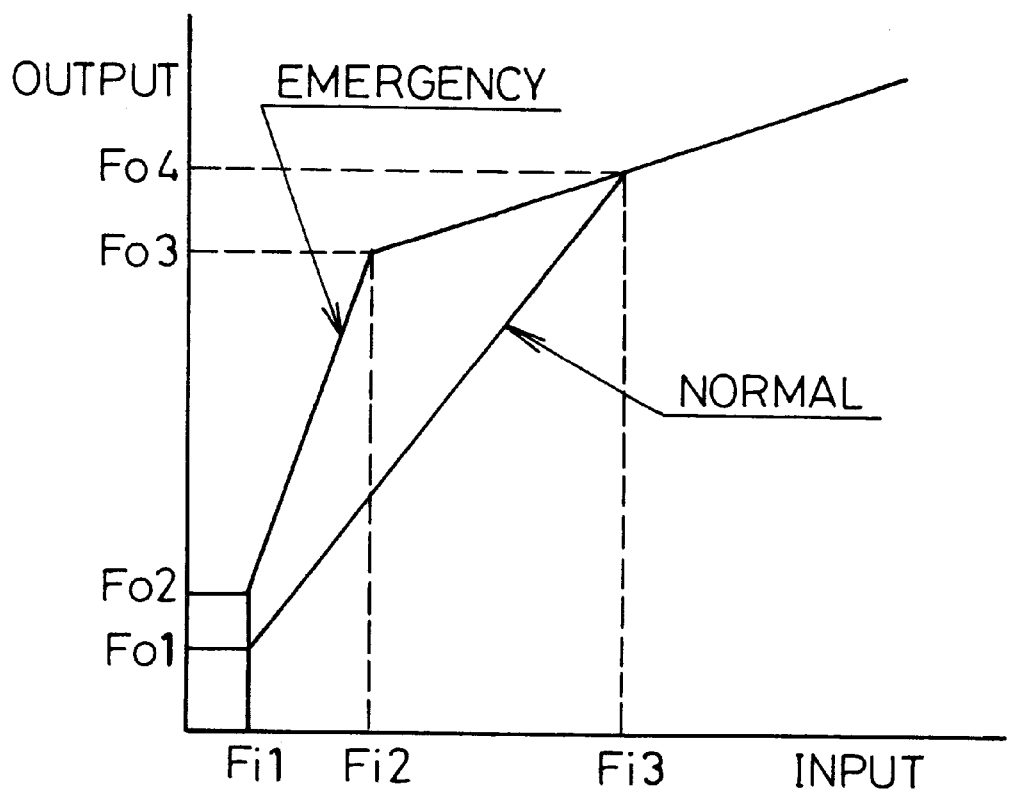
FIG. 11 is a graph depicting input-output characteristics of the vacuum brake booster shown in FIG. 10.

A fifth embodiment of the vacuum type brake booster according to the present invention is illustrated in FIGS. 10 and 11. The parts of the vacuum type brake booster according to this fifth embodiment that are the same as the parts of the vacuum type brake booster shown in FIGS. 1 and 2 are identified with the same reference numerals. The construction of the vacuum brake booster 10 of this embodiment is substantially the same as that of the vacuum brake booster 10 of the first embodiment, except for the input member 27, and so a detailed description of the corresponding features will not be repeated in entirety here.

The front member 30 has an annular first abutting part 301 capable of abutting at its front end upon a reaction disc 54 which will be further discussed later and a solid cylindrical second abutting part 302. The front member 30 is thus made up of the first abutting part 301, a main part 30a comprising the second abutting part 302, and flanges 34, 35. The second abutting part 302 is inserted into a center hole 301a of the first abutting part 301 so as to be slidable in the axial direction of the center hole 301a (the left-right direction in FIG. 10).

A shoulder 303 serving as a first limiting part having a diameter larger than the diameter of the second abutting part 302 and disposed immediately behind the second abutting part 302 is formed in the main part 30a of the front member 30. The shoulder 303 defines a retreat limit position of the first abutting part 301 with respect to the second abutting part 302 and hence with respect to the main part 30a by abutting against the rear face of the first abutting part 301.

A spring 59 disposed between a retainer 58 engaged with the rear member 28 of the input member 27 and a retainer 42 urges the input member 27 rearward. When the brake pedal 31 is not being depressed (i.e., in the initial state shown in FIG. 10), the spring 59 causes the annular valve seat for atmospheric air inflow control 37 to abut upon the moving part 41 of the valve member 45 and also holds the moving part 41 a predetermined distance δ4 away from the first annular valve seat for atmospheric air outflow control 38.

A passage 60 connecting the valve mechanism 36 with a front fixed pressure chamber 23 and a passage 61 connecting the valve mechanism 36 with a rear variable pressure chamber 26 are formed in the power piston 22.

An actuator 48 is mounted in the front of the power piston 22. This actuator 48 is made up of a valve seat member 40 and a spring 47, a guide member 53, a solenoid coil 49, a yoke 50 made of a magnetic material, a yoke reaction member receiver 51 made of a magnetic material, and a plunger 52 made of a magnetic material.

When no current is being passed through the solenoid coil 49 (i.e., when the actuator 48 is not operating), the valve seat member 40 is held by the spring 47 in the position shown in FIG. 10 such that its front end face abuts upon the plunger 52 and the front end face of the plunger 52 abuts upon a guide member 53 in a fixed relationship with respect to the yoke reaction member receiver 51. Also the front end of the front member 30 of the input member 27, i.e. the first abutting part 301 and the second abutting part 302, is slidably guided and the auxiliary annular valve seat for atmospheric air outflow control 39 of the valve seat member 40 is positioned forward of the annular valve seat for atmospheric air outflow control 38 by a distance δ3.

An abutting face 531 is provided on the guide member 53 and serves as a second limiting part which is a predetermined distance δ10 away from the rear face of the first abutting part 301 in the initial state. The abutting face 531 limits rearward movement of the first abutting part 301 with respect to the power piston 22 by abutting upon the first abutting part 301 when the actuator 48 is operated and the input member 27 moves rearward.

The predetermined distances δ10, δ2, δ4, δ3 in the initial state shown in FIG. 10 are set so that δ10+δ4+δ3≦δ2.

As can be seen from FIG. 10, the front face of the first abutting part 301 has an area of $\pi c^2 - \pi b^2$ (first area) and the first abutting part 301 is adapted to abut against the rear face of the reaction disc 54 at this front face. As can also be seen from FIG. 10, the front face of the second abutting part 302 has an area of $\pi b^2$ (second area) and the second abutting part 302 is adapted to abut against the rear face of the reaction disc 54 at this front face. The front end part of the input member 27, that is the front faces of the first abutting part 301 and the second abutting part 302, and the rear face of the reaction disc 54 are spaced apart in the initial state shown in FIG. 10 by a predetermined distance δ9.

The rear face of the rear end part 56 of the output rod 55, as shown in FIG. 10, has an area of $\pi d^2$, and the output rod 55 abuts upon the front face of the reaction disc 54 at this rear end part 56.

With reference to FIG. 10, when the driver steps on the brake pedal 31 to obtain a normal braking action, the input member 27 advances with respect to the power piston 22 and the moving part 41 of the valve member 45 abuts upon the annular valve seat for atmospheric air outflow control 38 of the power piston 22 and cuts off the rear variable pressure chamber 26 from the front fixed pressure chamber 23. In other words, the valve mechanism 36 switches from the output decreasing action state to the output holding action state. At the time of this advancing of the input member 27, because the rear face of the first abutting part 301 is abutting against the front face of the shoulder 303, the first abutting part 301 and the main part 30a, or in other words the first abutting part 301 and the second abutting part 302, move forward integrally.

At the time of this advancing of the input member 27, a gap remains between the front end face of the input member 27 (i.e. the front faces of the first and second abutting parts 301, 302) and the rear face of the reaction disc 54, and this gap is substantially equal to δ9−δ4. Also, the rear face of the first abutting part 301 and the abutting face 531 are spaced apart by a distance of approximately δ10+δ4.

Then, when the input member 27 advances from the output holding action state further by a distance α, the annular valve seat for atmospheric air inflow control 37 moves away from the moving part 41 of the valve member 45 and connects the rear variable pressure chamber 26 with the atmosphere, whereby the valve mechanism 36 switches to the output increasing action state. Consequently, atmospheric air flows into the rear variable pressure chamber 26 and flows from the rear variable pressure chamber 26 into the front variable chamber 24. The pressure in the two variable pressure chambers 24, 26 rises and an advancing force is exerted on the front moving wall 17 by the difference in pressure between the front fixed pressure chamber 23 and the front variable pressure chamber 24 and an advancing force is exerted on the rear moving wall 20 by the difference in pressure between the rear fixed pressure chamber 25 and the rear variable pressure chamber 26. These advancing forces are transmitted from the power piston 22 through the yoke reaction member receiver 51 of the actuator 48, the guide member 53 and the reaction disc 54 to the output rod 55, and the moving walls 17 and 20, the power piston 22 and the output rod 55 integrally start to move with respect to the housing 14 and operation of the master cylinder is begun.

At this time, the power piston 22 advances with respect to the input member 27 also, and the moving part 41 of the valve member 45 approaches the annular valve seat for atmospheric air inflow control 37. Also, the reaction disc 54 enters the inside of the guide member 53 so as to reduce the gap of approximately δ9−δ4−α between the rear face of the central part of the reaction disc 54 and the front end face of the input member 27 (i.e. the first and second abutting parts 301, 302), and eventually abuts with the front faces of the first and second abutting parts 301, 302 so that the reaction disc 54 transmits the advancing force of the power piston 22 and the advancing force of the input member 27 to the output rod 55 and also exerts a reaction force on the input member 27 corresponding to the thrust force from the power piston 22 so as to tend to make the input member 27 retreat with respect to the power piston 22. When the input member 27 begins to be moved rearward with respect to the power piston 22 under this reaction force from the reaction disc 54, a gap of about δ10+δ4+α remains between the rear face of the first abutting part 301 and the abutting face 531.

As a result of the power piston 22 advancing with respect to the input member 27 as the power piston 22 advances with respect to the housing and the input member 27 retreats with respect to the power piston 22 under the action of the reaction disc 54, the moving part 41 of the valve member 45 soon abuts upon the annular valve seat for atmospheric air inflow control 37 again and the inflow of atmospheric air into the variable pressure chambers 24, 26 is stopped (i.e., the valve mechanism 36 switches to its output holding action state). At this time, the input member 27 has moved with respect to the power piston 22 under the action of the reaction disc 54 through less than about δ10+δ4+α, in other words rearward by about α, and therefore the first abutting part 301 does not abut upon the abutting face 531. That is, in the rearward movement of the input member 27, the first abutting part 301 and the second abutting part 302 move rearward integrally.

In this normal braking action, the input applied to the input member 27 from the brake pedal 31 is the value Fi1 in FIG. 11, and the output applied to the master cylinder from the input member 27 is the value Fo1 shown in FIG. 11. That is, a first thrust force of the power piston 22 arising as a result of a brake operation at input Fi1 is outputted to an outside device through the output rod 55 as a main output Fo1.

When the input applied to the input member 27 from the brake pedal 31 increases to a value up to the value Fi3 in FIG. 11, the input member 27 advances with respect to the power piston 22 and the annular valve seat for atmospheric air inflow control 37 again moves away from the moving part 41 of the valve member 45 (i.e., the valve mechanism 36 switches to its output increasing action state), atmospheric air flows into the variable pressure chambers 24, 26, the pressure in the variable pressure chambers 24, 26 rises, the thrust forces on the moving walls 17 and 20 and the power piston 22 rise, and the moving walls 17 and 20, the power piston 22 and the output rod 55 advance further with respect to the housing. Also, because the power piston 22 and the output rod 55 advance with respect to the input member 27, the moving part 41 of the valve member 45 approaches the annular valve seat for atmospheric air inflow control 37 and soon the moving part 41 of the valve member 45 again abuts upon the annular valve seat for atmospheric air inflow control 37. Thus, the inflow of atmospheric air to the variable pressure chambers 24, 26 is stopped (i.e., the valve mechanism 36 switches to its output holding action state) and the increasing of the thrust forces on the moving walls 17 and 20 and the power piston 22 stops.

When the input applied to the input member 27 from the brake pedal 31 decreases to a value above the value Fi1 in FIG. 11, the input member 27 is retracted with respect to the power piston 22 and the moving part 41 of the valve member 45 is retracted with respect to the power piston 22 and the moving part 41 moves away from the annular valve seat for atmospheric air outflow control 38 (i.e., the valve mechanism 36 switches to its output decreasing action state), the variable pressure chambers 24, 26 are connected with the front fixed pressure chamber 23, and atmospheric air in the variable pressure chambers 24, 26 is discharged through the front fixed pressure chamber 23 by the negative pressure source. The pressure in the variable pressure chambers 24, 26 thus falls and the thrust forces on the moving walls 17 and 20 and the power piston 22 decrease, and the moving walls 17 and 20, the power piston 22 and the output rod 55 retreat with respect to the housing. At this time, the power piston 22 retreats with respect to the input member 27 also, the annular valve seat for atmospheric air outflow control 38 approaches the moving part 41 of the valve member 45 and soon the annular valve seat for atmospheric air outflow control 3 8 abuts upon the moving part 41 of the valve member 45 and the outflow of atmospheric air from the variable pressure chambers 24, 26 is stopped (i.e., the valve mechanism 36 switches to its output holding action state) and the decreasing of the thrust forces on the moving walls 17 and 20 and the power piston 22 is stopped.

The input value Fi3 shown in FIG. 11 is the input value at which the pressure in the variable pressure chambers 24, 26 reaches atmospheric pressure. At inputs in the range of from the value Fi1 to the value Fi3, changes in the output applied from the output rod 55 to the master cylinder are larger than changes in the input applied to the input member 27. The ratio of the output to the input, or in other words the ratio with respect to a change in the input applied to the input member 27 of the corresponding change in the main output outputted by the output rod 55 (i.e., the gradient from input Fi1 to Fi3 of the normal braking action characteristic curve shown in FIG. 11), is the same as the ratio of the area of abutment between the rear face of the rear end part 56 of the output rod 55 and the front face of the reaction disc 54 to the area of the front face of the first and second abutting parts 301, 302 of the input member 27 on which the reaction force from the reaction disc 54 acts.

In FIG. 11, the output value when the input is Fi3 is denoted as Fo4. When the input is further increased from the value Fi3, the output increases only by the amount of increase of the input. In FIG. 11, the change in force per unit length of the vertical axis is greater than the change in force per unit length of the horizontal axis. If FIG. 11 had been drawn with the change in force per unit length of the vertical axis made the same as the change in force per unit length of the horizontal axis, the line showing the input-output correlation for inputs above the value Fi3 would have a gradient of 45 degrees.

When the brake pedal 31 has been depressed and the input member 27, the moving walls 17 and 20, the power piston 22 and the output rod 55 have advanced with respect to the housing, the key member 32 has moved away from the rear side shell 12. When the driver then releases the brake pedal 31 to end the normal braking action, the input member 27 is caused by the reaction force exerted from the reaction disc 54 and by the spring 59 to retreat with respect to the power piston 22 to a position such that the rear face of the flange 34 abuts upon the front face of the key member 32. As a result, the moving part 41 of the valve member 45 is retracted with respect to the power piston 22 and the moving part 41 moves away from the annular valve seat for atmospheric air outflow control 38 (i.e., the valve mechanism 36 switches to its output decreasing action state), atmospheric air inside the variable pressure chambers 24, 26 is rapidly discharged through the front fixed pressure chamber 23 by the negative pressure source and in response to consequent rapid pressure drops in the variable pressure chambers 24, 26, the moving walls 17 and 20, the power piston 22 and the output rod 55 are rapidly retracted with respect to the housing.

As a result of the retreat of the input member 27, the moving walls 17 and 20, the power piston 22 and the output rod 55 with respect to the housing, the key member 32 soon abuts upon the rear side shell 12 and the retreat of the input member 27 with respect to the housing is stopped. The retreat of the moving walls 17 and 20, the power piston 22 and the output rod 55 with respect to the housing, on the other hand, continues as far as the retreat limit position of the power piston 22 with respect to the housing, i.e., the position such that the front side wall of the radial hole 33 in the power piston 22 abuts with the front face of the key member 32 and the rear face of the outer ends of the key member 32 abut with the rear side shell 12. Consequently the annular valve seat for atmospheric air outflow control 38 of the power piston 22 approaches the moving part 41 of the valve member 45 and a non-operating state is reached in which a small gap δ4 remains between the annular valve seat for atmospheric air outflow control 38 and the moving part 41. Because the gap between the annular valve seat for atmospheric air outflow control 38 and the moving part 41 is small, the amount of advance of the input member 27 required for the valve mechanism 36 to change from the output decreasing action state via the output holding action state to the output increasing action state at the time of the next operation is small, and thus there is little play when the brake pedal 31 is depressed and responsiveness is good.

As a result of the force transmitted between the power piston 22 and the output rod 55 decreasing, the reaction disc 54 returns to the state shown in FIG. 10 under its own elasticity.

Next, when the driver depresses the brake pedal 31 suddenly with an input Fi1 to obtain an emergency braking action, the input member 27 advances with respect to the power piston 22 and the moving part 41 of the valve member 45 abuts upon the annular valve seat for atmospheric air outflow control 38 of the power piston 22 and cuts off the rear variable pressure chamber 26 from the front fixed pressure chamber 23. That is, the valve mechanism 36 switches from its output decreasing action state to its output holding action state.

At the time of this advance of the input member 27, a gap remains between the front end face of the input member 27, that is the front face of the first and second abutting parts 301, 302, and the rear face of the reaction disc 54, and this gap is roughly equal to δ9−δ4. Also, the rear face of the first abutting part 301 and the abutting face 531 are spaced apart by a distance of approximately δ10+δ4.

Then, as a result of the input member 27 advancing by a further distance α, the annular valve seat for atmospheric air inflow control 37 moves away from the moving part 41 of the valve member 45 and connects the rear variable pressure chamber 26 with the atmosphere, whereby the valve mechanism 36 switches to its output increasing action state. Along with this operation of the brake pedal 31, the electronic control unit passes a current through the solenoid coil 49 and thereby operates the actuator 48.

When current is passed through the solenoid coil 49, an electromagnetic attraction force arises between the plunger 52 and the yoke 50 and the plunger 52 is retracted with respect to the power piston 22 and retracts the valve seat member 40 through a distance $\delta 2$, and the auxiliary annular valve seat for atmospheric air outflow control 39 of the valve seat member 40 abuts upon the moving part 41 of the valve member 45 and also the valve seat member 40 causes the moving part 41 to retreat with respect to the power piston 22. As a result of this operation, the moving part 41 of the valve member 45 moves away from the annular valve seat for atmospheric air outflow control 38 of the power piston 22, but because the auxiliary annular valve seat for atmospheric air outflow control 39 of the valve seat member 40 is in abutment with the moving part 41, the state of disconnection between the variable pressure chambers 24, 26 and the front fixed pressure chamber 23 is maintained as the gap between the annular valve seat for atmospheric air inflow control 37 and the moving part 41 of the valve member 45 increases from $\alpha$ to $\alpha + \delta 2 - \delta 3$.

Therefore, as a result of the operation of the brake pedal 31 and the operation of the actuator 48, atmospheric air flows rapidly into the variable pressure chambers 24, 26, and the pressure in the variable pressure chambers 24, 26 rapidly rises. The moving walls 17 and 20, the power piston 22 and the output rod 55 thus rapidly advance with respect to the housing.

As a result of the power piston 22 advancing with respect to the input member 27, the power piston 22 also advances with respect to the housing, and the moving part 41 of the valve member 45 approaches the annular valve seat for atmospheric air inflow control 37. Also, the reaction disc 54 enters the inside of the guide member 53 so as to reduce the gap of approximately $\delta 9 - \delta 4 - \alpha$ between the rear face of the central part of the reaction disc 54 and the front end face of the input member 27 (i.e., the first and second abutting parts 301, 302), and eventually abuts with the front faces of the first and second abutting parts 301, 302 so that the reaction disc 54 transmits the advancing force of the power piston 22 and the advancing force of the input member 27 to the output rod 55 and also exerts a reaction force on the input member 27 corresponding to the output from the output rod 55 so as to tend to make the input member 27 retreat with respect to the power piston 22. When the input member 27 begins to be moved rearward with respect to the power piston 22 under this reaction force from the reaction disc 54, a gap of about $\delta 10 + \delta 4 + \alpha$ remains between the rear face of the first abutting part 301 and the abutting face 531.

Under the reaction force exerted on the input member by the reaction disc 54, the input member 27 moves rearward with respect to the power piston 22 by a distance of approximately $\alpha + \delta 2 - \delta 3$, and at the time of this rearward movement of the input member 27 the gap of approximately $\delta 10 + \delta 4 + \alpha$ between the rear face of the first abutting part 301 and the abutting face 531, as will be understood from $\delta 10 + \delta 4 \leq \delta 2$ having been set in the initial state, becomes zero. That is, the rear face of the first abutting part 301 abuts upon the abutting face 531.

Because its rear face is abutting with the abutting face 531, the rearward integral movement of the first abutting part 301 with the main part 30a and hence the second abutting part 302, i.e. its rearward movement with respect to the power piston 22, is limited. By virtue of the rearward movement of the first abutting part 301 being limited, the reaction disc 54 is unable to move the first abutting part 301 rearward any more and the abutment face of the input member 27 on which the reaction from the reaction disc 54 acts becomes the front face of the second abutting part 302 only. The reaction disc 54 enters the inside of the center hole 301a of the first abutting part 301 and acts on the front face of the second abutting part 302 only, and moves the input member 27, excluding the first abutting part 301, rearward.

As a result of the advance of the power piston 22 with respect to the housing 14 and the retreat of the input member 27 with respect to the power piston 22, the power piston 22 advances with respect to the input member 27, and soon the moving part 41 abuts upon the annular valve seat for atmospheric air inflow control 37 and the valve mechanism 36 assumes its output holding action state. The front-rear direction position of the input member 27 with respect to the power piston 22 at this time has shifted rearward with respect to its front-rear direction position at the same time in the normal braking action through the distance obtained by subtracting the distance $\delta 3$ between the annular valve seat for atmospheric air outflow control 38 and the auxiliary annular valve seat for atmospheric air outflow control 39 in FIG. 10 from the displacement $\delta 2$, and the amount of entry of the reaction disc 54 into the guide member 53 is greater than the amount of entry in the normal braking action. That is, the thrust force transmitted to the output rod 55 through the reaction disc 54 from the power piston 22 (the output applied to the master cylinder from the output rod 55) is greater than in the normal braking action and is denoted by the value Fo2 in FIG. 11. In other words, while the first thrust force of the power piston 22 arising as a result of the brake being operated with an input of Fi1 is exerted through the output rod 55 as an output Fo1, as a result of the actuator 48 being operated a second thrust force arises in the power piston 22 and an auxiliary output of [Fo2-Fo1] is applied to the output rod 55, and consequently the brake booster 10 outputs a force Fo2 which is the sum of the main output Fo1 and the auxiliary output [Fo2-Fo1].

When the output is the value Fo2 in FIG. 11 the pressure in the variable pressure chambers 24, 26 is lower than atmospheric pressure. Consequently, when the input applied to the input member 27 is increased to a value up to the value Fi2, the input member 27, excluding the first abutting part 301, advances with respect to the power piston 22 and the valve mechanism 36 switches from the output holding action state to the output increasing action state and the pressure in the variable pressure chambers 24, 26 rises and the output increases. Then, as a result of the power piston 22 advancing with respect to the input member 27, excluding the first abutting part 301, the valve mechanism 36 switches from the output increasing action state to the output holding action state and the increasing of the output is stopped.

When the input to the input member 27 decreases, the input member 27 excluding the first abutting part 301 is retracted with respect to the power piston 22 by the reaction from the reaction disc 54, the valve mechanism 36 switches to the output decreasing action state and the pressure in the variable pressure chambers 24, 26 falls and the output decreases. Then, when as the power piston 22 retreats with respect to the power piston 22 the valve mechanism 36 switches from its output decreasing action state to its output holding action state, the decreasing of the output stops.

The output value Fo3 in FIG. 11 is the value when the pressure in the variable pressure chambers 24, 26 has risen to atmospheric pressure, and the input at this time is the value Fi2. When the input varies between the value Fi1 and the value Fi2, the ratio of the output to the input, in other words the ratio with respect to a change in the input applied to the input member 27 of the corresponding change in the total output made up of the main output and the auxiliary output outputted by the output rod 55 (i.e. the gradient of the emergency braking action characteristic curve between the inputs Fi1 and Fi2 in FIG. 11) is the same as the ratio of the area of the rear face of the rear end part 56 of the output rod 55 and of the front face of the reaction disc 54 to the area of the front face of the second abutting part 302 of the input member 27 on which the reaction force from the reaction disc 54 acts. At inputs above the value Fi2, the output changes only by the change in the input.

When the driver releases the brake pedal 31 with a current passing through the solenoid coil 49, in the same way as when the brake pedal 31 is released during normal braking, the input member 27 is made to retreat with respect to the power piston 22 by the reaction force applied to it from the reaction disc 54 and by the spring 59. Consequently the valve mechanism 36 switches to its output decreasing action state, the pressures in the variable pressure chambers 24, 26 falls and the output decreases. As a result, the input member 27, the moving walls 17 and 20, the power piston 22 and the output rod 55 retreat with respect to the housing and finally return to the non-operating state shown in FIG. 2.

When conditions for switching off the solenoid coil 49 have been established, the electronic control unit switches off the solenoid coil 49. Consequently, the valve seat member 40 and the plunger 52 are returned by the spring 47 to the positions shown in FIG. 10 and the operation of the actuator 48 is thus ended.

As described above, with the vacuum brake booster 10 of this embodiment, the input-output ratio of the normal braking action shown in FIG. 11 is determined by the ratio between the area of abutment $\pi c^2$ of the first abutting part 301 and the second abutting part 302 with the rear face of the reaction disc 54 and the area of abutment $\pi d^2$ between the rear face of the rear end part 56 of the reaction disc 54 and the front face of the reaction disc 54, and the input-output ratio of the emergency braking action is determined by the ratio between the area of abutment $\pi b^2$ of the front face of the second abutting part 302 with the rear face of the reaction disc 54 and the area of abutment $\pi d^2$ between the rear face of the rear end part 56 of the output rod 55 and the front face of the reaction disc 54. Thus the output-to-input ratio when the actuator 48 is operating in this embodiment is greater than the input-output ratio during normal operation.

The ratio of the emergency braking operation can changed by suitable setting the area of the front face of the second abutting part 302. Also, when making the output-to-input ratio of the emergency braking operation larger than the output-to-input ratio of the normal braking operation, in the vacuum brake booster 10 of this embodiment, because it is not necessary for the amount of movement δ2 of the plunger 52 to be increased, it is not necessary for the actuator 48 to be made large.

Also, whereas in vacuum type boosters of other known constructions, there has been a tendency for the input member to be made large by virtue of an elastic member being mounted on the input member, in the vacuum brake booster 10 of this embodiment it is not necessary for an elastic member to be mounted on the input member 27. Consequently, there is no need for making the input member 27 large. It is thus possible to provide a vacuum brake booster 10 which can be made relatively compact.

Figure 12:
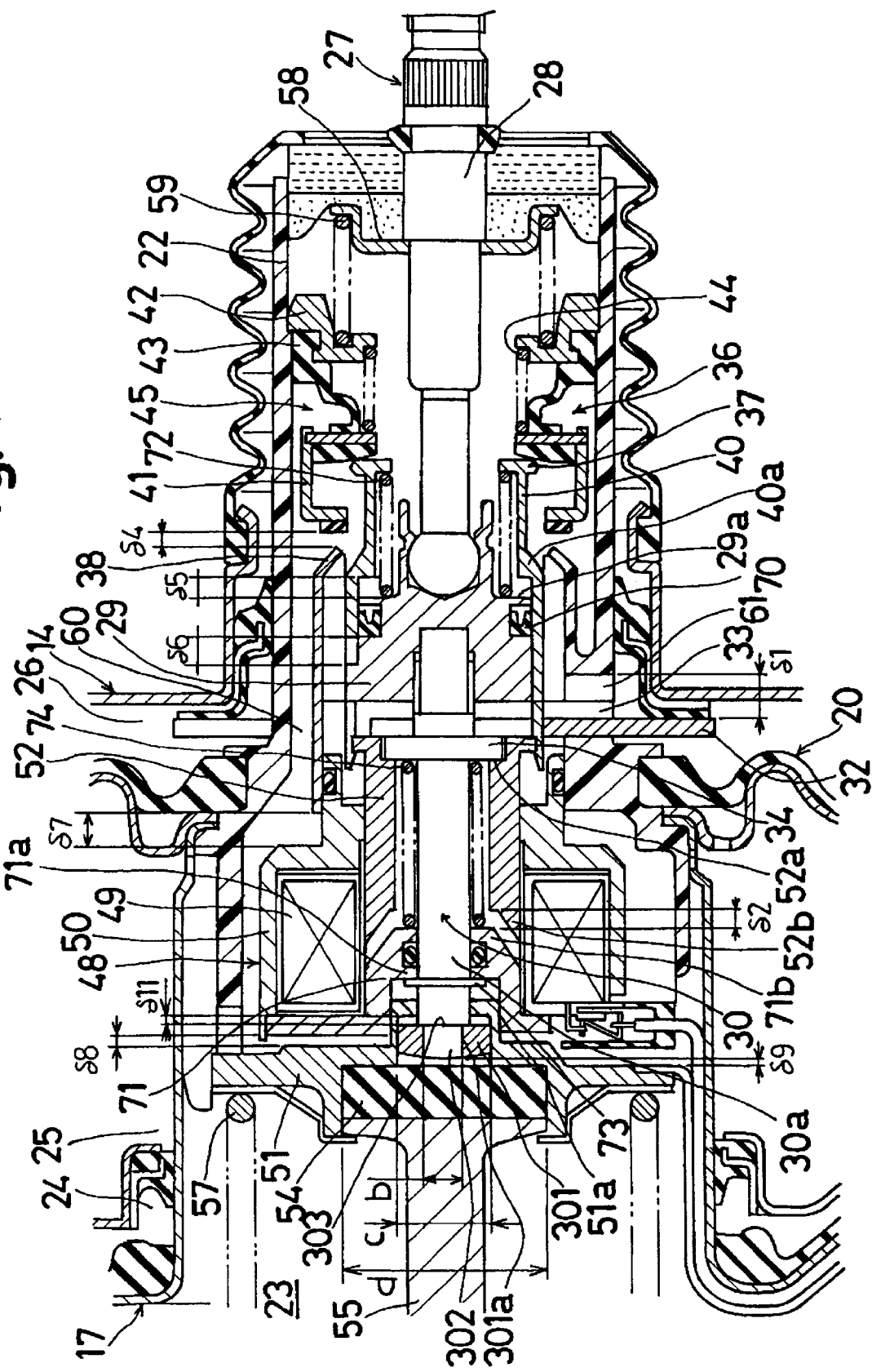
FIG. 12 is an enlarged cross-sectional view of a portion of a tandem type vacuum brake booster for a vehicle according to a sixth embodiment of the present invention.

FIG. 12 is a cross-sectional view of a tandem type vacuum brake booster for a vehicle according to a sixth embodiment of the present invention. The illustration in FIG. 12 is in the vicinity of the valve mechanism and the actuator Many of the features in this embodiment correspond to features in the earlier described embodiments above and so a detailed description of such features will not be repeated in entirety here. In this sixth embodiment, the construction of the input member 27 is substantially the same as in the fifth embodiment described above, and the rest of the booster construction is substantially the same as the vacuum brake booster of the second embodiment described above.

As seen with reference to FIG. 12, a reaction disc receiver 51 receives the reaction disc 54 in its front side and slidably guides the main part 30a and the first and second abutting parts 301, 302 with its rear side part. The reaction disc receiver 51 is provided with an abutting face 51a serving as a second limiting part which in the initial state is a predetermined distance δ11 away from the rear face of the first abutting part 301. The abutting face 51a limits rearward movement of the first abutting part 301 with respect to the power piston 22 by abutting with the first abutting part 301 when the input member 27 moves rearward during operation of the actuator 48.

In the initial state shown in FIG. 12, the annular valve seat for atmospheric air inflow control 37 abuts against the moving part 41 of the valve member 45 and the moving part 41 is spaced away from the annular valve seat for atmospheric air outflow control 38 by a predetermined distance δ4. The predetermined distances δ11, δ2, δ4 in the initial state shown in FIG. 12 are set so that δ11+δ4≦δ2.

The urging force of the spring 74 is greater than the urging force of the spring 72 and also is greater than the resistance to sliding of the actuator 48 with respect to the power piston 22 and the input member 27. The urging force of the spring 72 is greater than the urging force of the spring 44. The distances δ2, δ6 shown in FIG. 12 are greater than the distance 64, and the distance δ7 is greater than the distance δ1. Also, the distance δ8 shown in FIG. 5 is greater than the distance δ9 shown in FIG. 12.

The input-output characteristics of the embodiment shown in FIG. 12 are the same as the characteristics shown in FIG. 11, and the operation of this embodiment will now be described with reference to FIG. 11 and FIG. 12. The state shown in FIG. 12 is a non-operating state wherein neither a normal braking action nor an emergency braking action is being carried out. In this state, the input member 27 is in its retreat limit position with respect to the housing 14, the moving walls 17, 20, the power piston 22 and the output rod 55 are in their retreat limit positions with respect to the housing 14, the valve mechanism 36 is in a state such that the annular valve seat for atmospheric air inflow control 37 of the valve seat member 40, which is in its retreat limit position with respect to the input member 27, is abutted against the moving part 41 of the valve member 45 and has moved the moving part 41 away from the annular valve seat for atmospheric air outflow control 38 of the power piston 22 (i.e., its output decreasing action state), and the pressure in the variable pressure chambers 24, 26 is equal to the pressure in the fixed pressure chambers 23, 24.

When the driver steps on the brake pedal to obtain a normal braking action and an input is thereby applied to the input member 27, because the flange 34 of the input member 27 and the rear inner periphery 52a of the plunger 52 are engaged, the input member 27 and the plunger 52 and the valve seat member 40 are integrally advanced with respect to the power piston 22 and the moving part 41 of the valve member 45 abuts with the annular valve seat for atmospheric air outflow control 38 of the power piston 22 so that the valve mechanism 36 switches to its output holding action state. Also, urged by the spring 74 along with the advance of the input member 27, the yokes 71, 50 and the solenoid coil 49 are also made to advance integrally with the input member 27. At this time a gap remains between the first and second abutting parts 301, 302 and the reaction disc 54, and this gap is approximately equal to δ9–δ4. The rear face of the first abutting part 301 and the abutting face 51a are spaced apart by a distance of approximately δ11+δ4. Also, a gap still remains between the reaction disc receiver 51 and the yoke 71, and this gap is approximately equal to δ8–δ4.

Then, when the input member 27 advances from the output holding action state by a distance α, the annular valve seat for atmospheric air inflow control 37 moves away from the moving part 41 and the valve mechanism 36 switches to its output increasing action state, atmospheric air flows into the variable pressure chambers 24, 26 and the pressure in the variable pressure chambers 24, 26 rises. The moving walls 17 and 20, the power piston 22 and the output rod 55 then start to advance integrally with respect to the housing 14.

At this time, the power piston 22 also advances with respect to the input member 27, and the moving part 41 of the valve member 45 approaches the annular valve seat for atmospheric air inflow control 37. Also, the reaction disc 54 enters the inside of the reaction disc receiver 51 so as to reduce the gap of approximately δ9–δ4–α between the rear face of its central part and the front end face of the input member 27 (i.e., the first and second abutting parts 301, 302), and eventually abuts with the front faces of the first and second abutting parts 301, 302, whereupon the reaction disc 54 transmits the advancing force of the power piston 22 and the advancing force of the input member 27 to the output rod 55 and also exerts a reaction force on the input member 27 corresponding to the output from the output rod 55 so as to tend to make the input member 27 retreat with respect to the power piston 22. When the input member 27 begins to be moved rearward with respect to the power piston 22 under this reaction force from the reaction disc 54, a gap of about δ11+δ4+α remains between the rear face of the first abutting part 301 and the abutting face 51a.

As a result of the power piston 22 advancing with respect to the input member 27, the moving part 41 of the valve member 45 soon again abuts upon the annular valve seat for atmospheric air inflow control 37 and the inflow of atmospheric air into the variable pressure chambers 24, 26 is stopped (i.e., the valve mechanism 36 switches to its output holding action state). At this time, the input member 27 has moved rearward with respect to the power piston 22 by less than about δ11+δ4+α, or in other words by about α, and consequently the first abutting part 301 does not abut upon the abutting face 51a. That is, in the rearward movement of the input member 27, the first abutting part 301 and the second abutting part 302 move rearward integrally.

In this normal braking action, the input applied to the input member 27 from the brake pedal 31 is the value Fi1 shown in FIG. 11, and the output applied to the master cylinder from the output rod 55 is the value Fo1 shown in FIG. 11. That is, a first thrust force of the power piston 22 arising as a result of a brake operation at input Fi1 is outputted to an outside device through the output rod 55 as a main output Fo1.

After that, when the input applied to the input member 27 varies between the value Fi1 and the value Fi3 shown in FIG. 11, the valve mechanism 36 switches between the output increasing action state, the output holding action state and the output decreasing action state, and an output value Fo1 to Fo4 of a size corresponding to the input value Fi1 to Fi3 is thereby outputted through the output rod 55. When the input is increased above Fi3 the output increases only by the increase in the input.

When the input applied to the input member 27 is above the value Fi1, in the same way as in the embodiment shown in FIG. 10, a reaction force from the reaction disc 54 is applied to the input member 27 through the first and second abutting parts 301, 302.

When the input applied to the input member 27 is removed, by the reaction force applied to the input member 27 from the reaction disc 54 and by the spring 59, the input member 27 retreats with respect to the power piston 22 and the valve mechanism 36 switches to the output decreasing action state. Atmospheric air in the variable pressure chambers 24, 26 is thus discharged and the pressure in the variable pressure chambers 24, 26 falls and the moving walls 17, 20, the power piston 22, the input member 27 and the output rod 55 start to retreat with respect to the housing 14 integrally and finally return to the positions shown in FIG. 12. Because a stopper 73 provided on the input member 27 engages with the yoke 71, the yokes 50, 71 and the solenoid coil 49 also retreat integrally with the input member 27.

The ratio of the output to the input for inputs between Fi1 and Fi3, or in other words the ratio with respect to a change in the input applied to the input member 27 and the corresponding change in the main output outputted by the output rod 55 (i.e., the gradient from input Fi1 to Fi3 of the normal braking action characteristic curve shown in FIG. 11), is the same as the ratio of the area of abutment between the rear face of the rear end part 56 of the output rod 55 and the front face of the reaction disc 54 to the area of the front face of the first and second abutting parts 301, 302 of the input member 27 on which the reaction force from the reaction disc 54 acts.

Next, when the driver depresses the brake pedal 31 suddenly with an input Fi1 (in FIG. 11) to obtain an emergency braking action, the input member 27, the valve seat member 40 and the actuator 48 are advanced with respect to the power piston 22 and, as described above in the description of the normal braking action, the valve mechanism 36 switches from the output decreasing action state to the output holding action state.

At the time of this advance of the input member 27, a gap remains between the front face of the first and second abutting parts 301, 302, and the rear face of the reaction disc 54, and this gap is approximately equal to δ9–δ4. Also, the rear face of the first abutting part 301 and the abutting face 51a are spaced apart by about δ11+δ4.

Then, as a result of a further advance of the input member 27 through a distance α, the annular valve seat for atmospheric air inflow control 37 moves away from the moving part 41 of the valve member 45 and connects the rear variable pressure chamber 26 with the atmosphere, whereby the valve mechanism 36 switches to its output increasing action state. Along with this operation of the brake pedal 31, the electronic control unit operates the actuator 48 by passing a current through the solenoid coil 49.

When current is passed through the solenoid coil 49, an electromagnetic attraction force arises between the plunger 52 and the yoke 71 and the plunger 52 is advanced with respect to the power piston 22 and advances the valve seat member 40 through a distance δ2 and moves the annular valve seat for atmospheric air inflow control 37 of the valve seat member 40 further, from α to α+δ2, away from the moving part 41 of the valve member 45. As the plunger 52 and the valve seat member 40 advance, the front end 52b of the plunger 52 abuts,upon the rear end 71b of the yoke 71, the engaging part 40a of the valve seat member 40 abuts upon the engaging part 29a of the middle member 29, and the forward movement of the valve seat member 40 with respect to the input member 27 is thereby limited. As a result of this operation the gap between the annular valve seat for atmospheric air inflow control 37 and the moving part 41 of the valve member 45 is increased to a maximum size. Consequently, as a result of the operation of the brake pedal and the operation of the actuator 48, atmospheric air flows rapidly into the variable pressure chambers 24, 26, the pressure in the variable pressure chambers 24, 26 rapidly rises, and the moving walls 17 and 20, the power piston 22 and the output rod 55 rapidly advance with respect to the housing 14.

As the moving walls 17, 20 and the power piston 22 advance with respect to the housing 14, the power piston 22 also advances with respect to the input member 27, and consequently the moving part 41 of the valve member 45 approaches the annular valve seat for atmospheric air inflow control 37. Also, as the power piston 22 advances, the reaction disc 54 enters the inside of the guide member 53 so as to reduce the gap of approximately δ9−δ4−α between the rear face of its central part and the front end face of the input member 27, that is the first and second abutting parts 301, 302, and eventually abuts with the front faces of the first and second abutting parts 301, 302, whereupon the reaction disc 54 transmits the advancing force of the power piston 22 and the advancing force of the input member 27 to the output rod 55 and also exerts a reaction force on the input member 27 corresponding to the output from the output rod 55 so as to tend to make the input member 27 retreat with respect to the power piston 22. When the input member 27 begins to be moved rearward with respect to the power piston 22 under this reaction force from the reaction disc 54, a gap of about δ11+δ4+α remains between the rear face of the first abutting part 301 and the abutting face 51a.

The reaction force from the reaction disc 54 moves the input member 27 and the valve seat member 40 and the actuator 48 engaged with the input member 27 rearward with respect to the power piston 22 by a distance of approximately δ2+α, and at the time of this rearward movement of the input member 27 the gap of approximately δ11+δ4+α between the rear face of the first abutting part 301 and the abutting face 51a, as will be understood from δ11+δ4≦δ2 having been set in the initial state, becomes zero. That is, the rear face of the first abutting part 301 abuts against the abutting face 51a.

Because its rear face is abutting with the abutting face 51a, the rearward integral movement of the first abutting part 301 with the main part 30a and hence the second abutting part 302, i.e. its rearward movement with respect to the power piston 22, is limited. By virtue of the rearward movement of the first abutting part 301 being limited, the reaction disc 54 is unable to move the first abutting part 301 rearward any more and the abutment face of the input member 27 on which the reaction from the reaction disc 54 acts becomes the front face of the second abutting part 302 only. The reaction disc 54 enters the inside of the center hole 301a of the first abutting part 301 and acts on the front face of the second abutting part 302 only, and moves the input member 27, excluding the first abutting part 301, rearward together with the valve seat member 40 and the actuator 48 engaged with the input member 27.

As a result of the advance of the power piston 22 with respect to the input member 27, the moving part 41 soon abuts upon the annular valve seat for atmospheric air inflow control 37 and the valve mechanism 36 assumes its output holding action state. The front-rear direction position of the input member 27 with respect to the power piston 22 at this time has shifted rearward with respect to its front-rear direction position at the same time in the normal braking action through the displacement δ2, and the amount of entry of the reaction disc 54 into the reaction disc receiver 51 is greater than the amount of entry in the normal braking action. That is, the thrust force transmitted to the output rod 55 through the reaction disc 54 from the power piston 22 (the output applied to the master cylinder from the output rod 55) is greater than in the normal braldng action and is the value Fo2 in FIG. 11. In other words, while the first thrust force of the power piston 22 arising as a result of the brake being operated with an input of Fi1 is exerted through the output rod 55 as an output Fo1, as a result of the actuator 48 being operated a second thrust force arises in the power piston 22 and an auxiliary output of [Fo2−Fo1] is applied to the output rod 55, and consequently the brake booster 10 outputs a force Fo2 which is the sum of the main output Fo1 and the auxiliary output [Fo2−Fo1].

When the output is the value Fo2 in FIG. 11 the pressure in the variable pressure chambers 24, 26 is lower than atmospheric pressure. Consequently, when the input applied to the input member 27 is increased to a value up to the value Fi2 of FIG. 11, the input member 27 advances with respect to the power piston 22 and the valve mechanism 36 switches from the output holding action state to the output increasing action state and the pressure in the variable pressure chambers 24, 26 rise and the output increases. Then, as a result of the power piston 22 advancing with respect to the input member 27, excluding the first abutting part 301, the valve mechanism 36 switches from the output increasing action state to the output holding action state and the increasing of the output is stopped.

When the input to the input member 27 decreases, the input member 27, excluding the first abutting part 301, is retracted with respect to the power piston 22 by the reaction force from the reaction disc 54, the valve mechanism 36 switches to the output decreasing action state and the pressure in the variable pressure chambers 24, 26 falls and the output decreases. Then, as the power piston 22 retreats with respect to the input member 27, the valve mechanism 36 switches from its output decreasing action state to its output holding action state and the decreasing of the output stops.

The output value Fo3 in FIG. 11 is the value when the pressure in the variable pressure chambers 24, 26 has risen to atmospheric pressure, and the input at this time is the value Fi2. When the input varies between the value Fi1 and the value Fi2, the ratio of the output to the input, in other words the ratio with respect to a change in the input applied to the input member 27 and the corresponding change in the total output made up of the main output and the auxiliary output outputted by the output rod 55 (i.e. the gradient of the emergency braking action characteristic curve between the inputs Fi1 and Fi2 in FIG. 11) is the same as the ratio of the area of the rear face of the rear end part 56 of the output rod 55 and of the front face of the reaction disc 54 to the area of abutment between the rear face of the reaction disc 54 and the front face of the second abutting part 302 of the input member 27. At inputs above the value Fi2, the output changes only by the change in the input.

When the driver releases the brake pedal 31 with a current passing through the solenoid coil 49, in the same way as when the brake pedal 31 is released during normal braking, the input member 27 and the valve seat member 40 and the actuator 48 engaged with the input member 27 retreat with respect to the power piston 22 by the reaction force applied to them from the reaction disc 54 and by the spring 59. Consequently, the valve mechanism 36 switches to its output decreasing action state, the pressure in the variable pressure chambers 24, 26 falls and the output decreases. As a result, the input member 27, the moving walls 17 and 20, the power piston 22 and the output rod 55 retreat with respect to the housing 14 and finally return to the non-operating state shown in FIG. 12.

When conditions for switching off the solenoid coil 49 have been established, the electronic control unit switches off the solenoid coil 49. Consequently, the valve seat member 40 and the plunger 52 are returned by the spring 72 to the positions shown in FIG. 12 and the operation of the actuator 48 is thus ended.

Other affects of this embodiment of the present invention are similar to those described above with respect to the fifth embodiment.

Figure 13:
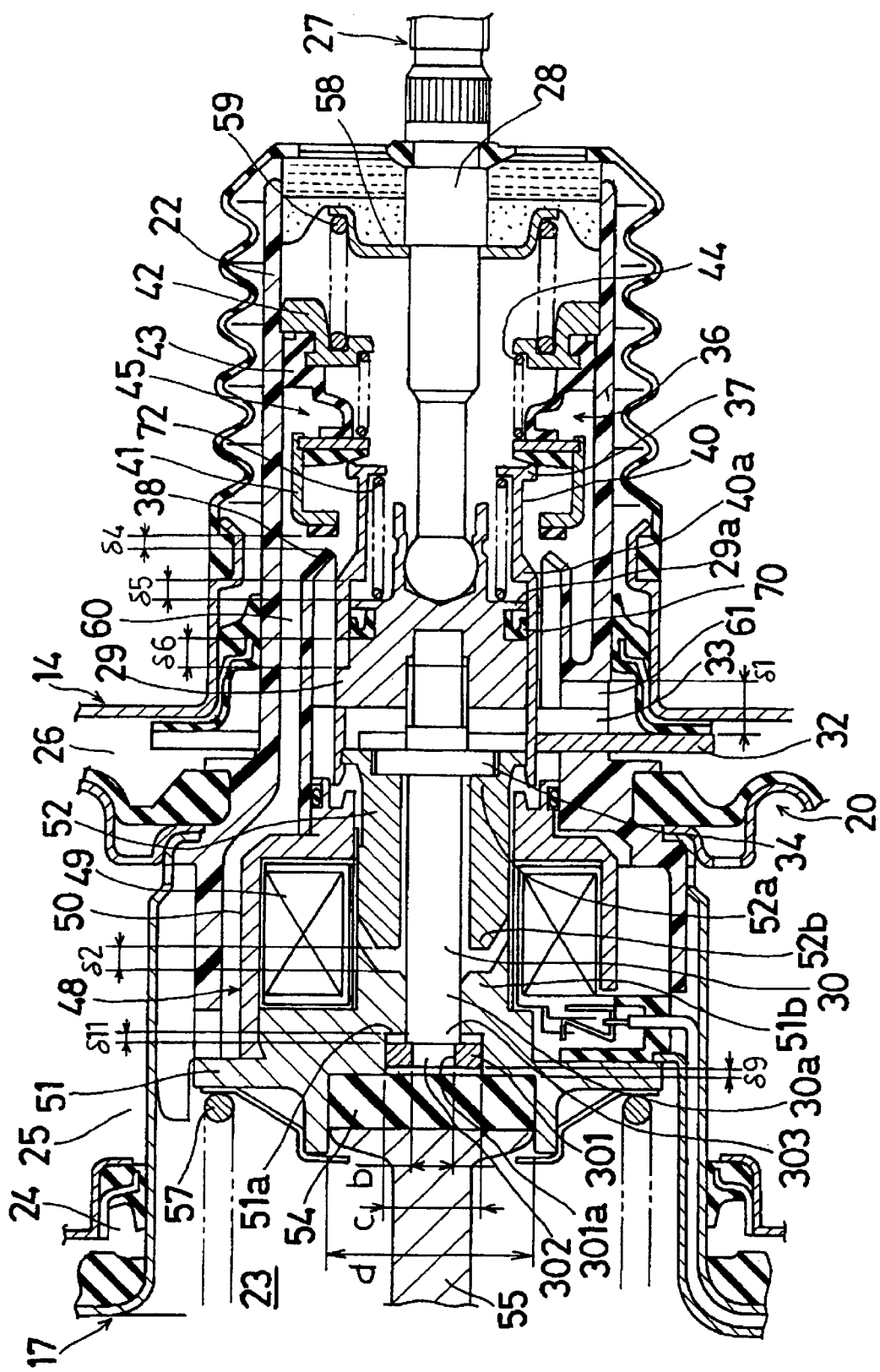
FIG. 13 is an enlarged cross-sectional view of a portion of a tandem type vacuum brake booster for a vehicle according to a seventh embodiment of the present invention.

FIG. 13 is a cross-sectional view of a tandem type vacuum brake booster for a vehicle according to a seventh embodiment of the present invention, illustrating the portion of the booster in the vicinity of the valve mechanism and the actuator. The features of this embodiment that are the same as features in the sixth embodiment described above are designated with like reference numerals and a detailed description of such features will not be repeated in entirety here. The construction of this embodiment illustrated in FIG. 13, except for the actuator 48, is the same as that of the sixth embodiment described above.

As seen with reference to FIG. 13, the actuator 48 is mounted inside the front of the power piston 22. This actuator 48 includes a solenoid coil 49, a yoke 50 and a yoke reaction disc receiver 51 made of a magnetic material fixed to the power piston 22, and a plunger 52 made of a magnetic material.

The solenoid coil 49 is electrically connected by lead wires to an electronic control unit outside the housing 14. The rear end of the plunger 52 is joined to the front end of the valve seat member 40. When a current is passed through the solenoid coil 49, that is when the actuator 48 is operated, an electromagnetic attraction force arises between the yoke reaction disc receiver 51 and the plunger 52.

To position the valve seat member 40 in a retreat limit position with respect to the input member 27 when the actuator 48 is not operating and to connect the two in this retreat limit position so that they advance and retreat integrally, a spring 72 for urging the valve seat member 40 rearward with respect to the input member 27 is disposed between the middle member 29 of the input member 27 and the valve seat member 40, and a pair of abutting parts is made up of the rear inner periphery 52a of the plunger 52 and the front face of the flange 34 of the input member 27.

To position the valve seat member 40 in an advanced position with respect to the input member 27 when the actuator 48 is operating and to connect the two in this advanced position so that they can advance and retreat integrally, the valve seat member 40 and the middle member 29 respectively have engaging parts 40a, 29a which abut upon each other when the actuator 48 is operated. A pair of abutting parts is made up of the front end 52b of the plunger 52 and the rear end 51b of the yoke 51.

The yoke reaction disc receiver 51 receives the reaction disc 54 in its front side and slidably guides the main part 30a and the first and second abutting parts 301, 302 with a rear side part thereof The yoke reaction disc receiver 51 is provided with an abutting face 51a serving as a second limiting part which in the initial state is a predetermined distance e away from the rear face of the first abutting part 301. The abutting face 51a limits rearward movement of the first abutting part 301 with respect to the power piston 22 by abutting against the first abutting part 301 when the input member 27 moves rearward when the actuator 48 operates.

The rear end 51b of the yoke reaction disc receiver 51 and the front end 52b of the plunger 52 are spaced apart by a predetermined distance $\delta 2$ when the actuator 48 is not operating, that is, in the state shown in FIG. 13. Also, when the actuator 48 is not operating, in other words in the state shown in FIG. 13, the engaging parts 40a, 29a are also spaced apart by the predetermined distance $\delta 2$.

In the initial state shown in FIG. 13, the annular valve seat for atmospheric air inflow control 37 abuts against the moving part 41 of the valve member 45 and has moved the moving part 41 away from the annular valve seat for atmospheric air outflow control 38 by a predetermined distance 64.

The predetermined distances $\delta 11$, $\delta 2$, $\delta 4$ in the initial state shown in FIG. 4 are set so that they satisfy the relationship $\delta 11+\delta 4 \leq \delta 2$. The urging force of the spring 72 is greater than the urging force of the spring 44. Also, with reference to FIG. 13, the distances $\delta 2$, $\delta 6$ are greater than the distance $\delta 4$.

The input-output characteristics of this embodiment shown in FIG. 13 are the same as the characteristics shown in FIG. 11, and its operation will now be described with reference to FIG. 11 and FIG. 13. FIG. 13 shows a non-operating state wherein neither a normal braking action nor an emergency braking action is being carried out. In this state: the input member 27 is in its retreat limit position with respect to the housing 14; the moving walls 17, 20, the power piston 22 and the output rod 55 are in their retreat limit positions with respect to the housing 14; the valve mechanism 36 is in a state such that the annular valve seat for atmospheric air inflow control 37 of the valve seat member 40, which is in its retreat limit position with respect to the input member 27, is abutted against the moving part 41 of the valve member 45 and has moved the moving part 41 away from the annular valve seat for atmospheric air outflow control 38 of the power piston 22, i.e., its output decreasing action state; and the pressure in the variable pressure chambers 24, 26 is equal to the pressure in the fixed pressure chambers 23, 24.

When the driver steps on the brake pedal to obtain a normal braking action and an input is thereby applied to the input member 27, because the flange 34 of the input member 27 and the rear inner periphery 52a of the plunger 52 are engaged, the input member 27 and the plunger 52 and the valve seat member 40 are integrally advanced with respect to the power piston 22, and the moving part 41 of the valve member 45 abuts against the annular valve seat for atmospheric air outflow control 38 of the power piston 22 so that the valve mechanism 36 switches to its output holding action state. At this time a gap remains between the first and second abutting parts 301, 302 and the reaction disc 54, and this gap is approximately equal to $\delta 9 - \delta 4$. Also, the rear face of the first abutting part 301 and the abutting face 51a are apart by a distance of approximately $\delta 9 + \delta 4$.

Then, when the input member 27 advances from the output holding action state by a distance $\alpha$, the annular valve seat for atmospheric air inflow control 37 moves away from the moving part 41, the valve mechanism 36 switches to its output increasing action state, atmospheric air flows into the variable pressure chambers 24, 26, the pressure in the variable pressure chambers 24, 26 rises, and the moving walls 17, 20, the power piston 22 and the output rod 55 start to advance integrally with respect to the housing 14.

At this time, the power piston 22 advances with respect to the input member 27 also, and the moving part 41 of the valve member 45 approaches the annular valve seat for atmospheric air inflow control 37. Also, the reaction disc 54 enters the inside of the guide member 51 so as to reduce the gap of approximately $\delta 9 - \delta 4 - \alpha$ between the rear face of its central part and the front end face of the input member 27, that is the first and second abutting parts 301, 302, and eventually abuts with the front faces of the first and second abutting parts 301, 302, whereupon the reaction disc 54 transmits the advancing force of the power piston 22 and the advancing force of the input member 27 to the output rod 55 and also exerts a reaction force on the input member 27 corresponding to the thrust force of the power piston 22 so as to tend to make the input member 27 retreat with respect to the power piston 22. When the input member 27 begins to be moved rearward with respect to the power piston 22 under this reaction from the reaction disc 54, a gap of about $\delta 11 + \delta 4 + \alpha$ remains between the rear face of the first abutting part 301 and the abutting face 51a.

As a result of the power piston 22 advancing with respect to the input member 27, the moving part 41 of the valve member 45 soon again abuts upon the annular valve seat for atmospheric air inflow control 37 and the inflow of atmospheric air to the variable pressure chambers 24, 26 is stopped (i.e., the valve mechanism 36 switches to its output holding action state). At this time, the input member 27 has moved rearward with respect to the power piston 22 by less than about $\delta 11 + \delta 4 + \alpha$, or in other words by about $\alpha$, and consequently the first abutting part 301 does not abut upon the abutting face 51a. That is, in the rearward movement of the input member 27, the first abutting part 301 and the second abutting part 302 move rearward integrally.

In this normal braking action, the input applied to the input member 27 from the brake pedal is the value Fi1 shown in FIG. 11, and the output applied to the master cylinder from the output rod 55 is the value Fo1 shown in FIG. 11. That is, a first thrust force of the power piston 22 arising as a result of a brake operation at input Fi1 is outputted to an outside device through the output rod 55 as a main output Fo1.

After that, when the input applied to the input member 27 varies between the value Fi1 and the value Fi3 shown in FIG. 11, the valve mechanism 36 switches between the output increasing action state, the output holding action state and the output decreasing action state, and an output value Fo1 to Fo4 of a size corresponding to the input value Fi1 to Fi3 is thereby outputted through the output rod 55. When the input is increased above Fi3 the output increases only by the increase in the input.

When the input applied to the input member 27 is above the value Fi1, in the same way as in the embodiment shown in FIG. 10, a reaction from the reaction disc 54 is applied to the input member 27 through the first and second abutting parts 301, 302.

When an input having been being applied to the input member 27 is removed, by the reaction applied to the input member 27 from the reaction disc 54 and by the spring 59, the input member 27 retreats with respect to the power piston 22 and the valve mechanism 36 switches to the output decreasing action state, and consequently atmospheric air in the variable pressure chambers 24, 26 is discharged and the pressure in the variable pressure chambers 24, 26 falls. The moving walls 17, 20, the power piston 22, the input member 27 and the output rod 55 than start to retreat with respect to the housing 14 integrally and finally return to the positions shown in FIG. 13.

The ratio of the output to the input for inputs between Fi1 and Fi3, or in other words the ratio with respect to a change in the input applied to the input member 27 and the corresponding change in the main output outputted by the output rod 55 (i.e., the gradient from input Fi1 to Fi3 of the normal braking action characteristic curve shown in FIG. 11), is the same as the ratio of the area of abutment between the rear face of the rear end part 56 of the output rod 55 and the front face of the reaction disc 54 to the area of the front face of the first and second abutting parts 301, 302 of the input member 27 on which the reaction force from the reaction disc 54 acts.

Next, when the driver depresses the brake pedal 31 suddenly with an input Fi1 (in FIG. 11) to obtain an emergency braking action, the input member 27 advances with respect to the power piston 22 and the moving part 41 of the valve member 45 abuts upon the annular valve seat for atmospheric air outflow control 38 of the power piston 22 and cuts off the rear variable pressure chamber 26 from the front fixed pressure chamber 23. In other words, the valve mechanism 36 switches from the output decreasing action state to the output holding action state.

At the time of this advance of the input member 27, a gap remains between the front end face of the input member 27, that is the front face of the first and second abutting parts 301, 302, and the rear face of the reaction disc 54, and this gap is approximately equal to $\delta 9 - \delta 4$. Also, the rear face of the first abutting part 301 and the abutting face 51a are apart by about $\delta 11 + \delta 4$.

Then, as a result of a further advance of the input member 27 through a distance $\alpha$, the annular valve seat for atmospheric air inflow control 37 moves away from the moving part 41 of the valve member 45 and connects the rear variable pressure chamber 26 with the atmosphere, whereby the valve mechanism 36 switches to its output increasing action state. Along with this operation of the brake pedal 31, the electronic control unit operates the actuator 48 by passing a current through the solenoid coil 49.

When current is passed through the solenoid coil 49, an electromagnetic attraction force arises between the plunger 52 and the yoke reaction disc receiver 51 and the plunger 52 is advanced with respect to the power piston 22 and advances the valve seat member 40 through a distance $\delta 2$ and moves the annular valve seat for atmospheric air inflow control 37 of the valve seat member 40 further, from $\alpha$ to $\alpha + \delta 2$, away from the moving part 41 of the valve member 45. As the plunger 52 and the valve seat member 40 advance, the front end 52b of the plunger 52 abuts upon the rear end 51b of the yoke reaction disc receiver 51, the engaging part 40a of the valve seat member 40 abuts upon the engaging part 29a of the middle member 29, and the forward movement of the valve seat member 40 with respect to the input member 27 is thereby limited. As a result of this operation, the gap between the annular valve seat for atmospheric air inflow control 37 and the moving part 41 of the valve member 45 is increased to a maximum size. Consequently, as a result of the operation of the brake pedal and the operation of the actuator 48, atmospheric air flows rapidly into the variable pressure chambers 24, 26, the pressure in the variable pressure chambers 24, 26 rapidly rises, and the moving walls 17, 20, the power piston 22 and the output rod 55 rapidly advance with respect to the housing 14.

As the moving walls 17, 20 and the power piston 22 advance with respect to the housing 14, the power piston 22 also advances with respect to the input member 27, and consequently the moving part 41 of the valve member 45 approaches the annular valve seat for atmospheric air inflow control 37. Also, as the power piston 22 advances, the reaction disc 54 enters the inside of the guide member 53 so as to reduce the gap of approximately δ9−δ4−α between the rear face of its central part and the front end face of the input member 27, that is the first and second abutting parts 301, 302, and eventually abuts against the front faces of the first and second abutting parts 301, 302, whereupon the reaction disc 54 transmits the advancing force of the power piston 22 and the advancing force of the input member 27 to the output rod 55 and also exerts a reaction force on the input member 27 corresponding to the output from the output rod 55 so as to tend to make the input member 27 retreat with respect to the power piston 22. When the input member 27 begins to be moved rearward with respect to the power piston 22 under this reaction force from the reaction disc 54, a gap of about δ11+δ4+α remains between the rear face of the first abutting part 301 and the abutting face 51a.

The reaction from the reaction disc 54 moves the input member 27 and the valve seat member 40 engaged with the input member 27 rearward with respect to the power piston 22 by a distance of approximately δ2+δ9, and at the time of this rearward movement of the input member 27 the gap of approximately δ11+δ4+α between the rear face of the first abutting part 301 and the abutting face 51a, as will be understood from δ11+δ4≦δ2 having been set in the initial state, becomes zero. That is, the rear face of the first abutting part 301 abuts upon the abutting face 51a.

Because its rear face is abutting with the abutting face 51a, the rearward integral movement of the first abutting part 301 with the main part 30a and hence the second abutting part 302, i.e. its rearward movement with respect to the power piston 22, is limited. Because the rearward movement of the first abutting part 301 is limited, the reaction disc 54 is unable to move the first abutting part 301 rearward any more and the abutment face of the input member 27 on which the reaction from the reaction disc 54 acts becomes the front face of the second abutting part 302 only. The reaction disc 54 enters the inside of the center hole 301a of the first abutting part 301 and acts on the front face of the second abutting part 302 only, and moves the input member 27, excluding the first abutting part 301, rearward.

As a result of the advance of the power piston 22 with respect to the input member 27, soon the moving part 41 abuts upon the annular valve seat for atmospheric air inflow control 37 and the valve mechanism 36 assumes its output holding action state. The front-rear direction position of the input member 27 with respect to the power piston 22 at this time has shifted rearward with respect to its front-rear direction position at the same time in the normal braking action through the displacement δ2, and the amount of entry of the reaction disc 54 into the yoke reaction disc receiver 51 is greater than the amount of entry in the normal braking action. That is, the thrust force transmitted to the output rod 55 through the reaction disc 54 from the power piston 22 (the output applied to the master cylinder from the output rod 55) is greater than in the normal braking action and is the value Fo2 in FIG. 11. In other words, while the first thrust force of the power piston 22 arising as a result of the brake being operated with an input of Fi1 is exerted through the output rod 55 as an output Fo1, as a result of the actuator 48 being operated a second thrust force arises in the power piston 22 and an auxiliary output of [Fo2−Fo1] is applied to the output rod 55, and consequently the brake booster 10 outputs a force Fo2 which is the sum of the main output Fo1 and the auxiliary output [Fo2−Fo1].

When the output is the value Fo2 in FIG. 11, the pressure in the variable pressure chambers 24, 26 is lower than atmospheric pressure. Consequently, when the input applied to the input member 27 is increased to a value up to the value Fi2 of FIG. 11, the input member 27 advances with respect to the power piston 22, the valve mechanism 36 switches from the output holding action state to the output increasing action state, the pressure in the variable pressure chambers 24, 26 rises and the output increases. Then, as a result of the power piston 22 advancing with respect to the input member 27, excluding the first abutting part 301, the valve mechanism 36 switches from the output increasing action state to the output holding action state and the increasing of the output stops.

When the input to the input member 27 decreases, the input member 27 excluding the first abutting part 301 is retracted with respect to the power piston 22 by the reaction from the reaction disc 54, the valve mechanism 36 switches to the output decreasing action state, the pressure in the variable pressure chambers 24, 26 falls and the output decreases. Then, as the power piston 22 retreats with respect to the input member 27, the valve mechanism 36 switches from its output decreasing action state to its output holding action state and the decreasing of the output stops.

The output value Fo3 in FIG. 11 is the value when the pressure in the variable pressure chambers 24, 26 has risen to atmospheric pressure, and the input at this time is the value Fi2. When the input varies between the value Fi1 and the value Fi2, the ratio of the output to the input, in other words the ratio with respect to a change in the input applied to the input member 27 and the corresponding change in the total output made up of the main output and the auxiliary output outputted by the output rod 55 (i.e., the gradient of the emergency braking action characteristic curve between the inputs Fi1 and Fi2 in FIG. 11) is the same as the ratio of the area of the front face of the reaction disc 54 to the area of the front face of the second abutting part 302 of the input member 27 on which the reaction from the reaction disc 54 acts. At inputs above the value Fi2, the output changes only by the change in the input.

When the driver releases the brake pedal with a current passing through the solenoid coil 49, in the same way as when the brake pedal is released during normal braking, the input member 27 and the valve seat member 40 engaged with the input member 27 are made to retreat with respect to the power piston 22 by the reaction force applied to them from the reaction disc 54 and by the spring 59. Consequently the valve mechanism 36 switches to its output decreasing action state, the pressures in the variable pressure chambers 24, 26 falls and the output decreases. As a result, the input member 27, the moving walls 17 and 20, the power piston 22 and the output rod 55 retreat with respect to the housing 14 and finally return to the non-operating state shown in FIG. 13.

When conditions for switching off the solenoid coil 49 have been established, the electronic control unit switches the solenoid coil 49 off. Consequently, the valve seat member 40 and the plunger 52 are returned by the spring 72 to the positions shown in FIG. 13 and the operation of the actuator 48 is thus ended.

Other affects of this embodiment are similar to those described above with respect to the fifth embodiment.

Figure 14:
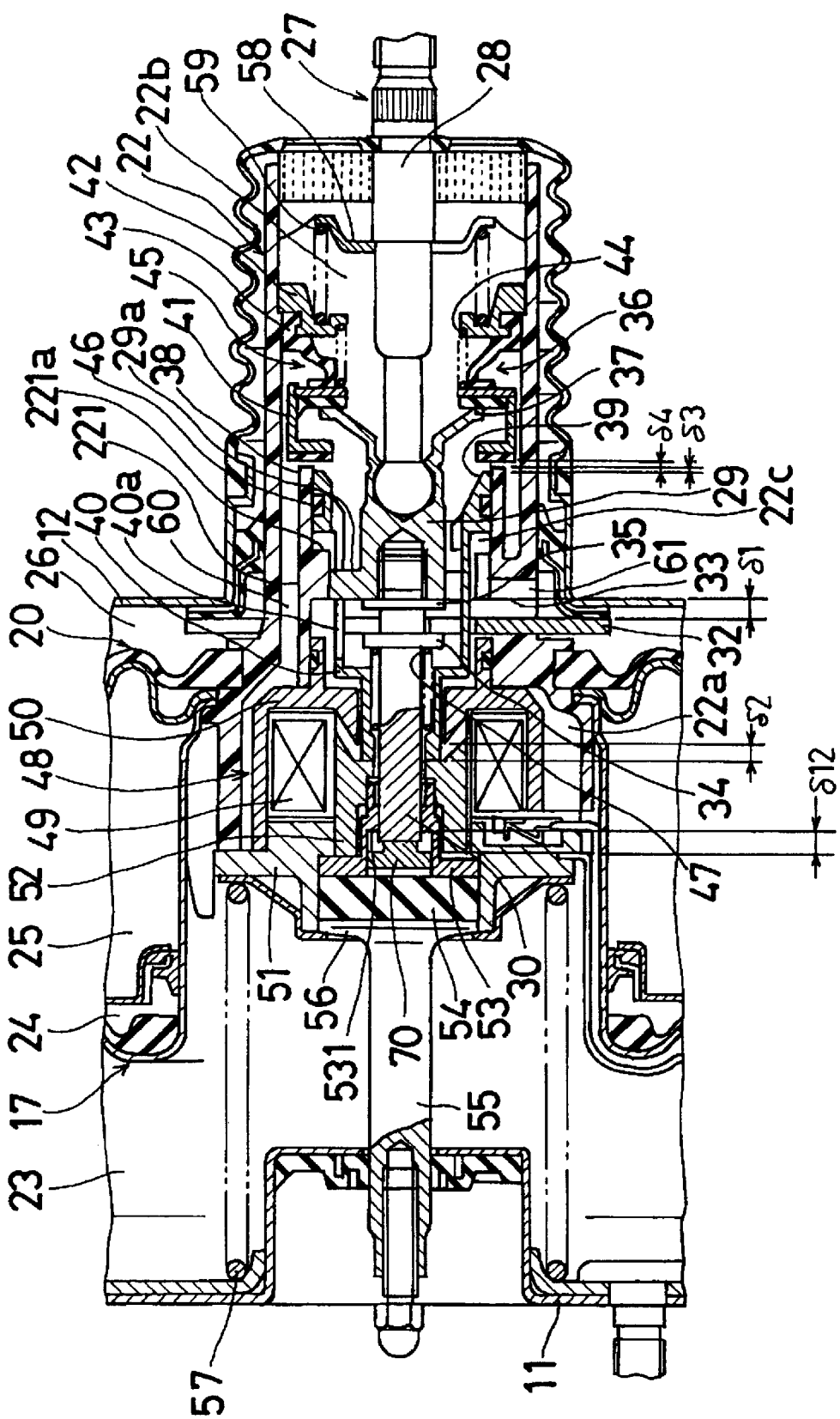
FIG. 14 is an enlarged cross-sectional view of a portion of a tandem type vacuum brake booster for a vehicle according to a eighth embodiment of the present invention.

An eighth embodiment of the vacuum type brake booster according to the present invention is illustrated in FIG. 14. Features in this embodiment which correspond to features in earlier described embodiments are designated with like reference numerals.

As seen in FIG. 14, an abutting member 70 is disposed between the input member 27 and the reaction member 54. The abutting member 70 is adapted to abut at its front face upon the rear face of the reaction member 54 and is adapted to abut upon the front end of the input member 27.

The plunger 52 and the valve seat member 40 each consist of a separate member and are not connected to each other, and the plunger 52 has the inner periphery of its rear end abutting upon the front end face of the valve seat member 40. That is, the valve seat member 40 and the plunger 52 are mounted independently of each other and slidably in the front-rear direction with respect to the power piston 22.

The amount of retreat of the valve seat member 40 corresponds to the distance δ2 between the yoke 50 and the plunger 52, and when the valve seat member 40 has been retracted, the second annular valve seat for atmospheric air outflow control 39 of the valve seat member 40 is positioned rearward of the first annular valve seat for atmospheric air outflow control 38 of the power piston 22 by a distance [δ2−δ3].

The guide member 53 has an opposing face 531 which in the initial state is a predetermined distance δ12 away from the outer periphery of the rear face of the abutting member 70. The opposing face 531 limits rearward movement of the abutting member 70 with respect to the power piston 22 by abutting against the rear face outer periphery of the abutting member 70 when the input member 27 and the abutting member 70 move rearward upon operation of the actuator 48.

In the initial state shown in FIG. 14, the rear face outer periphery of the abutting member 70 and the opposing face 531 of the guide member 53 facing the rear face outer periphery of the abutting member 70 are apart by a predetermined distance δ12.

In the initial state shown in FIG. 14, the relationship between the predetermined distances δ2, δ3, δ4, δ12 is set so that δ4+δ12<δ2−δ3.

When the driver depresses the brake pedal 31 to obtain an emergency braking action, the input member 27 and the abutting member 70 advance with respect to the power piston 22, and the moving part 41 of the valve member 45 abuts upon the first annular valve seat for atmospheric air outflow control 38 of the power piston 22 to cut off the second rear chamber 26 from the first front chamber 23. That is, the valve mechanism 36 switches from its output decreasing action state to its output holding action state. At this time, a gap remains between the front end face of the abutting member 70 and the rear face of the reaction member 54. Also, the rear face outer periphery of the abutting member 70 and the opposing face 531 are apart by a distance of approximately δ4+δ12.

Then, when the input member 27 and the abutting member 70 are advanced by a distance α from the output holding action state, the annular valve seat for atmospheric air inflow control 37 moves away from the moving part 41 of the valve member 45 by the distance α and connects the second rear chamber 26 with the atmosphere, whereby the valve mechanism 36 switches to an output increasing action state. Consequently, atmospheric air flows into the second rear chamber 26 and flows from the second rear chamber 26 into the first rear chamber 24, and the pressure in the two rear chambers 24, 26 rises so that an advancing force is exerted on the first moving wall 17 by the difference in pressure between the first front chamber 23 and the first rear chamber 24. An advancing force is also exerted on the second moving wall 20 by the difference in pressure between the second front chamber 25 and the second rear chamber 26, and an advancing force is exerted on the power piston 22 by the difference in pressure between the first front chamber 23 and the second rear chamber 26. These advancing forces are transmitted from the power piston 22 through the yoke reaction member receiver 51 of the actuator 48, the guide member 53 and the reaction disc 54 to the output member 55, and the moving walls 17 and 20, the power piston 22 and the output member 55 integrally start to move with respect to the housing 14 and operation of the master cylinder 62 is begun.

At this time, the power piston 22 advances with respect to the input member 27 also, and the moving part 41 of the valve member 45 approaches the annular valve seat for atmospheric air inflow control 37. Also, the reaction disc 54 enters the inside of the guide member 53 so as to reduce the gap between the rear face of the central part of the reaction disc 54 and the front face of the abutting member 70, and eventually abuts with the front face of the abutting member 70 so that the reaction disc 54 transmits the advancing force of the power piston 22 and the advancing force of the input member 27 to the output member 55 and also exerts a reaction force on the abutting member 70 and the input member 27 corresponding to the output from the output member 55 so as to tend to make the abutting member 70 and the input member 27 retreat with respect to the power piston 22.

As a result of the power piston 22 advancing with respect to the input member 27, the moving part 41 of the valve member 45 soon again abuts upon the annular valve seat for atmospheric air inflow control 37 and the inflow of atmospheric air to the rear chambers 24, 26 is stopped (i.e., the valve mechanism 36 switches to its output holding action state). At this time, the input member 27 has moved rearward with respect to the power piston 22 under the reaction force from the reaction member 54 by less than about δ4+δ12+α, or in other words by the distance α, and consequently the rear face outer periphery of the abutting member 70 does not abut upon the opposing face 531.

Figure 15:
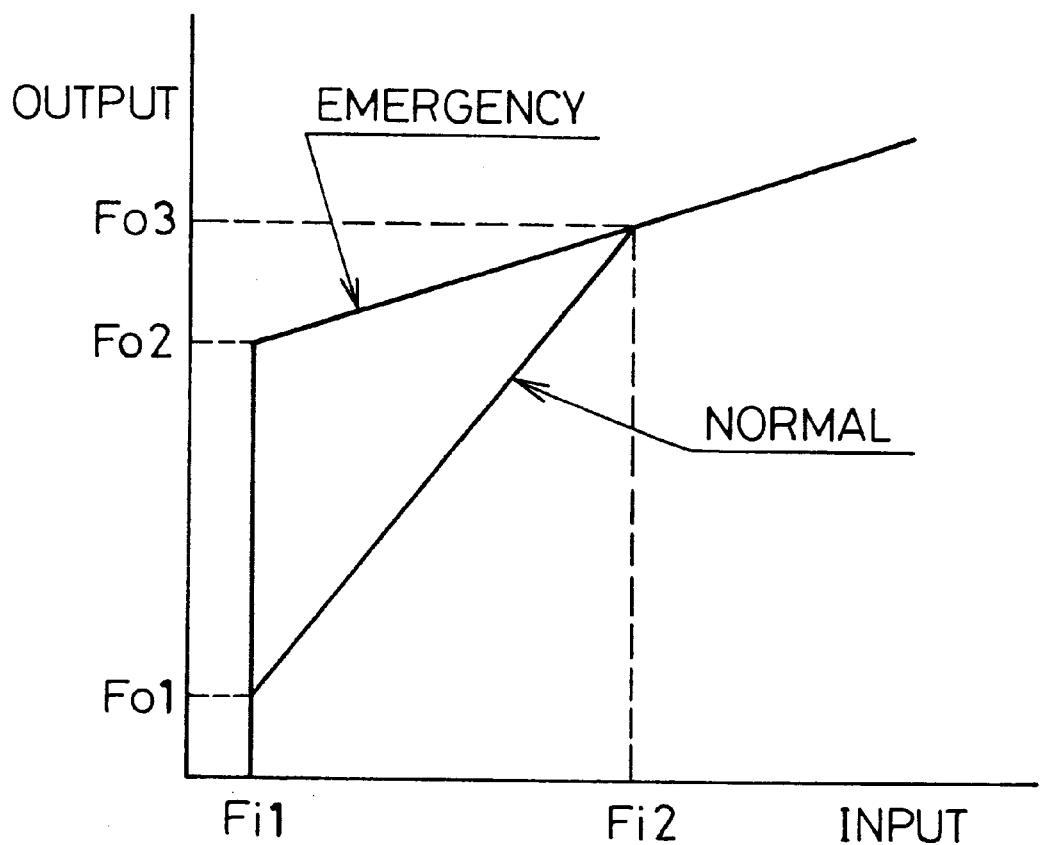
FIG. 15 is a graph depicting input-output characteristics of the vacuum brake booster shown in FIG. 14.

In this normal braking action, the input applied to the input member 27 from the brake pedal 31 is the value Fi1 shown in FIG. 15, and the output applied to the master cylinder 62 is the value Fo1 shown in FIG. 15.

When the input applied to the input member 27 is increased to a value up to the value Fi2 of FIG. 15, the input member 27 advances with respect to the power piston 22 and the atmospheric air valve seat 37 again moves away from the moving part 41 of the valve member 45 (i.e., the valve mechanism 36 switches from the output holding action state to the output increasing action state), atmospheric air flows into the rear chambers 24, 26, the pressure in the rear chambers 24, 26 rises and the advancing force on the rear chambers 24, 26 and the power piston 22 increases and the moving walls 17 and 20, the power piston 22 and the output member 55 advance further with respect to the housing 14. Also, as the power piston 22 advances with respect to the input member 27 the moving part 41 of the valve member 45 approaches the atmospheric air valve seat 37 and soon the moving part 41 of the valve member 45 again abuts upon the atmospheric air valve seat 37, the inflow of atmospheric air into the rear chambers 24, 26 is stopped (i.e., the valve mechanism 36 switches to its output holding action state)

and the increasing of the advancing force on the moving walls 17 and 20 and the power piston 22 stops.

When the input applied to the input member 27 from the brake pedal 31 decreases to a value above the value Fi1 in FIG. 15, the input member 27 is retracted with respect to the power piston 22, the moving part 41 of the valve member 45 is retracted with respect to the power piston 22, the moving part 41 moves away from the first annular valve seat for atmospheric air outflow control 38 (the valve mechanism 36 switches to its output decreasing action state), the rear chambers 24, 26 are connected with the first front pressure chamber 23 and atmospheric air in the rear chambers 24, 26 is discharged through the front chamber 23 by the negative pressure source. The pressure in the rear chambers 24, 26 thus falls, and the advancing forces on the moving walls 17 and 20 and the power piston 22 decrease and the moving walls 17 and 20, the power piston 22 and the output member 55 retreat with respect to the housing 14. At this time, the power piston 22 retreats with respect to the input member 27. Also, the first annular valve seat for atmospheric air outflow control 38 approaches the moving part 41 of the valve member 45 and soon the first annular valve seat for atmospheric air outflow control 38 abuts upon the moving part 41 of the valve member 45, the outflow of atmospheric air from the rear chambers 24, 26 is stopped (the valve mechanism 36 switches to its output holding action state) and the decreasing of the advancing forces on the moving walls 17 and 20 and the power piston 22 is stopped.

The input value Fi2 shown in FIG. 15 is the input value at which the pressure in the rear pressure chambers 24, 26 reaches atmospheric pressure. At inputs in the range of from the value Fi1 to the value Fi2, changes in the output applied from the output member 55 to the master cylinder 62 are larger than changes in the input applied to the input member 27. The ratio of the output to the input is the same as the ratio of the area of the rear face of the reaction member 54 to the area of abutment between the rear face of the reaction member 54 and the front face of the abutting member 70.

In FIG. 15, the output when the input is the value Fi2 is the value Fo3. When the input is further increased from the value Fi2, the output increases only by the increase in the input. In FIG. 15, the change in force per unit length of the vertical axis is greater than the change in force per unit length of the horizontal axis. If FIG. 15 had been drawn with the change in force per unit length of the vertical axis made the same as the change in force per unit length of the horizontal axis, the line showing the input-output correlation for inputs above the value Fi2 would have a gradient of 45 degrees.

When the brake pedal 31 has been depressed and the input member 27, the moving walls 17 and 20, the power piston 22 and the output member 55 have advanced with respect to the housing 14, the key member 32 has moved away from the rear side shell 12. When the driver then releases the brake pedal 31 to end the normal braking action, the input member 27 is caused by the reaction force exerted on it through the reaction disc 54 and by the spring 59 to retreat with respect to the power piston 22. As a result, the moving part 41 of the valve member 45 is retracted with respect to the power piston 22 and the moving part 41 moves away from the first annular valve seat for atmospheric air outflow control 38 (i.e., the valve mechanism 36 switches to its output decreasing action state), atmospheric air inside the rear chambers 24, 26 is rapidly discharged through the front chamber 23 by the negative pressure source and in response to consequent rapid pressure drops in the rear chambers 24, 26 the moving walls 17 and 20, the power piston 22 and the output member 55 are rapidly retracted with respect to the housing 14.

As a result of the retreat of the input member 27, the moving walls 17 and 20, the power piston 22 and the output member 55 move with respect to the housing 14, the key member 32 soon abuts upon the rear side shell 12 and the retreat of the input member 27 with respect to the housing 14 is stopped. The retreat of the moving walls 17 and 20, the power piston 22 and the output member 55 with respect to the housing 14, on the other hand, continues as far as the retreat limit position of the power piston 22 with respect to the housing 14, i.e. the position such that the front side wall of the radial hole 33 in the power piston 22 abuts with the front face of the key member 32 and the rear faces of the ends of the key member 32 abut with the rear side shell 12. Consequently the first annular valve seat for atmospheric air outflow control 38 of the power piston 22 approaches the moving part 41 of the valve member 45 and a non-operating state wherein a small gap remains between the annular valve seat for atmospheric air outflow control 38 and the moving part 41 is reached. Because the gap between the annular valve seat for atmospheric air outflow control 38 and the moving part 41 is small, the amount of advance of the input member 27 required for the valve mechanism 36 to change from the output decreasing action state via the output holding action state to the output increasing action state at the time of the next operation is small, and thus there is little play when the brake pedal 31 is depressed and the responsiveness is good.

As a result of the decreasing force transmitted between the power piston 22 and the output member 55, the reaction disc 54 returns to the state shown in FIG. 14 under its own elasticity. Also, the valve seat member 40 does not move with respect to the power piston 22 as a result of the advancing and retreating of the input member 27.

Next, when the driver depresses the brake pedal 31 suddenly with an input Fi1 to obtain an emergency braking action, the input member 27 and the abutting member 70 advance with respect to the power piston 22 and the moving part 41 of the valve member 45 abuts upon the first annular valve seat for atmospheric air outflow control 38 of the power piston 22 and cuts off the second rear chamber 26 from the front chamber 23. That is, the valve mechanism 36 switches from its output decreasing action state to its output holding action state.

At the time of this advance of the input member 27 and the abutting member 70, a gap remains between the front face of the abutting member 70 and the rear face of the reaction member 54. Also, the rear face of the abutting member 70 and the opposing face 531 are spaced apart by a distance of approximately $\delta 4 + \delta 12$.

Then, as a result of the input member 27 advancing from the output holding action state by a further distance $\alpha$, the annular valve seat for atmospheric air inflow control 37 moves away through the distance $\alpha$ from the moving part 41 of the valve member 45 and connects the second rear chamber 26 with the atmosphere, whereby the valve mechanism 36 switches to its output increasing action state. Along with this operation of the brake pedal, the electronic control unit passes a current through the solenoid coil 49 and thereby operates the actuator 48.

When current is passed through the solenoid coil 49, an electromagnetic attraction force arises between the plunger 52 and the yoke 50, and the plunger 52 is retracted with respect to the power piston 22, thereby also retracting the valve seat member 40 through a distance $\delta 2$. The second annular valve seat for atmospheric air outflow control 39 of the valve seat member 40 thus abuts upon the moving part 41 of the valve member 45 and also the valve seat member 40 causes the moving part 41 to retreat with respect to the power piston 22. As a result of this operation, the moving part 41 of the valve member 45 moves away from the first annular valve seat for atmospheric air outflow control 38 of the power piston 22, but because the second annular valve seat for atmospheric air outflow control 39 of the valve seat member 40 is in abutment with the moving part 41, the state of disconnection between the rear chambers 24, 26 and the front chamber 23 is maintained as the gap between the annular valve seat for atmospheric air inflow control 37 and the moving part 41 of the valve member 45 increases from $\alpha$ to [$\alpha+\delta 2-\delta 3$].

Therefore, as a result of the operation of the brake pedal and the operation of the actuator 48, atmospheric air flows rapidly into the rear chambers 24, 26, the pressure in the rear chambers 24, 26 rapidly rises and the moving walls 17 and 20, the power piston 22 and the output member 55 rapidly advance with respect to the housing 14.

As a result of the power piston 22 advancing with respect to the input member 27, the power piston 22 also advances with respect to the housing 14, and the moving part 41 of the valve member 45 approaches the annular valve seat for atmospheric air inflow control 37. Also, as the power piston 22 advances, the reaction disc 54 enters the inside of the guide member 53 so as to reduce the gap between the rear face of the central part of the reaction disc 54 and the abutting member 70, and eventually abuts with the front face of the abutting member 70 so that the reaction disc 54 transmits the advancing force of the power piston 22 and the advancing force of the input member 27 to the output member 55 and also exerts a reaction force on the input member 27 and the abutting member 70 corresponding to the output from the output member 55 so as to tend to make the input member 27 and the abutting member 70 retreat with respect to the power piston 22. When the input member 27 and the abutting member 70 begin to be moved rearward with respect to the power piston 22 under this reaction force from the reaction disc 54, a gap of about $\delta 4+\delta 12+\alpha$ remains between the rear face of the abutting member 70 and the opposing face 531.

Under the reaction force exerted by the reaction disc 54, the input member 27 and the abutting member 70 tend to move rearwardly with respect to the power piston 22 by a distance of approximately $\delta 2-\delta 3+\alpha$. At the time of this rearward movement of the input member 27 and the abutting member 70 the gap of approximately $\delta 4+\delta 12+\alpha$ between the rear face outer periphery of the abutting member 70 and the opposing face 531, as will be understood from $\delta 4+\delta 12 \leq \delta 2-\delta 3$ having been set in the initial state, becomes zero. That is, the rear face outer periphery of the abutting member 70 abuts upon the opposing face 531.

Because rearward movement of the abutting member 70 is limited by the rear face outer periphery of the abutting member 70 abutting upon the opposing face 531, the reaction disc 54 becomes unable to move the abutting member 70 and hence the input member 27 rearward any more. Consequently, the output increasing action state of the valve mechanism 36, in which the second annular valve seat for atmospheric air outflow control 39 abuts upon the moving part 41 of the valve member 45 and the annular valve seat for atmospheric air outflow control 38 is spaced away from the moving part 41, is maintained, and atmospheric air flows into the rear chambers 24, 26 until the rear chambers 24, 26 reach atmospheric pressure.

That is, the advancing force transmitted from the power piston 22 through the reaction member 54 to the output member 55 (the output applied from the output member 55 to the master cylinder) is greater than at the time of the normal braking action, and is the value Fo2 in FIG. 15. In other words, while a first thrust force of the power piston 22 arising as a result of the brake being operated with an input of Fi1 is exerted through the output member 55 as an output Fo1, as a result of the actuator 48 being operated a second thrust force arises in the power piston 22 and an auxiliary output of [Fo2–Fo1] is applied to the output member 55. Consequently the brake booster outputs a force Fo2 which is the sum of the main output Fo1 and the auxiliary output [Fo2–Fo1].

The output value Fo2 in FIG. 15 is the value at which the pressure in the rear chambers 24, 26 has risen to atmospheric pressure. At inputs greater than the value Fi1, the output changes only by the change in the input.

When the driver releases the brake pedal with current passing through the solenoid coil 49, the input member 27 alone is made to retreat with respect to the power piston 22 by the spring 59. Consequently the valve mechanism 36 switches to the output decreasing action state, the pressure in the rear chambers 24, 26 falls and the output decreases. As a result, the input member 27, the moving walls 17 and 20, the power piston 22 and the output member 55 are retracted with respect to the housing 14 and finally return to the non-operating state shown in FIG. 14.

When the conditions for switching off the solenoid coil 49 have been established, the electronic control unit switches off the solenoid coil 49. Consequently, the valve seat member 40 and the plunger 52 are returned by the spring 47 to the positions shown in FIG. 14 and the operation of the actuator 48 is thus ended.

In this embodiment, when under a reaction from the reaction member 54, the input member 27 and the abutting member 70 are moved rearward through the predetermined distance $\delta 4+\delta 12+\alpha$, by the rear face outer periphery of the abutting member 70 abutting with the opposing face 531, the transmission of a reaction force to the input member 27 by the reaction member 54 is cut off, and the opposing face 531 functions as an engaging part.

As described above, with the vacuum brake booster of this embodiment, although the valve seat member 40 is urged forward by the spring 47 when the input member 27 is advanced, because its forward movement is limited by the guide member 53 it does not advance. Also, when the input member 27 retreats, the input member 27 does not urge the valve seat member 40 rearward, and consequently the valve seat member 40 does not retreat. That is, the valve seat member 40 is advanced/retracted with respect to the power piston 22 independently from the movement of the input member 27. Therefore, when the actuator 48 is operated, the annular valve seat for atmospheric air inflow control 37 and the moving part 41 can always be moved apart by a stable amount and there is no danger of there being dispersion in the output of the brake booster when the actuator is operated.

The wear of the abutting parts of the valve seat member 40 and the middle part 221 of the power piston 22 and of the annular seal member 46 is also suppressed. Also, because the actuator 48 is fixed to the power piston 22, the freedom in design with respect to the shape of the actuator 48 is increased.

In addition, because the valve seat member 40 is held slidably in the front-rear direction on the inner circumferential surface of the middle part 221 of the power piston 22, the valve seat member 40 can slide smoothly with respect to the power piston 22. Because the input member 27 slidably abuts with its abutting part 29a upon the middle part 221 of the power piston 22, the input member 27 can slide smoothly with respect to the power piston 22. Additionally, because the valve seat member 40 has the abutting parts 29a passing through it at the slits 40a, it can slide more smoothly with respect to the power piston 22 and the input member 27.

Additionally, when the actuator 48 is operated, a full-servo state wherein atmospheric air enters the rear chambers 24, 26 fully can be reached. Even when the actuator 48 is operating, by the brake pedal 31 being released, the output of the brake booster can be swiftly reduced to a zero output value.

Also, because it is not necessary for the plunger 52 and the valve seat member 40 to be connected, connecting members can be dispensed with and cost reductions and increases in efficiency of the assembly operation can be achieved. It is thus possible to provide a vacuum type brake booster which can stably produce an output based on operation of the actuator 48 and wherein the freedom of the shape of the actuator 48 is increased.

In this embodiment, as in the case of the embodiment shown in FIGS. 1–3, four abutting parts are provided on the input member 27 and four slits 40a are provided in the valve seat member 40, but it is to be understood that the invention is not particularly limited to this construction and similar advantages can of course be obtained in a brake booster according to the invention having for example five abutting parts on the input member and five slits in the valve seat member.

Figure 16:
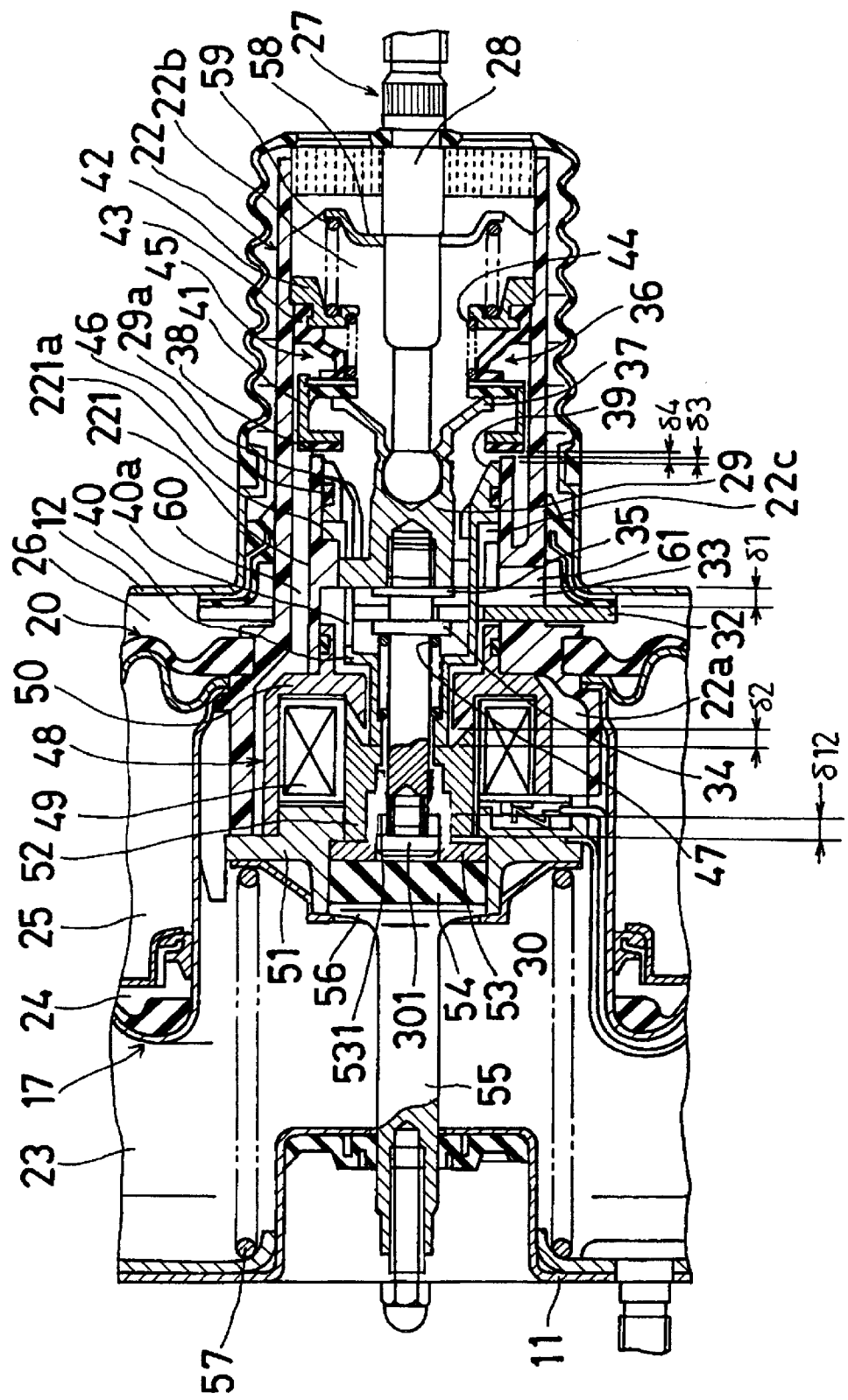
FIG. 16 is an enlarged cross-sectional view of a portion of a tandem type vacuum brake booster for a vehicle according to a ninth embodiment of the present invention.

A ninth embodiment of the vacuum type brake booster of the present invention is illustrated in FIG. 16. Features of the booster in this embodiment that are the same as in the embodiment of the booster depicted in FIG. 14 are designated with like reference numerals. Except for the construction of the input member 27, the features associated with the embodiment of the brake booster shown in FIG. 16 are the same as in the embodiment illustrated in FIG. 14. Thus, a detailed description of such features will not be repeated in entirety here.

Inside the power piston 22, an input member 27 is disposed passing through a first space 22a, a second space 22b and a third space 22c. The input member 27 is adapted to advance/retract with respect to the power piston 22. This input member 27 is made up of a rear member 28 having its front end positioned approximately in the third space 22c of the power piston 22 and its rear end positioned outside the power piston 22, a middle member 29 connected to the front end of this rear member 28 by a ball joint and slidably guided by the middle part 221 of the power piston 22, and a front member 30 having its rear end screwed into the front end of the middle member 29. The input member is connected to a brake pedal at the rear end of the rear member 28.

The front member 30 is made up of a first front member 301 abuttable with the reaction member 54 and a second front member 302 having the first front member 301 screwed into its front end and having flanges 34, 35 at its rear end.

The guide member 53 is provided with an opposing face 531 which in the initial state is spaced apart from the rear face of the first front member 301 by a predetermined distance δ12. The opposing face 531 limits rearward movement of the first front member 301 and hence the input member 27 with respect to the power piston 22 by abutting upon the rear face of the first front member 301 when the input member 27 moves rearward when the actuator 48 is operated.

In the initial state shown in FIG. 5, the relationship between the predetermined distances δ2, δ3, δ4, δ12 is set so that δ4+δ12<δ2−δ3.

The input-output characteristics of the vacuum brake booster for a vehicle 10 of this embodiment is substantially the same as that of the embodiment shown in FIGS. 14 and accordingly will be described with reference to the graph depicted in FIG. 15. The normal braking action is substantially the same as that of the eighth embodiment shown in FIG. 14 and therefore will not be described again here.

When the driver depresses the brake pedal suddenly with an input Fi1 to obtain an emergency braking action, the input member 27 advances with respect to the power piston 22 and the moving part 41 of the valve member 45 abuts upon the first annular valve seat for atmospheric air outflow control 38 of the power piston 22 and cuts off the second rear chamber 26 from the first front chamber 23. That is, the valve mechanism 36 switches from an output decreasing action state to an output holding action state.

At the time of this advance of the input member 27, a gap remains between the front end face of the input member 27, that is the front face of the first front member 301, and the rear face of the reaction member 54. Also, the rear face of the first front member 301 and the opposing face 531 are spaced apart by a distance of approximately δ4+δ12.

Then, as a result of the input member 27 advancing from the output holding action state by a further distance α, the annular valve seat for atmospheric air inflow control 37 moves away through the distance α from the moving part 41 of the valve member 45 and connects the second rear chamber 26 with the atmosphere, whereby the valve mechanism 36 switches to its output increasing action state. Along with this operation of the brake pedal, the electronic control unit passes a current through the solenoid coil 49 and thereby operates the actuator 48.

When current is passed through the solenoid coil 49, an electromagnetic attraction force arises between the plunger 52 and the yoke 50, and the plunger 52 is retracted with respect to the power piston 22 and retracts the valve seat member 40 through a distance δ2, and the second annular valve seat for atmospheric air outflow control 39 of the valve seat member 40 abuts upon the moving part 41 of the valve member 45 and also the valve seat member 40 causes the moving part 41 to retreat with respect to the power piston 22. As a result of this operation, the moving part 41 of the valve member 45 moves away from first the annular valve seat for atmospheric air outflow control 38 of the power piston 22, but because the second annular valve seat for atmospheric air outflow control 39 of the valve seat member 40 is in abutment with the moving part 41, the state of disconnection between the rear chambers 24, 26 and the front chamber 23 is maintained as the gap between the annular valve seat for atmospheric air inflow control 37 and the moving part 41 of the valve member 45 increases from α to [α+δ2−δ3].

Therefore, as a result of the operation of the brake pedal and the operation of the actuator 48, atmospheric air flows rapidly into the rear chambers 24, 26, the 5 pressure in the rear chambers 24, 26 rapidly rises and the moving walls 17 and 20, the power piston 22 and the output member 55 rapidly advance with respect to the housing 14.

As a result of the power piston 22 advancing with respect to the input member 27, and as it also advances with respect to the housing 14, the moving part 41 of the valve member 45 approaches the annular valve seat for atmospheric air inflow control 37. Also, as the power piston 22 advances, the reaction disc 54 enters the inside of the guide member 53 so as to reduce the gap between the rear face of the central part of the reaction disc 54 and the front end face of the input member 27, that is the first front member 301, and eventually abuts with the front face of the first front member 301 so that the reaction disc 54 transmits the advancing force of the power piston 22 and the advancing force of the input member 27 to the output member 55 and also exerts a reaction force on the input member 27 corresponding to the output from the output member 55 so as to make the input member 27 retreat with respect to the power piston 22. When the input member 27 begins to be moved rearward with respect to the power piston 22 under this reaction force from the reaction disc 54, a gap of about δ4+δ12+α remains between the rear face of the first front member 301 and the opposing face 531.

Under the reaction exerted on it by the reaction disc 54, the input member 27 tends to move rearward with respect to the power piston 22 by a distance of δ2−δ3+α. At the time of this rearward movement of the input member 27, the gap of approximately δ4+δ12+α between the rear face of the first front member 301 and the opposing face 531, as will be understood from 67 4+δ12≦δ2−δ3 having been set in the initial state, becomes zero. That is, the rear face of the first front member 301 abuts upon the opposing face 531.

Because rearward movement and hence movement toward the input member 27 of the first front member 301 is limited by the rear face of the first front member 301 abutting upon the opposing face 531, the reaction disc 54 is unable to move the first front member 301 and hence the input member 27 rearward any more. Consequently, the output increasing action state of the valve mechanism 36, wherein the second annular valve seat for atmospheric air outflow control 39 abuts upon the moving part 41 of the valve member 45 and the annular valve seat for atmospheric air outflow control 38 is away from the moving part 41 is maintained, and atmospheric air flows into the rear chambers 24, 26 until the rear chambers 24, 26 reach atmospheric pressure.

That is, the advancing force transmitted from the power piston 22 through the reaction member 54 to the output member 55 (the output applied from the output member 55 to the master cylinder) is greater than at the time of the normal braking action, and is the value Fo2 in FIG. 15. In other words, while the thrust force of the power piston 22 arising as a result of the brake being operated with an input of Fi1 is exerted through the output member 55 as an output Fo1, as a result of the actuator 48 being operated a second thrust force arises in the power piston 22 and an auxiliary output of [Fo2−Fo1] is applied to the output member 55. Consequently the brake booster outputs a force Fo2 which is the sum of the main output Fo1 and the auxiliary output [Fo2−Fo1].

The output value Fo2 of FIG. 15 is the value at which the pressure in the rear chambers 24, 26 has risen to atmospheric pressure. At inputs greater than the value Fi1, the output changes only by the change in the input.

When conditions for switching off the solenoid coil 49 have been established, the electronic control unit switches off the solenoid coil 49. Consequently, the valve seat member 40 and the plunger 52 are returned by the spring 47 to the positions shown in FIG. 16 and the operation of the actuator 48 is thus ended.

As the valve seat member 40 returns to its initial position, the moving part 41 of the valve member 45 abuts upon the first annular valve seat for atmospheric air outflow control 38 and the annular valve seat for atmospheric air inflow control 37, and the valve mechanism 36 assumes its output holding action state. When the driver releases the brake pedal, the input member 27 is moved toward its initial position by the reaction of the reaction member 54 and by the urging force of the spring 59, and as a result of the movement of the input member 27 the valve mechanism 36 assumes its output decreasing action state and the output of the booster is decreased.

Next, an automatic braking action in which the actuator 48 is operated with no input being applied to the brake pedal by the driver will be described. In the non-operating state shown in FIG. 16, the electronic control unit operates the actuator 48 by passing a current through the solenoid coil 49.

When a current is passed through the solenoid coil 49, an electromagnetic attraction force arises between the plunger 52 and the yoke 50, and the plunger 52 is retracted with respect to the power piston 22 and retracts the valve seat member 40 through a distance δ2. The second annular valve seat for atmospheric air outflow control 39 of the valve seat member 40 thus abuts upon the moving part 41 of the valve member 45 and also the valve seat member 40 causes the moving part 41 to retreat with respect to the power piston 22. As a result of this operation, the second annular valve seat for atmospheric air outflow control 39 of the valve seat member 40 abuts upon the moving part 41 and consequently the rear chambers 24, 26 are cut off from the first front chamber 23 and the annular valve seat for atmospheric air inflow control 37 and the moving part 41 of the valve member 45 are moved apart through the distance [δ2−δ3-4].

Thus, as a result of the operation of the actuator 48 only, atmospheric air rapidly flows into the rear chambers 24, 26, the pressure in the rear chambers 24, 26 rises and the moving walls 17 and 20, the power piston 22 and the output member 55 rapidly advance with respect to the housing 14.

As a result of the power piston 22 advancing with respect to the input member 27 as it also advances with respect to the housing 14, the moving part 41 of the valve member 45 approaches the annular valve seat for atmospheric air inflow control 37. Also, as the power piston 22 advances, the reaction disc 54 enters the inside of the guide member 53 so as to reduce the gap between the rear face of the central part of the reaction disc 54 and the front end face of the input member 27, that is, the first front member 301, and eventually abuts with the front face of the first front member 301 so that the reaction disc 54 transmits the advancing force of the power piston 22 and the advancing force of the input member 27 to the output member 55 and also exerts a reaction force on the input member 27 corresponding to the output from the output member 55 so as to make the input member 27 retreat with respect to the power piston 22. When the input member 27 begins to be moved rearward with respect to the power piston 22 under this reaction force from the reaction disc 54, a gap of about δ12 remains between the rear face of the first front member 301 and the opposing face 531.

Under the reaction exerted on it by the reaction disc 54, the input member 27 tends to move rearward with respect to the power piston 22 by a distance of δ2−δ3-4. At the time of this rearward movement of the input member 27, the gap of approximately δ12 between the rear face of the first front member 301 and the opposing face 531, as will be understood from δ4+δ12≦δ2−3 having been set in the initial state, becomes zero. That is, the rear face of the first front member 301 abuts upon the opposing face 531.

When the rear face of the first front member 301 abuts upon the opposing face 531, rearward movement and hence movement toward the input member 27 of the first front member 301 is limited, and the reaction disc 54 is unable to move the first front member 301 and hence the input member 27 rearward any more. Consequently, the output increasing action state of the valve mechanism 36, wherein the second annular valve seat for atmospheric air outflow control 39 abuts upon the moving part 41 of the valve member 45 and the annular valve seat for atmospheric air outflow control 38 is spaced away from the moving part 41, is maintained, and atmospheric air flows into the rear chambers 24, 26 until the rear chambers 24, 26 reach atmospheric pressure.

When atmospheric air flows into the rear chambers 24, 26 with the first front member 301 abutting upon the opposing face 531, as the power piston 22 advances, the input member 27 is advanced integrally with the power piston 22. As a result of the input member 27 advancing integrally with the power piston 22, the annular valve seat for atmospheric air inflow control 37 and the moving part 41 are kept apart.

Consequently, even at a time of retreating of the input member 27 under the reaction force exerted on it by the reaction member 54 and advancing of the power piston 22 under a pressure difference, the valve mechanism 36 continues to maintain its output increasing action state.

That is, at input zero, the advancing force transmitted to the output member 55 through the reaction member 54 from the power piston 22 (the output applied to the master cylinder from the output member 55), is the value Fo2 in FIG. 15. In other words, although the advancing force on the power piston 22 arising as a result of the brake being operated at input zero is zero, as a result of the actuator 48 being operated a second advancing force arises in the power piston 22 and an auxiliary output of Fo2 is applied to the output member 55, and the brake booster 10 outputs a force Fo2 which is the sum of a main output of zero and an auxiliary output of Fo2.

Thus, with a vacuum brake booster of this embodiment, when the actuator 48 is operated, a full-servo state in which atmospheric air fully enters the rear chambers 24, 26 can be reached. Also, when the actuator 48 is operated with no input being applied to the brake pedal, an automatic braking operation in which a full-servo state (i.e., atmospheric air fully enters the rear chambers 24, 26) is reached can be carried out.

In this embodiment, when the input member 27 tends to move rearward through a predetermined distance δ12+δ4+α under the reaction force from the reaction member 54, the rearward movement of the input member 27 is limited by the rear face of the first front member 301 abutting upon the opposing face 531, and thus the opposing face 531 functions as a limiting part.

Other aspects and advantageous affects of this embodiment are the same as those described above with respect to the embodiment of the invention shown in FIG. 14.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A vacuum servo unit for a braking system of a vehicle provided with a brake pedal comprising:

a housing in which is defined a pressure chamber;

a movable wall member disposed in said housing to divide said pressure chamber into a front chamber that is adapted to communicate with a negative pressure source and a rear chamber that is adapted to selectively communicate with atmosphere and the negative pressure source;

a movable power piston connected to said movable wall member;

an input member disposed in said movable power piston and movable in forward and backward directions with respect to said movable power piston upon actuation of the brake pedal;

a valve mechanism disposed in said movable power piston, said valve mechanism being selectively changeable in response to movement of the input member in the forward and backward directions between a first state in which said rear chamber is in communication with the negative pressure source while communication between said rear chamber and atmosphere is cut off, a second state in which communication between said rear chamber and the negative pressure source is cut off and communication between said rear chamber and atmosphere is cut off, and a third state in which communication between said rear chamber and the negative pressure source is cut off and said rear chamber is in communicated with atmosphere;

a first biasing member for biasing said input member towards a position in which said valve mechanism is in said first state;

an output member for outputting as an output force a propulsion force generated by said movable power piston based on movement of said movable wall member;

a reaction member for transmitting said propulsion force and an input force applied to said input member to said output member, and for applying a reaction force corresponding to said output force outputted from said output member to said input member to move said input member in the backward direction with respect to said movable power piston; and an actuator for moving said input member with respect to said movable power piston to position said valve mechanism in said second state;

said input member being urged in the backward direction with respect to said movable power piston by said first biasing member to a position in which said valve mechanism is in said first state during operation of said actuator upon a decrease of said input force applied to said input member, said valve mechanism being maintained in said first state while said movable wall member continues to move in the backward direction with respect to said housing and said input force applied to said input member is being decreased, said input member being moved in the backward direction with respect to said movable power piston by said first biasing member with said valve mechanism being in said first state when said input force applied to said input member is completely removed during operation of said actuator, and said reaction member maintaining application of said reaction force to said input member when said input force applied to said input member is larger than a preset value during operation of said actuator.

2. A vacuum servo unit as claimed in claim 1, wherein said reaction member is disposed between said input member and said output member, said reaction member contacting said input member at a rear portion of said reaction member, said reaction member contacting said output member at a front portion of said reaction member, said reaction member controlling a ratio of the input force applied to said input member to said output force output by said output member based on the ratio of an area of the input member acted upon by said reaction force from said reaction member to an area that the reaction member contacts said output member, said reaction member applying a reaction force corresponding to said output force to said input member when said propulsion force of said movable power piston is generated, said input member being moved in the backward direction by application of said reaction force from said reaction member so that said valve mechanism is changed from said third state to said second state, and including a change mechanism for changing said ratio of said area of said input member acted upon by said reaction force from said reaction member to said area that said reaction member contacts said output member.

3. A vacuum servo unit as claimed in claim 2, wherein said change mechanism changes said area of said input member upon which said reaction force from said reaction member acts.

4. A vacuum servo unit as claimed in claim 3, wherein said input member has a first contact portion for contacting said reaction member with a first area and a second contact portion for contacting said reaction member with a second area, said input member receiving said reaction force from said reaction member at said first portion and said second portion during non-operation of said actuator, and said change mechanism contacting said input member to said reaction member at only said second portion of said input member.

5. A vacuum servo unit as claimed in claim 4, wherein said first contact portion is ring-shaped, said second contact portion is cylindrical in shape and is inserted into a hole located in said first contact portion so as to be axially movable with respect to said first contact portion, said input member having a first restraint portion for restraining movement of said second contact portion in the backward direction with respect to said first contact portion, said change mechanism having a second restraint portion for restraining movement of said first contact portion in the backward direction with respect to said movable power piston.

* * * * *